United States Patent [19]
Ho

[11] Patent Number: 5,798,409
[45] Date of Patent: Aug. 25, 1998

[54] REACTIVE TWO-PART POLYURETHANE COMPOSITIONS AND OPTIONALLY SELF-HEALABLE AND SCRATCH-RESISTANT COATINGS PREPARED THEREFROM

[75] Inventor: Chia-Tie Ho, Woodbury, Minn.

[73] Assignee: Minnesota Mining & Manufacturing Company, St. Paul, Minn.

[21] Appl. No.: 817,610

[22] PCT Filed: Oct. 3, 1995

[86] PCT No.: PCT/US95/12812

§ 371 Date: Apr. 1, 1997

§ 102(e) Date: Apr. 1, 1997

[87] PCT Pub. No.: WO96/10595

PCT Pub. Date: Apr. 11, 1996

[51] Int. Cl.[6] ........................................ C08J 3/00
[52] U.S. Cl. .................. 524/506; 524/507; 524/591; 524/839; 524/840; 560/25; 560/26; 560/115; 560/158; 560/330; 560/355; 560/358; 556/414; 528/28; 528/80; 528/71; 528/76; 528/8; 528/59; 528/45; 528/60; 528/65; 528/66; 528/70; 528/77
[58] Field of Search ..................... 560/25, 26, 158, 560/330, 355, 358, 115; 556/414; 528/28, 70, 71, 76, 80, 59, 45, 60, 65, 66, 77, 81; 524/506, 507, 591, 839, 840; 525/123, 124, 125, 127, 128, 131, 455, 440, 459, 460; 427/379, 381, 382; 428/423.1, 425.1, 425.6, 425.8

[56] References Cited

U.S. PATENT DOCUMENTS

| | | | |
|---|---|---|---|
| 4,098,933 | 7/1978 | Burkhardt et al. | 427/379 |
| 4,472,550 | 9/1984 | Reiff et al. | 524/589 |
| 4,522,851 | 6/1985 | Rosthauser | 427/386 |
| 4,558,090 | 12/1985 | Prexler et al. | 524/591 |
| 4,826,914 | 5/1989 | Raedisch et al. | 524/731 |
| 4,857,580 | 8/1989 | Patzschke et al. | 524/507 |
| 4,873,298 | 10/1989 | Ryntz | 525/479 |
| 4,895,921 | 1/1990 | Schafer et al. | 528/45 |
| 5,030,686 | 7/1991 | Holzer et al. | 524/731 |
| 5,034,435 | 7/1991 | Squiller | 523/415 |
| 5,057,377 | 10/1991 | Karydas et al. | 428/447 |
| 5,071,904 | 12/1991 | Martin et al. | 524/458 |
| 5,075,370 | 12/1991 | Kubitza et al. | 524/591 |
| 5,104,737 | 4/1992 | Arora | 428/423.1 |
| 5,252,696 | 10/1993 | Laas et al. | 528/49 |
| 5,331,039 | 7/1994 | Blum et al. | 524/507 |

FOREIGN PATENT DOCUMENTS

| | | |
|---|---|---|
| 2082785 | 6/1993 | Canada . |
| 2088805 | 8/1993 | Canada . |
| 358979 | 3/1990 | European Pat. Off. . |
| 0 516 277 A1 | 2/1992 | European Pat. Off. . |
| 469 389 A1 | 5/1992 | European Pat. Off. . |
| 3903804 | 8/1990 | Germany . |
| 4226243 | 2/1994 | Germany . |
| 4226270 | 2/1994 | Germany . |
| 8602655 | 5/1986 | WIPO . |

OTHER PUBLICATIONS

*Paint & Powder*, pp. 30–31, Dec. 1993, "Polyurethane Topcoats Under Test", Jacobs et al.

*Journal of Coatings Technology*, pp. 45–50, vol. 65, No. 822, Jul. 1993, "Two–Components Water–Borne Polyurethane Coatings", Jacobs et al.

*Macromolecules*, 1980, vol. 13, pp. 117–121, "Properties of Segmented Polyether Poly(urethaneures) Based on 2,4–Toluene Diisocyanate", Sung et al.

*Proceedings of the 19th Water–Borne, Higher Solids, & Powder Coatings Symposium*, 1992, "Two–Component Water–Borne Polyurethane Coatings", Jacobs et al.

Primary Examiner—Erma Cameron
Attorney, Agent, or Firm—Janice L. Dowdall

[57] ABSTRACT

The present invention relates to two-part reactive polyurethane compositons and the cured coatings prepared therefrom. The invention also relates to particular compositions and cured coatings therefrom that exhibit high damping character, excellent scratch-resistance, excellent mar-resistance, and self-healing characteristics. The invention also relates to a novel polyurethane prepolymer useful in some of the compositions. The invention also relates to method of making certain coatings of the invention.

46 Claims, 17 Drawing Sheets

REACTIVE TWO-PART POLYURETHANE COMPOSITIONS AND OPTIONALLY SELF-HEALABLE AND SCRATCH-RESISTANT COATINGS PREPARED THEREFROM

FIELD OF THE INVENTION

The present invention relates to water-based and non-water based two-part reactive polyurethane compositions. The invention also relates to particular compositions that upon cure exhibit high damping character, excellent scratch-resistance, excellent mar-resistance, and self-healing characteristics. The invention also relates to a novel polyurethane prepolymer useful therein. The invention also relates to the cured coatings prepared from the novel compositions.

BACKGROUND OF THE INVENTION

Solvent-based two-part reactive polyurethane (PUR) compositions have been known for their excellent performance in industry for many years. However, the increasing demands on industry to reduce solvent emissions has limited the use of these solvent-based P PUR compositions significantly. Furthermore, these compositions essentially have no distinct self-healing characteristics at room temperature (no self-healing in 3-7 days at 25°). There are no known water-based 2-part or 1-part polyurethane compositions. One of the alternatives that is being widely used to reduce volatile organic compounds (VOC) is a one-part water-based slightly crosslinked polyurethane-urea dispersion. This type of water-based polyurethane-urea dispersion can be further crosslinked by using a polyaziridine, a melamine, an epoxy, a metal complex (zinc or zirconium), or a multi-functional carbodiimide. The additional crosslinking, accomplished via carboxyl functional groups, is low. Coatings made from this type of dispersion, thus, typically demonstrate a lack of thermal stability. As a result, the outdoor durability and weatherability as well as solvent-, water-, and chemical-resistance of this insufficiently crosslinked water-based 1-part polyurethane-urea is inferior to the solvent-based 2-part reactive PUR systems. Moreover, the known large urea content has a great tendency to cause the resultant coating to yellow.

Investigators have attempted to overcome the short comings of conventional water-based polyurethane-urea dispersions in several ways (i.e., by increasing crosslinking and decreasing urea content). So far, the attempts have not been completely successful.

The following are methods of making 1-part water-based polyurethane-urea compositions, none of which are self-healing.

A first method is to prepare highly crosslinked (and thereby potentially thermally stable) NCO-terminated polyurethane prepolymers in a limited amount of organic solvent and then chain-extend the prepolymers with a diamine while dispersing into water. The disadvantage of this first method is that the solution viscosity of this type of dispersion increases very rapidly during the dispersing step and most of the time a poor dispersion (along with a tendency to form large micelles) results and gelation of the dispersion can occur.

A second method to develop a thermally stable water-based system involves the use of a poly-functional amine chain extender while dispersing an NCO-terminated polyurethane prepolymer into water. Again, the problems encountered are the same as those encountered in the first method.

A third method of obtaining thermally stable water-based polymer systems is described in European Patent Application No. 469389. This third method demonstrates the co-reaction of isocyanate functional materials with hydroxyl functional materials and water. The reaction product, though it demonstrates an increasing thermal stability, is, as indicated above, a polyurethane-urea system. Polyurethane-urea systems have a number of disadvantages, including a tendency to yellow over time.

Thus, although water-based polyurethane-ureas exist, there are no known water-based polyurethanes. Polyurethane-ureas are inferior to polyurethanes due to their poorer thermal stability, outdoor durability, and weatherability as well as their tendency to yellow.

SUMMARY OF THE INVENTION

A need thus exists for a water-based polyurethane composition. A need also exists for non-aqueous-based polyurethane compositions which can provide improved properties compared to known materials. We have discovered a novel water-based reactive 2-part polyurethane composition with low volatile organic compound (VOC) content [i.e., typically less than about 10% by weight VOC based upon the total weight of the 2-part system (Part A plus Part B)]. The polyurethane prepared therefrom has a high crosslink density and good thermal stability. The water-based reactive 2-part PUR system upon combination and cure provides a PUR having mechanical and thermal properties similar to those of a solvent-based reactive two-part PUR system. The present invention contains water and typically less than about 10% coalescing organic solvent based upon the total weight of the 2-part system, whereas conventional solvent-based PURs contain 35% to 75% organic solvent.

One aspect of the present invention provides an aqueous dispersion of a semi-crosslinked and multi-hydroxyl functional urethane prepolymer and/or various water reducible hydroxyl containing material(s), which is "Part A" of the water-based reactive 2-part polyurethane system of the invention.

Part A

For the aqueous-based compositions of the invention, Part A is an aqueous composition (typically a dispersion) which comprises:

(a) optionally a water-reducible urethane prepolymer, wherein the prepolymer has:
  (i) a sufficient number of carboxylic acid functional groups such that the acid number of the prepolymer ranges from about 10 to 100;
  (ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;
  (iii) an average hydroxyl functionality of the prepolymer of about 1.85 to about 2.7; and
  (iv) a hydroxyl equivalent-weight of the prepolymer in the range of about 500 to about 5000;

(b) optionally a water-reducible first acrylic polymer having at least one hydroxyl functional group and optionally 1 or more carboxyl functional groups, wherein the water-reducible first acrylic polymer has an acid number in the range of about 0 to about 150;

(c) optionally a water-reducible second acrylic polymer free of hydroxyl functionality and optionally having 1 or more carboxyl functional groups, wherein the water-reducible second acrylic copolymer has an acid number in the range of about 0 to about 150;

(d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, the water-reducible first compound having a hydroxyl equivalent weight in the range of about 200 to about 2000;

(e) optionally a water-reducible second compound selected from the group consisting of diols and polyols wherein the water-reducible second compound optionally has one or more pendant carboxyl functional groups;

(f) water;

(g) optionally a surfactant; and (h) optionally a coalescing solvent;

wherein at least one of the following elements is present:

(a), (b), (c), (d), (e);

wherein when element (c) is present, at least one of the following elements must also be present:

(a), (b), (d), (e);

and wherein not greater than about 35 weight percent total of segment(s) of element (a)(ii) plus compound(s) of element (d) are present based upon the total solids content of Part A; and wherein the NCO to OH ratio of the components in the combination of Part B and Part A ranges from about 1:1 to about 1.15:1.

Part B

For the aqueous-based compositons of the invention, Part B is a composition (typically a water-reducible composition) which comprises (i) a crosslinker selected from the group consisting of polyisocyanates, blocked polyisocyanates, and mixtures thereof; and (ii) optionally a coalescing solvent based upon the total weight of Part B.

Part A and Part B for the non-aqueous-based compositions of the invention are described below. For both the aqueous-based and non-aqueous-based compositions of the invention, Part A is curable in the presence of blocked polyisocyanate crosslinker by application of heat or the presence of polyisocyanate crosslinker under staged curing conditions to obtain PURs with high crosslink density which is usually required to yield cured systems that exhibit thermal stability.

For the aqueous-based systems of the invention, Part A preferably comprises a combination of components selected from the group consisting of:

(a), (e), (f), (g), (h);

(a), (b), (c), (f), (g), (h);

and (a), (b), (f), (g), (h).

I have further discovered a particular reactive 2-part crosslinkable polyurethane system which exhibits high damping, excellent mar-resistance, excellent scratch-resistance, and excellent self-healability upon cure which can be prepared from non-aqueous-based 2-part systems of the invention and certain aqueous-based compositions of the invention. The thermosetting coatings of the invention would not be expected to have self-healing properties because in general they are stiff and highly crosslinked materials. I theorize that the high damping PUR of the invention prepared from this particular 2-part system of the invention can store the energy that may be applied to the PUR surface and use the stored energy to reconfigure or to overcome the rotational or vibrational strain barriers of the twisted and/or distorted polymer backbones and/or side-chains so as to result in a thermodynamically stable configuration or microstructure. I refer to this phenomenon as "self-healability" (which is measured according to Test "E" in the Examples). According to the test results discussed infra, the larger the damping factor of the PUR, the faster and easier the scratched surface can self-heal. However, the test results also indicate that other factors, such as the PUR's elastomeric properties (storage modulus), the ease of chain slippage (storage modulus), the glass transition temperature range, test temperature, and the degree of crosslink density, may also play an important role in the self-healing process and provide a so-called synergistic effect.

For the aqueous-based composition of the invention to demonstrate self-healability and for the self-healable non-aqueous-based composition of the invention, Part A must comprise about 2 to about 35 weight percent total of prepolymer segment(s) of element (a)(ii) plus water-reducible first compound(s) of element (d) based upon the solids content of Part A in order for the cured PUR to possess excellent scratch-resistance and self-healability. (Part A may comprise just (a)(ii), just (d), or both (a) and (d) as long as the total weight falls within the indicated range). If Part A comprises less than about 2 weight percent total of segment (s) of element (a)(ii) plus compounds of element (d) based upon the total solids content of Part A, good self-healability and scratch-resistance will not be obtained. Part A preferably comprises about 2 to about 20 weight percent total of (a)(ii) and (d) for the best self-healability, and outdoor durability. If Part A comprises greater than about 35 weight percent total of (a)(ii) and (d), the resulting PUR may not be transparent, may have poor outdoor durability, and may have high porosity.

For non-aqueous-based compositions of the invention, Part A is a non-aqueous composition comprising:

(a) optionally a urethane prepolymer, wherein said prepolymer has:
  (i) optionally carboxylic acid functional groups such that the acid number of the prepolymer ranges from about 0 to 100;
  (ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment (s), and combinations thereof;
  (iii) an average hydroxyl functionality of the prepolymer of about 1.85 to about 2.7;
  (iv) a hydroxyl equivalent-weight of the prepolymer in the range of about 500 to about 5000;

(b) optionally an organic solvent-reducible first acrylic polymer having at least one hydroxyl functional group and optionally 1 or more carboxyl functional groups such that said first acrylic polymer has an acid number in the range of about 0 to about 150;

(c) optionally an organic solvent-reducible second acrylic polymer free of hydroxyl functionality and optionally having 1 or more carboxyl functional groups, wherein said second acrylic polymer has an acid number in the range of about 0 to about 150;

(d) optionally an organic solvent-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;

(e) optionally an organic solvent-reducible second compound selected from the group consisting of diols and polyols wherein said second compound optionally has one or more pendant carboxyl functional groups;

(f) optionally a nonionic surfactant; and (g) optionally an organic solvent;

wherein at least one of the following elements is present:
element(a) having a segment (i);
element (d); and
wherein about 2 to about 35 weight percent total of segment(s) of element (a)(ii) plus compound(s) of element (d) are present based upon the total solids content of Part A; and wherein Part B is a non-aqueous organic solvent-reducible composition which comprises:

(1) a crosslinker selected from the group consisting of polyisocyanates, blocked polyisocyanates, and mixtures thereof; and (2) optionally an organic solvent;

wherein the NCO:OH ratio of Part B to Part A ranges from about 0.95:1 to about 1.07:1.

For the non-aqueous-based systems of the invention, Part A preferably comprises a combination of components selected from the group consisting of:

(b), (d), (e), (f), (g); (a), (b), (e), (f), (g); and (a), (b), (d), (e), (f), (g).

The present invention also provides a novel urethane prepolymer useful in the 2-part reactive water-based PUR system. A preferred version of the prepolymer surprisingly can be used to provide a PUR having excellent scratch-resistance and self-healability.

The novel urethane prepolymer has (a) a sufficient number of carboxylic acid functional groups such that the acid number of the prepolymer ranges from about 10 to about 100;

(b) a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;

(c) an average hydroxyl functionality of about 1.85 to about 2.7; and (d) a hydroxyl equivalent weight in the range of about 500 to about 5000.

Typically, the prepolymer comprises about 0.1 to about 35 weight percent of the segment of element (b), most preferably about 2 to about 20 weight percent, based upon the total weight of the prepolymer, in order to provide a prepolymer which can yield a PUR with good scratch-resistance and self-healability.

I have also discovered several methods of preparing the cured polyurethane of the invention from aqueous-based compositions of the invention. The first method relates to the use of an unblocked polyisocyanate crosslinker. The second and third methods relate to the use of blocked polyisocyanate crosslinkers.

A first method comprises the steps of:

(I) combining Part A and Part B to form a mixture, wherein the crosslinker of Part B is selected from the group consisting of polyisocyanates (unblocked) and mixtures thereof;

(II) coating the mixture on a substrate;

(III) exposing the coated substrate to a temperature high enough to evaporate at least about 90% by weight of the water present in the mixture but low enough so as not to initiate reaction between water and isocyanate groups present on the polyisocyanate;

(IV) curing the coating by a step selected from the group consisting of:

(1) exposing the coated substrate to a temperature high enough to cure the coating until the coating is cured but not so high as to degrade the substrate;

(2) exposing the coated substrate to a temperature sufficient to partially cure the coating to a tack-free state without degrading the substrate, followed by exposure to a lower temperature at which it is still capable of being cured until the coating is cured.

Preferably, the NCO:OH ratio for this method is 1:1 to about 1.15:1.

A second method comprises the steps of:

(I) combining Part A and Part B to form a mixture, wherein the crosslinking agent is selected from the group consisting of blocked polyisocyanates and mixtures thereof;

(II) coating the mixture on a substrate;

(III) exposing the coated substrate to a temperature sufficient to deblock the blocked polyisocyanate without degrading the substrate; and (IV) exposing the coated substrate to a temperature sufficient to cause curing of the coating without degrading the substrate until the coating is cured.

Preferably, the NCO:OH ratio for this method is about 1:1 to about 1.1:1.

A third method comprises the steps of:

(I) combining Part A and Part B to form a mixture, wherein the crosslinking agent is selected from the group consisting of blocked polyisocyanates and mixtures thereof;

(II) coating the mixture on a substrate;

(III) exposing the coated substrate to a temperature sufficient to evaporate at least about 90% of the water present in the mixture but too low to deblock the blocked isocyanate crosslinker; and (IV) exposing the coated substrate to a temperature sufficient to deblock the blocked polyisocyanate crosslinker and cure the coating, without degrading the substrate, until the coating is cured.

Preferably, the NCO:OH ratio for this method is about 1:1 to about 1.1:1.

The present invention also provides the curable composition which is Part A.

The term "water reducible" as used herein refers to a composition that is "water soluble and/or water emulsifiable and/or water dispersible".

The term "organic solvent reducible" as used herein refers to a composition that is "organic solvent soluble and/or organic solvent dispersible".

The term "self healing" as used herein is defined in Test E.

DETAILED DESCRIPTION OF THE INVENTION

Part A

Figure 1:
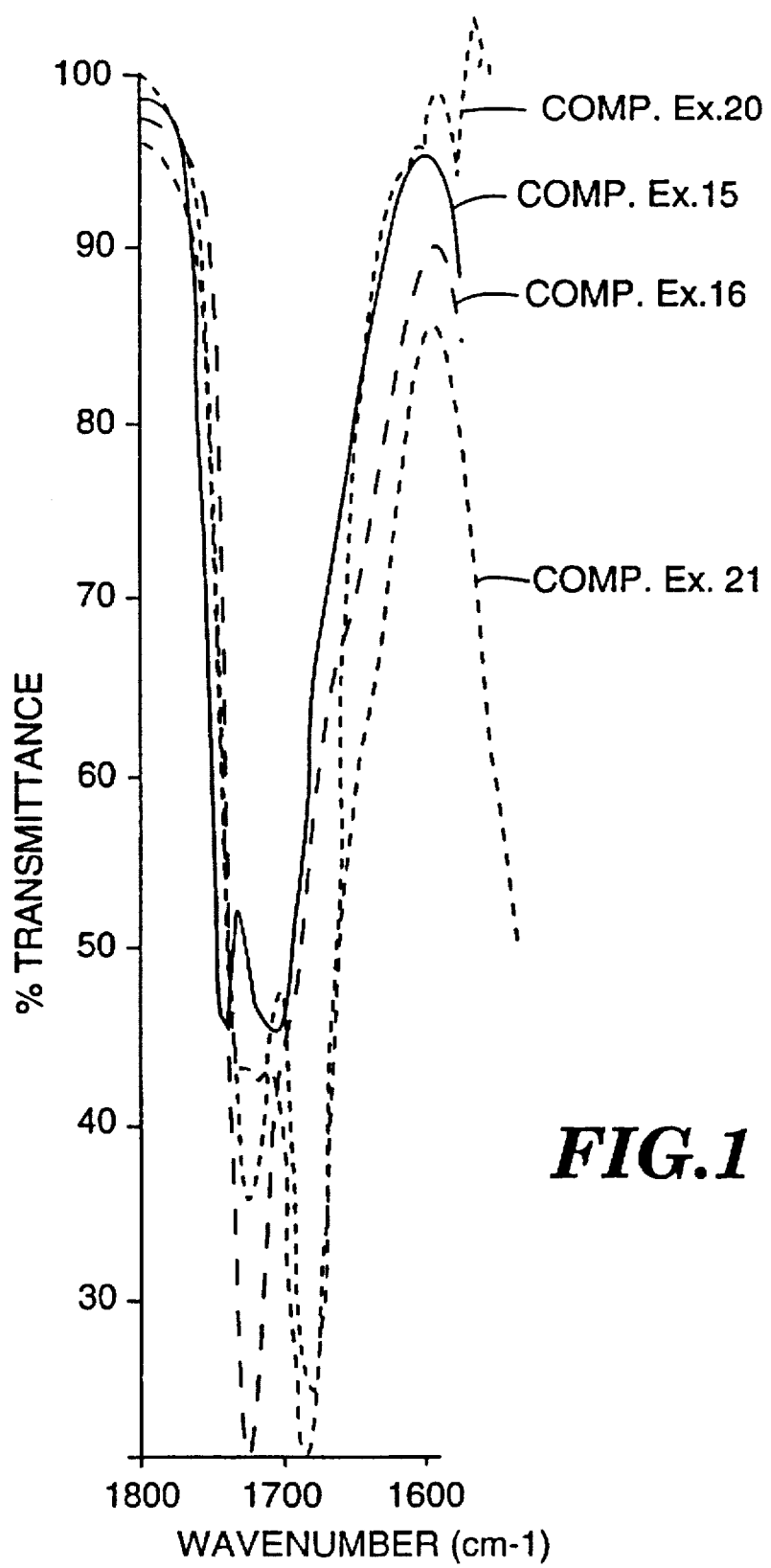
FIG. 1 illustrates the Fourier Transform Infrared (FTIR) absorption band or spectrum of the Comparative Examples 15, 16, 20 and 21.

The components of Part A may be combined in any order.

Typically,for an aqueous-based system the components are charged into a vessel in the following order: polyol(s) (typically in the form of an aqueous dispersion) and/or polyurethane prepolymer (typically in the form of an aqueous dispersion), optional surfactant, optional coalescing solvent, optional catalyst, and water. (However, water may not be added at this point if it has been previously added as part of any of the aforementioned dispersions.)

Typically for a non-aqueous-based system the components are charged into a vessel in the following order— polyol(s) (typically in the form of an organic solvent solution) and/or polyurethane prepolymer (typically in the form of an organic solvent solution), optional surfactant, optional catalyst, and optional organic solvent. (However, optional organic solvent may not be added at this point if it has been previously added as part of any of the aforementioned dispersions.)

A.I

Urethane Prepolymer

Part A typically comprises about 0 to about 60 weight percent of urethane prepolymer, preferably about 0 to about 45 weight percent, most preferably about 0 to about 35 weight percent based upon the total weight of Part A.

The urethane prepolymer discussed supra useful in aqueous-based systems has an acid number of about 10 to about 100, preferably about 10 to about 50, most preferably about 10 to about 35, for more improved water resistivity. If the acid number is less than about 10, the prepolymer may disperse poorly in water. If the acid number is greater than about 100 the prepolymer disperses easily in water but the resultant cured polyurethane formed from Parts A and B may also demonstrate poor water and/or moisture resistance.

The urethane prepolymer discussed supra useful in non-aqueous-based systems has an acid number of about 0 to about 100, preferably less than about 50, most preferably less than about 35, for more improved water resistivity. If the acid number is greater than about 100 the resultant cured polyurethane formed from Parts A and B may also demonstrate poor water and/or moisture resistance.

For the prepolymers useful in both the aqueous-based systems and the non-aqueous-based systems the segment selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof is optional.

However, the segment is included in the novel prepolymer of the invention. Typically, each segment has an equivalent weight ranging from about 200 to about 2000. If the hydroxyl functionality is 2 or less (the prepolymer is linear), the segment(s) would be incorporated into the polymer chain backbone, internally and/or at a terminal position(s). If the hydroxyl functionality is greater than 2 (the prepolymer is branched or crosslinked), the segment(s) may be incorporated into the polymer backbone chain as in the linear case and/or grafted onto the polymer chain backbone, which grafted segment(s) may crosslink with other portions of the prepolymer. A prepolymer containing a certain amount of the segment provides a resultant cured polyurethane which "self-heals". Typically, the prepolymer comprises about 0 to about 35 weight percent of the segment (typically about 0.1 to about 35 weight percent, if included); preferably about 2 to about 20 weight percent, based upon the total weight of the prepolymer. If the prepolymer contains greater than about 35 percent of the segment, the resultant cured PUR may be hazy due to incompabitibility between the low surface tension siloxane or fluorinated segments and other polymer segments or urethane linkages in the cured PUR and may have poor outdoor durability due to high porosity caused by the siloxane. If the prepolymer contains less than about 2 weight percent of the segment, the resultant cured PUR may not have sufficient scratch-resistance and self-healability (most likely due to a lack of polymer chain slippage) unless alkyl siloxane diols/diamines and/or fluorinated diols/diamines are also included in Part A.

The urethane prepolymer has an average hydroxyl functionality of about 1.85 to about 2.7, preferably about 2 to about 2.5. If the hydroxyl functionality is less than about 1.85 the resulting cured PUR prepared from the prepolymer may have poor thermal stability and/or poor outdoor durability. If the hydroxyl functionality is greater than about 2.7, the prepolymer may disperse poorly in water. Depending upon the hydroxyl functionality, the prepolymer may be linear, branched, or crosslinked. If the hydroxyl functionality is 2 or less, the prepolymer will be linear. If the hydroxyl functionality is greater than 2, the prepolymer will be branched or crosslinked.

The prepolymer has a hydroxyl equivalent weight in the range of about 500 to about 5000, preferably about 750 to about 4000, most preferably about 1000 to about 3500. If the hydroxyl equivalent weight of the prepolymer is too high, the resulting cured PUR may be soft and it may have inferior thermal stability and/or outdoor durability. If the hydroxyl equivalent weight of the prepolymer is too low, the cured PUR formed therefrom may require a longer cure time or tack-free time, and the resulting cured PUR may be too stiff, brittle, or rigid.

The urethane prepolymer useful in Part A of the composition of the aqueous-based composition of the invention typically comprises the reaction product of:

(a) a diisocyanate;

(b) a carboxyl-functional diol having a hydroxyl equivalent weight in the range of up to about 2000 and a sufficient number of carboxyl groups such that the diol has an acid number of less than about 420;

(c) optionally a first compound selected from the group consisting of polyalkyl siloxane diols, polyalkyl siloxane diamines, fluorinated-polyether diols, fluorinated polyether diamines, fluorinated-polyester diols, fluorinated-polyester diamines, and mixtures thereof, the first compound having a hydroxyl equivalent weight in the range of about 200 to about 2000;

(d) optionally a polymeric diol;

(e) optionally a chain extender selected from the group consisting of diol chain extenders, triol chain extenders, and mixtures thereof;

wherein about 0 to about 15 weight percent of triol chain extender is present based upon the total weight of the prepolymer; and wherein the NCO:OH ratio of components from which the prepolymer is made ranges from about 1:1.3 to about 1:1.9, preferably about 1:1.4 to about 1:1.7.

The urethane prepolymer useful in Part A of the composition of the non-aqueous-based composition of the invention typically comprises the reaction product of:

(a) a diisocyanate;

(b) optionally a carboxyl-functional diol having a hydroxyl equivalent weight in the range of up to about 2000 and a sufficient number of carboxyl groups such that the diol has an acid number in the range of about 0.1 to about 420;

(c) optionally a first compound selected from the group consisting of polyalkyl siloxane diols, polyalkyl siloxane diamines, fluorinated-polyether diols, fluorinated polyether diamines, fluorinated-polyester diols, fluorinated-polyester diamines, and mixtures thereof, the first compound having a hydroxyl equivalent weight in the range of about 200 to about 2000;

(d) a polymeric diol;

(e) optionally a chain extender selected from the group consisting of diol chain extenders, triol chain extenders, and mixtures thereof;

wherein about 0 to about 15 weight percent of triol chain extender is present based upon the total weight of the prepolymer; and wherein the NCO:OH ratio of components from which the prepolymer is made ranges from about 1:1.3 to about 1:1.9, preferably about 1:1.4 to about 1:1.7.

A.I.i.

Diisocyanates

The prepolymer is typically formed from about 15 to about 55 weight percent diisocyanate, preferably about 15 to about 45 weight percent, and most preferably about 15 to about 35 weight percent, based upon the total weight of the prepolymer.

Examples of diisocyanates useful in forming the urethane prepolymer include but are not limited to those selected from the group consisting of aliphatic diisocyanates, aromatic diisocyanates, and mixtures thereof. Aliphatic diisocyanates are preferred to avoid yellowing of the resultant cured polyurethane prepared from the prepolymer.

Examples of useful specific diisocyanates include but are not limited to those selected from the group consisting of 1,4-tetramethylene diisocyanate; 1,6-hexamethylene diisocyanate; 1,3-cyclohexane diisocyanate; 1,4-cyclohexane diisocyanate; 1,3-xylene diisocyanate; 1,4-xylene diisocyanate; tetramethylxylylene diisocyanate; isophorone diisocyanate; 1,12-dodecane diisocyanate; 2,4-diclyohexylmethane diisocyanate; 4,4'-trimethylhexane-1,6,-diisocyanate; 2-methylpentamethylene diisocyanate; cyclobutane-1,3-diisocyanate; 2,4-diphenylmethane diisocyanate; 4,4'-diphenylmethane diisocyanate; 2,4-toluene diisocyanate; 2,6-toluene diisocyanate; 1,3-phenylene diisocyanate; 1,4-phenylene diisocyanate; napthalene-1,5-diisocyanate; diphenyl methane-2,4'-diisocyanate; diphenyl methane-4,4'-diisocyanate; and mixtures thereof.

A.I.ii.

Carboxyl-Functional Diol

The prepolymer is typically formed from about 0.1 to about 65 weight percent carboxyl-functional diol, preferably about 0.1 to about 55 weight percent, and most preferably about 0.1 to about 45 weight percent, based upon the total weight of the prepolymer.

The carboxyl-functional diol typically has a hydroxyl equivalent weight of up to about 2000 (more typically about 60 to about 2000) and typically a sufficient number of carboxyl groups such that the diol has an acid number in the range of about 20 to about 420. If the hydroxyl equivalent weight is greater than about 2000, a greater amount of chain extender would be required to provide a prepolymer which can be used to prepare a cured PUR with good thermal stability.

If the carboxyl-functional diol has a low acid number a greater amount of the diol should be used in preparing the prepolymer so that the prepolymer formed therefrom has the required carboxyl-functionality. If too little carboxyl-functional diol is included or if the acid number of the diol is less than about 20, the prepolymer may have poor water dispersibility unless a large amount of carboxyl-functional diol and/or alternate carboxyl group source is added. If the acid number of the diol is greater than about 420 and/or if too much carboxyl-functional diol is included, the resultant cured polyurethane may have poor water-resistance.

A.I.iii.

Alkyl Siloxane Diols/Diamines and Fluorinated Diols/Diamines

Compounds which may optionally be used in preparing the prepolymer useful in Part A of the invention but which are required to form the novel prepolymers of the invention include those selected from the group consisting of polyalkyl siloxane diols, such as ethylene oxide-terminated polydimethyl siloxane, propylene oxide-terminated polydimethyl siloxane, such as

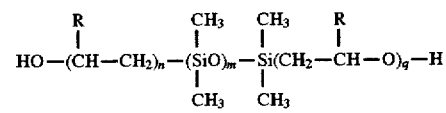

wherein R is independently selected from the group consisting of —H and —CH$_3$ and n=1 or greater, q=1 or greater, m=2–25, etc.; polyalkyl siloxane diamines such as aminopropyl-terminated polydimethyl siloxane, aminoethyl-terminated polydimethyl siloxane, etc.; fluorinated polyether diols such as

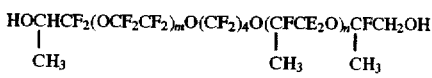

wherein m and n are each equal to 3, and the nominal molecular weight is about 1300, HOCH$_2$CF$_2$O(CF$_2$CF$_2$O)$_m$(CF$_2$O)$_n$CH$_2$OH, wherein the ratio of m/n is about 0.8 and the nominal molecular weight is about 2000, etc.; fluorinated polyether diamines; fluorinated polyester diols; and fluorinated polyester diamines.

The prepolymer is typically formed from about 0 to about 35 weight percent of the aforementioned compounds, typically about 0.1 to about 35 weight percent if included, preferably about 2 to about 20% weight percent, based upon the total weight of the prepolymer. If too much is included, the resultant cured PUR prepared from the prepolymer may be hazy due to incompatibility between the low surface tension siloxane or fluorinated segments and other polymer segments or urethane linkages in the cured PUR. Also the cured PUR may show poor outdoor durability due to high porosity caused by siloxane. If too little is included, the resultant cured PUR may not be self-healing unless additional compound is added to Part A.
A.I.iv Polymeric Diols and Diol/Triol Chain Extenders The polyurethane prepolymer may optionally have incorporated therein a polymeric diol and/or triol chain extender and/or diol chain extender. To achieve desired properties, the following should be considered. If the eqivalent weight of the polymeric diol is large (about 4000 or greater, for example), chain extender may be required. If the equivalent weight of the polymeric diol is small (about 400 or less, for example), no chain extender may be necessary.

If Part A comprises too much polymeric diol, the cured PUR prepared therefrom may be too soft. If Part A comprises too much chain extender, the cured PUR prepared therefrom may be too rigid for a particular application.
A.I.iv.a.

Polymeric Diols

The polymeric diols may be members of any of the chemical classes of polymeric diols used or proposed to be used in polyurethane formulations. In particular, they may be polyesters, polyesteramides, polyethers, polythioethers, polycarbonates, polyacetals, polyolefins, etc. Typically, the equivalent weight of the polymeric diols ranges from about 400 to 4000.

Polyester diols which may be used include but are not limited to those selected from the group consisting of hydroxyl-terminated reaction products of dihydric alcohols such as ethylene glycol, propylene glycol, diethylene glycol, neopentyl glycol, 1,4-butanediol, furan dimethanol, cyclohexane dimethanol or polyether diols, or mixtures thereof, with dicarboxylic acids or their ester-forming derivatives, for example succinic, glutaric and adipic acids or their methyl esters, phthalic anhydride or dimethyl terephthalate. Polyesters obtained by the polymerization of lactones, for example carpolactone, in conjunction with a diol may also be used. Polyesteramides may be obtained by the inclusion of aminoalcohols such as ethanolamine in polyesterification mixtures.

Polyether diols which may be used include but are not limited to products obtained by the polymerization of a cyclic oxide, for example ethylene oxide, propylene oxide or tetrahydrofuran or by the addition of one or more such oxides to difunctional initiators, for example water, ethylene glycol, propylene glycol, diethylene glycol, cyclohexane dimethanol, or Bisphenol A. Examples of specific useful polyethers include but are not limited to those selected from the group consisting of polyoxypropylene diols, poly (oxyethylene-oxypropylene) diols obtained by the simultaneous or sequential addition of ethylene and propylene oxides to appropriate initiators and polytetramethylene ether glycols obtained by the polymerization of tetrahydrofuran.

Polycarbonate diols which may be used include but are not limited to products obtained by reacting diols such as 1,3-propanediol, 1,4-butanediol, 1,6-hexanediol, diethylene glycol of tetraethylene glycol with diaryl carbonates, for example diphenyl carbonate, or with phosgene.

Polyacetal diols which may be used include but are not limited to those prepared by reacting glycol or hexanediol with formaldehyde. Suitable polyacetals may also be prepared by polymerizing cyclic acetals.

Suitable polyolefin diols include but are not limited to hydroxy-terminated butadiene homopolymers and copolymers.

The prepolymer is typically formed from about 0 to about 70 weight percent of a polymeric diol, preferably about 0 to about 55 weight percent, more preferably about 0 to about 45 weight percent, based upon the totle weight of the prepolymer. The equivalent weight of the polymeric diol typically ranges from about 400 to about 4000 based on solid polymeric diol. If the equivalent weight is too high and/or too much polymeric diol is used, the resulting cured PUR may be too soft and have poor thermal stability.

If the equivalent weight of the polymeric diol is too low and/or too little polymeric diol is used, depending upon the other components used the resulting PUR may be too hard.
A.I.iv.b.

Diol and Triol Chain Extenders

A chain extender is optional in forming the prepolymer. Examples of suitable diol chain extenders useful herein include but are not limited to those selected from the group consisting of 1,2-cyclohexanediol; 1,2-propanediol; 1,3-propanediol; 1,4-butanediol; 1,6-hexanediol; 1,8-octanediol; 2,2,4-trimethyl-1,3 pentanediol; 2-ethyl-1,3-hexanediol; 1,2-hexanediol; 1,2-octanediol; 1,2-decanediol; and 2,2,4-trimethyl-1,3 pentane diol. Examples of suitable triol chain extenders include but are not limited to those selected from the group consisting of glycerine, trimethylol propane, trimethylol propane tripropoxylate, trimethylolpropane triethoxylate. Other triols such as caprolactone-modified trimethylol propane supplied by Union Carbide Corporation under the tradenames of Tone™ -301, -303 and -305 are also useful. The prepolymer is typically formed from about 0 to about 15 weight percent of a triol chain extender, preferably about 0 to about 10 weight percent. If the prepolymer contains more than about 15 weight percent triol chain extender, the PUR prepolymer may be difficult to disperse in water or in organic solvent.

The prepolymer is typically formed from about 0 to about 50 weight percent (more typically about 0.1 to about 50 weight percent, if used) of a diol chain extender, preferably about 0 to about 40 weight percent, most preferably about 0 to about 30 weight percent based upon the total weight of the prepolymer. If too much diol chain extender is present the cured PUR may be too hard, (i.e. the storage modulus would be too high. Storage modulus is discussed in infra.)
A.I.v.c.

Prepolymer Reaction

The prepolymer may be formed by combining the components, including an organic solvent to control the viscosity, in any order, in a reaction vessel with agitation. The reaction is typically conducted at a temperature of about 75° to about 105° C. under inert conditions (such as a nitrogen blanket in the presence of a catalyst). Examples of suitable catalysts include dibutyltin dilaurate, stannous octoate, dimethyltin dichloride, organotin carboxylate, mixtures thereof, etc. Typically, about 0 to 2000 ppm (more typically 1 to 2000 ppm), preferably about 0 to 1000 ppm, most preferably about 0 to 500 ppm, based upon the total weight of the reaction mixture (solvent plus other components) is used.

A.II.

Water/Solvent

For aqueous-based compositions, Part A comprises an amount of water, typically deionized water, to control viscosity. The water may be added to Part A by itself or in combination with another compound such as in the form of an acrylic polymer emulsion, a prepolymer dispersion, etc. Viscosity requirements for Part A and more particularly for the combination of Part A and Part B, are dictated by the coating application, such as screen, spray, roll coating, brush coating, etc. For example, spray and screen coating methods require a low viscosity.

For aqueous-based compositions, Typically Part A comprises sufficient water such that the percent solids range for Part A is from about 15 to about 75%. If Part A contains too little water, the composition formed upon combination of Part A and Part B may be too thick for coating purposes. Typically sufficient deionized water should be present such that Part A has a Brooksfield viscosity of about 10 to about 2000 cps, preferably about 10 to about 1000 cps.

For aqueous-based compositions, typically, the solids content of the combination of Parts A and B ranges from about 15 to about 65, preferably about 15 to about 50. Preferably the Brookfield viscosity of the combination of Parts A and B ranges from about 10 to about 2000 cps, preferably about 10 to about 1000 cps.

In the non-aqueous-based compositions Typically Part A comprises organic solvent such that the percent solids range for Part A is from about 15 to about 85%. If Part A contains no or insufficient organic solvent, the composition formed upon combination of Part A and Part B may be too thick for coating purposes. Typically sufficient organic solvent should be present such that Part A has a Brooksfield viscosity of about 10 to about 2000 cps, preferably about 10 to about 1000 cps.

Typically, the solids content of the combination of Parts A and B for a non-aquoeous-based composition ranges from about 15 to about 85 percent, preferably about 30 to about 85 percent. Preferably the Brookfield viscosity of the combination of Parts A and B ranges from about 10 to about 2000 cps, preferably about 10 to about 1000 cps.

A.III

Surfactant

Part A may optionally further comprise a surfactant. Part A may comprise a sufficient amount of surfactant, if needed, such that a uniform coating or film results. Part A typically comprises about 0 to about 10 percent by weight of a surfactant based upon the total weight of Part A, (more typically about 0.1 to about 10 weight percent if included) preferably about 0.1 to about 5 percent by weight, most preferably 0.1 to about 3 percent by weight, so as to obtain a final cured PUR with good water and/or moisture resistivity and good outdoor durability and weatherability. If too much surfactant is included, the resultant cured PUR may have poor moisture resistivity which may also result in poor outdoor durability. If too little surfactant is included, the mixture of Part A and Part B will not demonstrate sufficient surface wetting upon coating. The composition formed upon combination of Part A plus Part B typically comprises less than about 10 weight percent surfactant based upon the total weight of Part A plus Part B, typically about 0 to about 8 weight percent (more typically about 0.1 to about 8 weight percent, if included). Surfactant serves to lower the surface tension and improve the coating coatability. The surface tension required depends upon the substrate to be coated.

Useful surfactants for aqueous-based compositions include but are not limited to those selected from the group consisting of anionic, nonionic, and cationic surfactants.

Useful anionic surfactants for aqueous-based compositions include but are not limited to those selected from the group consisting of alkylbenzenesulfonic acid salts, sodium laurylbenzenesulfonate, sodium laurylnaphthalene sulfonate, sodium dioctyl sulfosuccinate, dioctyl phosphate salt, sodium oleate, sodium salt of semi-hard beef tallow, potassium oleate, potassium castor oil, sodium laurylalcohol sulfate, sodium polyacrylate, naphthalenesulfonic acid-formaldehyde condensate, sodium salt of polyoxyethylene octyl sulfate, sodium salt of polyoxyethylene octylphenyl sulfate, alkylnaphthalenesulfonic acid salts, dialkylsulfosuccinic acid salts, alkyl phosphate salts, fatty acid salts, higher alcohol sulfate salts, naphthalenesulfonic acid-formaldehyde condensates, polyoxyethylene sulfate salts, potassium fluoroalkyl carboxylate, ammonium perfluoroalkyl sulfonate, sodium fluoroalkyl sulfonate, and the like.

Examples of preferred anionic surfactants for aqueous-based compositions include those selected from the group consisting of potassium fluoroalkyl carboxylate, ammonium perfluoroalkyl sulfonate, and sodium fluoroalkyl sulfonate supplied by 3M under the tradenames of Fluorad™ FC-129, FC-99, and FC-100, respectively.

Useful nonionic surfactants for aqueous-based compositions include but are not limited to those selected from the group consisting of polyoxyethylene alkyl ethers, polyoxyethylene alkyl-phenyl ethers, polyoxyethylene acyl esters, sorbitan fatty acid esters, polyoxyethylene alkylamines, polyoxyethylene alkylamides, polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, polyethylene glycol laurate, polyethylene glycol stearate, polyethylene glycol distearate, polyethylene glycol oleate, oxyethyleneoxypropylene block copolymer, sorbitan laurate, sorbitan stearate, sorbitan distearate, sorbitan oleate, sorbitan sesquioleate, sorbitan trioleate, polyoxyethylene sorbitan laurate, polyoxyethylene sorbitan stearate, polyoxyethylene sorbitan oleate, polyoxyethylene laurylamine, polyoxyethylene laurylamide, laurylamine acetate, hard beef tallow propylenediamine dioleate, ethoxylated tetramethyldecynediol, fluoroaliphatic polymeric ester, polyether-polysiloxane copolymer, and the like.

Examples of preferred nonionic surfactants for aqueous-based compositions include but are not limited to those selected from the group consisting of ethoxylated tetramethyldecynediol available under the tradename Surfynol™ 440, 420, 465, and 485 from Air Products and Chemicals, fluorinated polymeric surfactants such as fluoroaliphatic polymeric ester available under the tradename Fluorad™ FC-430 from 3M, polyether-polysiloxane copolymer available under the tradename of Foamex™ -800, -805, and -810 supplied by Tego Chemie Service USA.

Useful cationic surfactants for aqueous-based compositions include but are not limited to those selected from the group consisting of aklylamine salts, polyoxyethylene alkylamine salts, alkylamine acetates, fluoroalkyl quaternary ammonium iodide, and the like.

Examples of preferred cationic surfactants for aqueous-based compositions include but are not limited to those selected from the group consisting of fluoroalkyl quaternary ammonium iodide available under the tradename Fluorad™ FC-135 available from The 3M Company.

For non-aqueous-based compositions useful surfactants include nonionic surfactants. All nonionic surfactants are organic solvent reducible and thus useful in the nonaqueous-based compositions of the invention. Useful nonionic surfactants include but are not limited to those selected from the group consisting of cellulose derivatives such as: cellulose acetate, cellulose acetate butyrate, cellolose acetate propionate cellulose acetate butyrate butanedioate which are available under the trade names of CAB-398-3, CAB-381-0.1, CAB-381-0.5, CAB-531.1, CAB-482-0.5, etc. supplied by Eastman Chemical. Examples of silicone nonionic surfactants are polyester modified polysiloxane polymers such as: BYK®-320 and 310 from BYK Chemie, polyether modified polysiloxanes such as: BYK®-306, 307, 321, 325, 331, and 344 from BYK Chemie or Tego® Glide 100, A-115, B-1484, Tego Flow 425 from Tego Chemie Service USA. Fluoronated materials such as: fluoroaliphatic polymeric esters (under the trade name of Fluorad® FC-430 and FC-431 from Minnesota Mining and Manufacturing Company) and amine perfluoroalkyl sulfonate (available under the trade name of Fluorad® FC-99), etc. are also useful nonionic surfactants. Other useful nonionic surfactants include those selected from the group consisting of silicone free acrylic polymers such as: Tego® Flow ZFS-460 from Tego Chemie Service USA, COROC®A-2201-M, A-620-A2, A-72-A260 and XA-4131-A2, and Modaflow® resin and Multiflow® resin from Monsanto, etc.
A.IV.

Coalescing Solvents

For aqueous-based systems, Part A may optionally further comprise a coalescing solvent (typically an organic solvent) according to the present invention. The coalescing solvent preferably should not have any functional groups that would cause it to be reactive with the polyisocyanate crosslinker of Part B. Examples of such isocyanate reactive groups include amino groups, hydroxyl groups, carboxyl groups, etc. One skilled in the art would be able to identify and distinguish functional groups that are reactive with isocyanate groups and those that are not.

Typically, a coalescing solvent would be used which has an evaporation rate of less than about 0.5 (with n-butyl acetate=1). If the evaporation rate is above about 0.5, the following problems may occur: the coalescing solvent may evaporate with the water during the curing steps after mixing Part A with Part B resulting in a poor film or coating (i.e. poorly textured and/or lacking clarity).

Examples of suitable coalescing solvents include but are not limited to those selected from the group consisting of N-methyl pyrrolidone, di-ethylene glycol butyl ether acetate, dimethyl formamide, diethylene glycol ethyl-ether acetate, ethylene glycol butyl ether acetate, Texanol™ 2,2,4-trimethyl-1,3-pentanediol mono(2-methyl propanoate) available from Eastman Chemical, ethylene glycol diacetate, and other similar solvents containing no isocyanate reactive groups. For aqueous-based systems, Part A should contain sufficient coalescing solvent, if necessary, such that good film forming characteristics of the composition formed from Parts A and B can be obtained. Preferably,for aqueous-based systems, Part A comprises about 0 to about 10 weight percent coalescing solvent based upon the total weight of Part A, most preferably about 0 to about 6 percent. For environmental reasons, it is desired to use the smallest amount of coalescing solvents possible and still obtain smooth, consistent, and transparent films or coatings.
A.V.

Acrylic Polymer

Part A of the two-part composition of the invention can optionally further comprise an acrylic polymer. The acrylic polymer can be added by itself or in a number of forms such as part of an aqueous emulsion or aqueous dispersion, etc. for an aqueous-based composition or as part of an organic slovent premix for a non-aqueous-based composition. The acrylic polymers may or may not contain hydroxyl functionality. Acrylic polymers having hydroxyl functionality typically have a hydroxyl equivalent weight of about 200 to about 8000, preferably about 200 to about 5000. Acrylic polymer having no reactive hydroxyl groups form a blend with the resultant cured PUR, whereas acrylic polymers having reactive hydroxyl groups actually become reacted into the resultant cured PUR. The acrylic polymer may be added to improve gloss retention of the resultant cured PUR and decrease the time required for the coating to be tack-free.

Examples of useful acrylic polymers include but are not limited to those selected from the group consisting of homopolymers, copolymers, terpolymers, tetrapolymers, etc. of the following monomers: methylmethacrylate, n-butyl methacrylate, cyclohexyl methacrylate, isobutyl acrylate, methylacrylate, n-butyl acrylate, styrene, acrylic acid, methacrylic acid, hydroxyethylmethacrylate, hydroxypropyl-methacrylate, allyl alcohol propoxylate, hydroxyethylacrylate, 2-hydroxypropyl acrylate, 4-hydroxybutyl acrylate, mixtures thereof, etc. Fluorinated acrylic monomers are also useful in making acrylic polymers useful in the present invention. Examples include 2,2,2-trifluoroethyl methacrylate; 2,2,2-trifluoroethyl acrylate; 2,2,3,3-tetrafluoropropyl acrylate; etc.

Typically about 0 to about 65 percent by weight (more typically about 0.1 to about 65 percent by weight, if included) of hydroxyl functional acrylic polymer is included in Part A based upon the total weight of Part A, preferably about 0 to about 45 percent by weight, most preferably about 0 to about 30 percent by weight. Typically about 0 to about 45 percent by weight of hydroxyl free acrylic polymer is included in Part A based upon the total weight of Part A, preferably about 0 to about 35 percent by weight, most preferably about 0 to about 25 percent by weight. If too much acrylic polymer is included the resultant cured PUR may be hazy due to incompatability of the PUR and the acrylic polymer, or the cured PUR may be too rigid or brittle.
A.VI.

First Compound

Water-Reducible First Compound

Part A typically comprises about 0 to about 35 percent by weight of water-reducible first compound, (more typically about 0.1 to about 35 percent, if included) preferably about 2 to about 20 percent by weight percent based upon the total weight of Part A.

The optional water-reducible first compound useful in Part A is the same as those alkyl/siloxane diols/diamines and fluorinated diols/diamines listed in Section A.I.iii.

Solvent-Reducible First Compound

For non-aqueous-based compositions,Part A typically comprises about 0 to about 35 percent by weight of organic solvent-reducible first compound, (more typically about 0.1 to about 35 percent, if included) preferably about 2 to about 20 percent by weight percent based upon the total weight of Part A. The optional organic solvent-reducible first compound useful in Part A is the same as those alkyl/siloxane diols/diamines and fluorinated diols/diamines listed in Section A.I.iii.

A.VII.

Second Compound

Water-Reducible Second Compound

For the aqueous bsed compositions of the invention, water-reducible compounds selected from the group consisting of diols and polyols where the compound is optionally substituted with one or more carboxyl groups, may be included in Part A.

A specific example of a water-reducible second compound is a water-reducible polymeric diol. If too much polymeric diol is present the resulting cured PUR may be too soft and/or may have inferior outdoor durability and/or may have poor thermal stability.

Another example of a water-reducible second compound is typically a water-reducible diol chain extender. If too much diol chain extender is included, the PUR may need longer cure time or tack-free time and higher cure temperature, and the resulting cured PUR may be too hard.

Another example of a water reducible second compound is a water-reducible polyol chain extender (having 3 or more hydroxyl groups). If too much polyol chain extender is present the resulting cured PUR may be too hard and not show distinct self healing due to high storage modulus.

Part A of the 2-part composition of the invention can, I theorize, optionally further comprise a melamine polyol as a water reducible second compound. Examples of useful melamine polyols include but are not limited to those selected from the group consisting of 1,3,5 triazine-2,4,6-triamine polymer with formaldehyde, methylated; 1,3,5-triazine-2,4,6-triamine polymer with formaldehyde, butylated and methylated; and urethane-modified melamine resins with hydroxyl functionalities (available from Cytec Industry under the tradenames of CYLINK™ HPC-100, HPC-90, and HPC-75).

Part A typically comprises, about 0 to about 45 percent by weight of a water reducible second compound (more typically about 0.1 to about 45 percent if used) based on the total weight of Part A, preferably about 0 to about 35 weight percent, and most preferably about 0 to about 25 weight percent in order to provide a cured PUR have Tg between −20° C. to 50° C., Tan(δ) peaks height located at glass transition region larger than 0.9 and storage modulus at room temperature between about $1.0 \times 10^8$–$9.9 \times 10^8$ Pascals.

Organic Solvent Reducible Second Compound

For the non-aqueous-based compositions of the invention organic solvent-reducible compounds selected from the group consisting of diols and polyols where the compound is optionally substituted with one or more carboxyl groups, may be included in Part A.

A specific example of an organic solvent-reducible second compound is an organic solvent-reducible polymeric diol. If too much polymeric diol is present the resulting cured PUR may be too soft and/or may have inferior outdoor durability and/or may have poor thermal stability.

Another example of a organic solvent-reducible second compound is typically a organic solvent-reducible diol chain extender. If too much diol chain extender is included, the PUR may need longer cure time or tack-free time and higher cure temperature, and the resulting cured PUR may be too hard.

Another example of an organic solvent reducible second compound is an organic solvent-reducible polyol chain extender (having 3 or more hydroxyl groups). If too much polyol chain extender is present the resulting cured PUR may be too hard and not show distinct self healing due to high storage modulus.

Part A of the 2-part composition of the invention can, I theorize, optionally further comprise a melamine polyol as a water reducible second compound. Examples of useful melamine polyols include but are not limited to those selected from the group consisting of 1,3,5 triazine-2,4,6-triamine polymer with formaldehyde, methylated; 1,3,5-triazine-2,4,6-triamine polymer with formaldehyde, butylated and methylated; and urethane-modified melamine resins with hydroxyl functionalities (available from Cytec Industry under the tradename of CYLINK™ HPC-100). For a non-aqueous-based composition, Part A typically comprises, about 0 to about 45 percent by weight of an organic solvent—reducible second compound (more typically about 0.1 to about 45 percent if used) based on the total weight of Part A, preferably about 0 to about 35 weight percent, and most preferably about 0 to about 25 weight percent in order to provide a cured PUR have Tg between −20° C. to 50° C., Tan(δ) peaks height located at glass transition region larger than 0.9 and storage modulus at room temperature between about $1.0 \times 10^8$–$9.9 \times 10^8$ Pascals.

A.VIII.

Additives

Part A may optionally further comprise an additive including but not limited to those selected from the group consisting of flow control agents, bubble control agents, free radical scavengers, ultraviolet light absorbers, fungicides, dyes, pigments, aluminum flakes, reaction inhibitors, pot life extenders, biocides, mixtures thereof, etc.

It is theorized that Part A may optionally further comprise a catalyst. The function of the catalyst would be to catalyze the reaction of isocyanate groups present on the crosslinker contained in Part B and the hydroxyl groups present on components contained in Part A. Examples of catalysts include but are not limited to those selected from the group consisting of dibutyl tin dilaurate, stannous octoate, dimethyl tin dichloride, dibutyltin diacetate, organotin carboxylate, dibutyltin-di-2-ethylhexoate, dioctyltin carboxylate, organobismuth carboxylate, organomercurial carboxylate, mixtures thereof, etc. It is theorized that catalyst enhancers such as tertiary amines may be added to the systems. For aqueous-based systems, one would have to be careful not to use too much catalyst so as not to encourage the isocyanate/water reaction. Typically, about 0 to about 0.1 percent by weight of a catalyst would be used based upon the total weight of Part A for aqueous-based systems. Typically about 0 to about 0.5 percent by weight of a catalyst would be used for non-aqueous-based compositions, based upon the total weight of Part A.

Part B

B.I.

Crosslinkers

Crosslinkers for Aqueous-based Systems

"Water-reducible polyisocyanate(s)" are prepared by chemically incorporating one or more hydrophilic groups and/or segments into the backbone of a polyisocyanate which can allow the polyisocyanate to be water-reducible. Useful hydrophilic groups include sulfonate groups, tertiary amine groups, carboxylic acid functional groups, etc. Useful hydrophilic segments inlcude ethylene oxide segments, derivatives thereof, etc.

The following patents teach methods of making water-reducible polyisocyanates that would be useful according to the present invention: U.S. Pat. No. 4,472,550; European Patent Application EP 516 277; U.S. Pat. No. 5,075,370; European Patent Application EP 469 389; Canadian Patent No. 2 082 785; Canadian Patent No. 2 088 805; U.S. Pat. No. 5,252,696; all of which are incorporated herein by reference.

Water-reducible polyisocyanates that are also useful in the present invention are water dispersible polymeric hexam-ethylene diisocyanates. Examples of suitable water-reducible polyisocyanate crosslinkers include but are not limited to those selected from the group consisting of Bahydrol™ XP-7007 aliphatic polyisocycanate (NCO Eq. Wt.=250) and Bahydrol™ XP-7043 aliphatic polyisocyan-ate (NCO Eq Wt.=220), both available from Miles, Inc.

Blocked polyisocyanates are prepared by the addition of a blocking agent to polyisocyantes thus forming an adduct with a comparatively weak bond. The weak bond breaks apart upon heating causing free polyisocyanate and blocking agent to re-generate. The free polyisocyanate can react with hydroxyl, amine or carboxyl groups from other compounds to form a thermally stable bonding. The commonly used blocking agents are oximes, caprolactam, and phenols. "Water-reducible blocked polyisocyanates" are prepared by chemically incorporating one or more hydrophilic groups and/or segments into the backbone of a blocked polyisocy-anate so as to allow the blocked polyisocyanates to be water-reducible. The useful hydrophilic groups are carboxy-lic acid functional groups, tertiary amine groups, sulfonate groups, etc. The useful hydrophilic segments are ethylene oxide segments, ethylene oxide derivatives, etc.

The following patents teach methods of making water-reducible blocked polyisocyanates that would be useful according to the present invention: U.S. Pat. No. 4,522,851; U.S. Pat. No. 4,895,921; U.S. Pat. No. 4,098,933; and U.S. Pat. No. 5,034,435; all incorporated herein by reference.

An example of a specific water-reducible blocked-polyisocyanate that is also useful in the present invention is blocked 1,6-hexamethylene diisocyanate adduct supplied by Miles Inc. under the tradename of Bayhydrol™ -116

Part B typically comprises about 75 to about 100 percent by weight crosslinker based upon the total weight of Part B.

Crosslinkers for Non-Aqueous-based Compositions

Any solvent-reducible polyisocyante or blocked polyiso-cyantate can be used in the non-aqueous-based compositions of the invention. An example of unblocked polyisocyanate thereof is Desmodur™ N-3308, 3390, N-100, N-73, N-4370 available from Bayer, Luxate™ HT-2000, HB-9000, HB-3000 available from Onlin Chemical and Vestanate™ T-1890L, T-1890M, T-1890E available from HULS America, Inc. Examples of blocked polyisocyanate are Des-modur™ BL-3175A and BL-4165 available from Bayer, and Vestanat™ B-1370, VB-909IC and UB-1256IC available from HULS America, Inc.

Part B for solvent-based systems typically comprises about 30 to about 100 percent by weight crosslinker based upon the total weight of Part B.

B.II

Solvent

Solvents for Aqueous-based Systems

For aqueous-based systems, Part B may optionally comprise a solvent for reasons of viscosity control or as a dispersing aid. Part B typically comprises about 0 to about 25 percent by weight of a solvent based on the total weight of Part B, preferably about 0 to about 15 percent by weight, more preferably about 0 to about 10 percent by weight, and most preferably about 0 to about 6 percent by weight in order to keep the amount of solvent in the combination of Part A and Part B as low as possible or nonexistent.

Examples of suitable solvents include but are not limited to those coalescing solvents listed in Section A.III. Preferred solvents include those selected from the group consisting of dimethyl-formamide, N-methyl pyrrolidone, diethylene glycol ethylether acetate, 2,2,4-trimethyl-1,3-pentanediol mono (2-methyl propanoate), and long chain ester solvents under the tradenames of Exxate™ -600, -700, -800 and -900 available from Exxon Chemicals.

If Part B contains too little solvent Part B may disperse poorly into Part A particularly if Part B contains a less hydrophilic polyisocyanate, whereas if Part B contains a more hydrophilic polyisocyanate less solvent is needed.

Solvents for Non-aqueous-based Systems

For non-aqueous-based systems, Part B may optionally comprise a solvent for reasons of viscosity control or as a dispersing aid. Part B typically comprises about 0 to about 70 percent by weight of a solvent based on the total weight of Part B, preferably about 0 to about 50 percent by weight, more preferably about 0 to about 30 percent by weight, and most preferably about 0 to about 25 percent by weight in order to keep the amount of solvent in the combination of Part A and Part B as low as possible or nonexistent.

Examples of useful solvents for non-aqueous-based compositions include but are not limited to those selected from the group consisting of acetone, methyl ethyl ketone, methyl propylketone, methyl n=amylketone, methyl isoamylketone, methyl isobutyl ketone, diisobutyl ketone, cyclohexanone, etc., and esters such as ethyl acetate, propyl acetate, bytyl acetate, amyl acetate, methyl amylacetate, propylene glycol butyl ether acetate, di(ehtylene glycol)butyl ether acetate, ethylene glycol diacetate, ethylene glycol ethyl ether acetate, dietheylene glycol ethyl ether acetate, etc., and mixtures thereof. Other useful solvents include but are not limited to those selected from the group consisting of toluene, xylene, N-methyl lyrrolidone, dimethyl formamide, 1,1,1-trichlorothane, aromatic 100, aromatic 150, aromatic 200 and mineral spirits and mixtures thereof.

C.

Parts A and B Combined

C.I.

Amounts of Part A and Part B

For aqueous-based compositions, the NCO:OH ratio of the combination of Parts B and A ranges from about 1:1 to about 1.15:1 so that the resultant cured polymer is a polyurethane which based on FTIR curves has no observable urea peaks and which has good thermal stability and outdoor durability. Preferably, the NCO:OH ratio is about 1:1 to about 1.1:1. If too much Part B is added, the resultant polymer will be a polyurethane-urea which has a great tendency to yellow. If too little Part B is added, the resultant polymer may have low molecular weight and/or poor thermal stability and/or poor outdoor durability.

For non-aqueous-based compositions, the NCO:OH ratio of the combination of Parts B and A ranges from about 0.95:1 to about 1.07:1 so that the resultant cured polymer is a polyurethane which based on FTIR curves has no observable urea peaks and which has good thermal stability and outdoor durability. Preferably, the NCO:OH ratio is about 1:1 to about 1.05:1. If too much Part B is added, the resultant polymer will be a polyurethane-urea which has a great tendency to yellow. If too little Part B is added, the resultant polymer may have low molecular weight and/or poor thermal stability and/or poor outdoor durability.

C.II.

Properties of the Polyurethane Systems of the Invention

C.II.i.

Crosslink Density

The final cured PUR of the invention typically has a crosslink density of about 10% to about 80%, preferably about 15% to about 70%, and most preferably about 15% to about 60%. If the crosslink density is greater than about 80%, the resultant PUR may be too hard or rigid. If the crosslink density is less than about 15%, the resultant polymer may be too soft and may have poor thermal stability.

The crosslink density of the final cured polyurethane is calculated according to the following formula:

$$\text{Crosslink Density} = \frac{\text{weight of materials with functionalities of} \geq 3 \text{ from which the polyurethane is formed}}{\text{weight of the final cured polyurethane}} \times 100$$

For example, trimethylol propane (TMP), polyisocyanates, multi-hydroxyl acrylic polymers, and oligomers such as Joncryl™ -800B, 802, 540, 510, SCX-802, and 587 have hydroxyl functionalities of 3 or greater. Their weights would be included in the numerator in the above formula when calculating the crosslink density.

C.II.ii.

Storage Modulus

The final cured aqueous-based PUR of the present invention and, it is theorized, the non-aqueous-based PUR of the present invention typically has a storage modulus of about $8.0 \times 10^7$ Pascals to about $5.0 \times 10^9$ Pascals at room temperature (25° C.), preferably about $10 \times 10^8$ Pascals to about $9.9 \times 10^8$ Pascals as measured by a dynamic mechanical thermal analyzer based on 20-50 microns thickness of film and 1.0 Hz frequency. If the storage modulus is greater than about $9.9 \times 10^8$ Pascals at room temperature, the PUR is a glassy material which may be scratched easily. Moreover, the PUR may not exhibit distinct self-healing characteristics at room temperature due to its limited degree of freedom of the frozen polymer chains at glassy state. If the storage modulus is less than about $1.0 \times 10^8$ Pascals at room temperature, the final cured PUR may have poor thermal stability and poor outdoor durability.

The final cured aqueous-based PUR of the present invention and, it is theorized, the nonaqueous-based PUR of the present invention typically has a storage modulus of about $1.0 \times 10^6$ Pascals to about $6.0 \times 10^7$ Pascals at 70° C. as well as in the rubbery plateau region. If the storage modulus at 70° C. is greater than about $6.0 \times 10^7$ Pascals, the resultant cured PUR of the present invention may not have distinct self-healing characteristics at 70° C. It may require higher temperatures (such as 100° C. to 125° C.) to demonstrate self-healing. If the storage modulus is lower than about $1.0 \times 10^6$ pascal at 70° C., the final cured PUR may have poor thermal stability and/or poor outdoor durability.

C.II.iii.

Glass Transition Temperature

The cured aqueous-based PUR of the invention and, it is theorized, the nonaqueous-based PUR of the present invention typically has a glass transition temperature (Tg) of about −20° C. to about 100° C. as measured by a Dynamic Mechanical Thermal Analyzer based on 25-50 microns of film thickness and 1.0 Hz of frequency, preferably about −20° C. to about 80° C., and most preferably about −20° C. to about 50° C. If the Tg is greater than about 100° C., the resultant PUR may not have distinct self-healing characteristics at room temperature or higher temperatures (such as 100° C. to 125° C.) due to its highly limited degree of freedom of polymer chains resulting from a high crosslink density. If the Tg is greater than about 80° C., the resultant PUR may not have distinct self-healing characteristics at room temperature. However, it may have self-healing characteristics at higher temperatures (such as 100° C. to 125° C.). If the Tg is greater than about 50° C., the resultant PUR will show distinct self-healing characteristics at room temperature. However, it may require a longer time (such as 10 days, 15 days, or even 30 days) to demonstrate this property. If the Tg is less than about −20° C., the resultant PUR may be too soft and/or it may have poor thermal stability and/or poor outdoor durability.

C.II.iv.

Damping Factor

The final cured aqueous-based PUR of the present invention and it is theorized the nonaqueous-based PUR of the present invention typically has a damping factor (i.e. the size of the Tan (δ) peak) located at glass transition region of greater than about 0.4 as measured by a Dynamic Mechanical Thermal Analyzer based on 25-50 microns of film thickness and 1 Hz of frequency, preferably greater than about 0.7, most preferably greater than about 0.9. The upper limit of the damping factor is typically not greater than about 1.4. If the size of the Tan (δ) peak located at the glass transition region is less than about 0.4, the cured PUR may not show self-healing characteristics at room temperature or higher temperatures (such as 100° C. to 125° C.) due to its relatively low damping characteristics. If the size of the Tan (δ) peak is less than about 0.7, the resulting PUR may show a little self-healing characteristics at room temperature, and it may not show 100% recovery due to low damping characteristics. If the size of the Tan (δ) peak is between 0.7 and 0.9, the resultant PUR may show distinct self-healing characteristics to reach 100% recovery at room temperature. However, these self-healing characteristics may take a week to several weeks. If the size of the Tan (δ) peak is greater than about 0.9, the resultant PUR may show relatively fast and distinct self-healing characteristics at room temperature (i.e. from a few hours to a week.
C.II.v.

Self-Healability

The self-healing materials of the present invention contain siloxane and/or fluorinated material segments. Due to the large differences in surface tensions and incompatibility between siloxane segments and polyurethane segments, these two different types of polymer chain segments tend to expel each other and provide so called "chain slippage" of polymer chains. The self-healing materials of the invention typically self-heal in about 3 days or less, more typically about 2 minutes to 12 hours at room temperature and about 1 to 5 seconds at higher temperatures, as discussed infra.

The final cured self-healing PUR of the invention typically comprises alkyl siloxane segment(s) and/or fluorinated polyester segment(s) and/or fluorinated polyether segment (s). These segments are contributed by the prepolymer and/or compounds of A.I.iii. The self-healing PUR typically comprises about 0% to about 35%, preferably about 2% to about 20% of the aforementioned segments based on the total weight of cured PUR. If the cured PUR comprises less than about 2% of the aforementioned segments the PUR may not show distinct self-healing characteristics due to a very low degree of polymer chain slippage. If the alkyl siloxane and/or fluorinated polyether and/or fluorinated polyester segment content is greater than about 35%, the resultant cured PUR may become hazy due to incompatability between the polyurethane backbones and alkyl siloxane segment and/or fluorinated polyether and/or fluorinated polyester segments. In addition, the resultant PUR may show relatively inferior outdoor durability due to its porosity resulting from alkyl siloxane segments and/or fluorinated segments. If the alkyl siloxane and/or fluorinated polyether and/or polyester segment content is greater than about 20%, the resultant PUR may still appear slightly hazy. However, the porosity problems that result in inferior outdoor durability may be lessened.
C.III.

Uses
C.III.i

General Uses for the Dispersion or the Composition of the Invention

The dispersions or compositions of the invention formed by combining Part A and Part B may be advantageously employed as a coating composition. As a coating composition, it may be applied to and cured on a wide variety of substrates including those selected from the group consisting of wood, metals, glass, cloth, leather, paper, paint, concrete, plastics, foam, and any other substrate onto which protective coatings may be applied, by any conventional method including brushing, dipping, flow coating, spraying, screen printing, and the like. The coating compositions may further comprise other conventional ingredients including organic solvents, pigments, dyes, emulsifiers (in the case of aqueous-based compositions), de-foamers surfactants, thickeners, fire retardants, heat stabilizers, leveling agents, anti-cratering agents, fillers, ultraviolet light absorbers, fungicides, biocides, antioxidants, and the like, which ingredients may be introduced at any stage of the production process.

The composition of the invention may also be used as an adhesive for open cell foams made from polystyrenes, polyurethanes, and the like, or other porous materials such as, leather, wood, paper and the like, or as seal coatings for construction materials such as concrete, bricks and the like.

The system of the invention may be used on porous or nonporous materials. However, the system must be used in a manner that allows any water and/or solvents to evaporate from the system and curing to occur.

Nonporous materials (such metals, glass, etc.) are typically coated on a surface which is exposed to air to allow curing to occur.

Porous materials (such as wood, paper, concrete, etc.) may be coated on a surface which is exposed to air or alternatively it may be coated between two porous layers of material or 1 porous layer and 1 nonporous layer which allows evaporation to occur through the porous material curing to take place. Examples thereof include adhering pieces of wood together, sealing cracks in driveways, etc.
C.III.iii

Specific Uses for the Self-Healing, Scratch-Resistant Material of the Invention The present invention can be used as a clear coat or film where good scratch-resistance, self-healability, and good outdoor durability are required.

Examples thereof include all of the general uses indicated above and particularly as clear coat/top coats (such as for vehicles, appliances, etc.), and as a wood or leather finishes due to its outstanding scratch resistance and self-healing nature.

These high damping PUR clear coats may also be used as energy-absorbing (including sound energy) clear coats or paints (upon being pigmented) in the construction industry.

The coating of the invention which is capable of self-healing can self-heal over a range of temperatures. Self-healing does not typically occur until the scratched coating is exposed to a high enough temperature, typically above about 10° C., preferably about 20° C. to about 70° C. If the temperature is about 10° C. or less, self-healing may not be observed. However, a scratched coating that is present in such a low temperature environment can still be self-healed by exposing it to a higher temperature. A high temperature can be used to cause the self-healing as long as it is not so high as to degrade the substrate, cause yellowing of the coating, reduce the gloss of the coating or cause any other disadvantageous effect.

The higher the temperature the quicker the self-healing occurs. The rate of self-healing of the self-heatable coatings of the invention depends upon the temperature, the depth of the scratch, and the composition of the coating. Self-healing may take place from about 1 to about 5 seconds at high temperatures (such as 100° C.). Room temperature healing typically takes about several minutes to several hours (typically 2 minutes to 12 hours).
C.IV.

Coating and Curing of the Composition of the Invention

Curing of Aqueous-based Systems

The water-based reactive 2-part PUR systems of the invention containing unblocked polyisocyanate crossliner are dried, typically in an air-circulated first oven zone at about 55° C. to about 75° C., preferably about 65° C. to about 75° C., to evaporate most of the water in the system to minimize the side reaction between water and the isocyanate groups contributed by the polyisocyanate crosslinker of Part B before the curing reaction begins. It is preferred that the polyisocyanate crosslinker be aliphatic rather than aromatic since aliphatics are less reactive and thus can be heated to a higher temperature without reacting, thus it is easier to evaporate the water and prevent side reactions.

After most of the water has been evaporated (typically about 90 to 100%), preferably about 95 to 100%, most preferably 100%, the first oven zone, the system is then exposed to a higher temperature than that of the first temperature zone sufficient to initiate chain-extension and/or crosslinking reactions. This typically occurs in a second oven zone having a temperature of at least above about 75° C. to 225° C. to initiate the curing reactions, preferably about 90° to 225° C. The upper temperature limit in this second oven zone is dependent on the substrates to which the material of the invention is applied (i.e., polyvinyl chloride (PVC) films, about 150° C.; steel, about 225° C.). However, once the reactions have been initiated they will go to completion even if the material is stored at ambient temperature.

To save energy, the step in the second oven zone might range from about 75° C. to 225° C., preferably about 90° C. to 225° C. until the coating is partially cured and tack-free. The tack-free coating is then cured at a lower temperature, typically about 10° to 75° C., preferably about 15° to about 35° C. However, the higher the temperature the quicker the curing reaction.

There are at least two different methods for curing the composition of the invention when the crosslinker is a blocked polyisocyanate.

One method involves combining Parts A and B to form a mixture, coating the mixture on a substrate, evaporating at least 90% of the water present at a temperature which will not deblock the blocked polyisocyanate crosslinker (typically about 50° to 80° C., preferably about 70° to 80° C.). This is followed by exposure of the coating to a temperature sufficient to deblock the blocked polyisocyanates without degrading the substrate and exposure to a temperature sufficient to cure the coating. These deblocking and curing steps typically occur at about 80° C. to about 225° C., preferably about 90° C. to about 225° C. This method is advantageous in that a pure polyurethane can be obtained due to the separate water evaporation step prior to deblocking.

An alternate method involves combining Parts A and B to form a mixture, coating the mixture on a substrate, exposing the coated substrate to a temperature sufficient to deblock the blocked polyisocyanate crosslinker, followed by exposure to a temperature sufficient to cure the coating. The temperature range for deblocking and curing is typically about 90° C. to about 225° C., preferably about 100° C. to about 225° C. An advantage of this method is its speed. Water evaporation occurs during the deblocking stage, however, and due to this combination of steps, the product may not be as pure as when a separate evaporation step followed by a blocking step is used.

Curing of Non-Aqueous-based Systems

The non-aqueous-based reactive 2-part PUR systems of the invention containing unblocked polyisocyanate crossliner are dried, typically in air-circulated ovens. The oven temperature used to cure the coating composition is typically above about 25 degrees C., preferably above about 50 degrees C., more preferably above about 60 degrees C., and most preferably above about 70 degrees C. The upper temperature limit of the oven zone is dependent on the substrates to which the material of the invention is applied (i.e., polyvinyl chloride (PVC.) films, about 150° C.; steel, about 225° C.). However, once the reactions have been initiated they will go to completion even if the material is stored at ambient temperature.

To save energy, the curing step in the oven zone might range from about 75° C. to 225° C., preferably about 90° C. to 225° C. until the coating is partially cured and tack-free. The tack-free coating is then cured at a lower temperature, typically about 10° to 75° C., preferably about 15° to about 35° C. However, the higher the temperature the quicker the curing reaction.

Curing of the non-aqueous-based composition when Part B comprises a blocked polyisocyanate involves combining Parts A and B to form a mixture, coating the mixture on a substrate, exposing the coated substrate to a temperature sufficient to deblock the blocked polyisocyanate crosslinker, followed by exposure to a temperature sufficient to cure the coating. The temperature range for deblocking and curing is typically about 90° C. to about 225° C., preferably about 100° C. to about 225° C.

The fourier transform infrared (FTIR), thermomechanical properties, differential scanning calorimetry (DSC.) properties, and dynamic mechanical properties as well as scratch-resistance and self-healing of the commercially supplied one-part water-based polyurethane-ureas, conventional solvent-based reactive 2-part PURs, and the water-based reactive 2-part PURs of the invention were studied. From the test results one can conclude that the thermal and dynamic mechanical properties as well as chemical structure of the present invention are similar to those of conventional solvent-based reactive 2-part PURs. Thermomechanical analysis (TMA) and dynamic mechanical thermal analysis (DMTA) curves show that a distinct softening temperature is observed in both non-crosslinked and crosslinked conventional one-part water-based polyurethane-ureas (i.e., Bayhydrol™ -121, Bayhydrol™ -121+Neorez™ CX-100, Bayhydrol™ -110 and Bayhydrol™ -110+Neorez™ CX-100), whereas the present invention and the conventional solvent-based 2-part reactive PURs show no evidence of softening, which is presented in Tables 11 and 12 and shown in FIGS. 5–17. The results obtained from TMA and DMTA also demonstrate that the conventional one-part water-based polyurethane-ureas having relatively low crosslink density in comparison to the conventional solvent-based reactive 2-part PURs and the compositions of the present invention.

As indicated previously "Part A" refers to an aqueous dispersion of semi-crosslinked and multi-hydroxyl containing polyurethane prepolymer and/or an aqueous dispersion of a mixture of different types of polyols which are curable by "Part B" which comprises a polyisocyanate crosslinker. The following examples detail the syntheses of water-based semi-crosslinked and multi-hydroxyl functional urethane prepolymers and the preparation of Parts A and B. The curing formulations of water-based reactive 2-part PURs of the invention as well as the commercially supplied one-part water-based polyurethane-ureas and conventional solvent-based 2-part reactive PURs and their properties are compared. Hoffmnan Scratch and mar resistance as well as self-healing characteristics are evaluated herein.

In addition,the scratch-resistance and self-healing of the conventional solvent-based reactive 2-part PURs, the non-aqueous-based compositions of the invention were studied.

As indicated previously "Part A" can refer to a non-aqueous-based composition of semi-crosslinked and multi-hydroxyl containing polyurethane prepolymer and/or a non-aqueous-based composition of a mixture of different types of polyols which are curable by "Part B" which comprises a polyisocyanate crosslinker. The following examples detail the preparation of non-aqueous-based Parts A and B. The curing formulations of non-aqueous-based reactive 2-part PURs of the invention as well as the conventional solvent-based 2-part reactive PURs and their properties are compared. Hoffman Scratch and mar resistance as well as self-healing characteristics are evaluated herein.

EXAMPLES

The following examples further illustrate but do not limit the present invention. Unless otherwise indicated all parts, percentages, ratios, etc., in these examples and the rest of the specification are by weight unless indicated otherwise.

A number of materials used in the examples are listed in Table 1.

TABLE 1

| Materials | Description | Supplier |
|---|---|---|
| Polyol I | Carboxylic Acid-Modified Polyester Diol (—OH Eq. Wt. = 72.9) under the tradename of Lexorez ™ 1405-65 | Inolex Chem. |
| Polyol II | Carboxylic Acid-Modified Polyester Diol (—OH Eq. Wt. = 125.8) under the tradename of Lexorez ™ 1405-120 | Inolex Chem. |
| Polyol III | Carboxylic Acid-Modified Poly(neopentyl/hexamethylene adipate) Glycol Diol (—OH Eq. Wt. = 164.8) under the trade number of DP-56-160 | Witco Chem. |
| Polyol IV | Carbinol-terminated Polydimethyl Siloxane (—OH Eq. Wt. = 98.0) under the trade number of PS-556 | Huls American Inc. |
| Polyol V | Urethane Diol (—OH Eq. Wt. = 160.0) under the trade name of K-Flex ™ UD-320-100 | King Industries |
| Polyol VI | Perfluoropolyether Diol (—OH Eq. Wt. = 99.3) under the trade-name of Fluorad ™ FC-2022 | 3M |
| Polyol VII | Poly(1,6-hexanediolneopentyl glycol adipate) (—OH Eq. Wt. = 467.5) under the tradename of Lexorez ™ 1400-120 | Inolex Chem. |
| BEPD | 2-Butyl-2-Ethyl-1,3-Propandiol | Eastman Chem. |
| CHDM | 1,4-Cyclohexanedimethanol | Eastman Chem. |
| Joncryl ™-540 | Acrylic Polymer Emulsion (—OH Eq. Wt. = 42, Acid# = 49) | S. C. Johnson & Son |
| Joncryl ™-800B | Acrylic Oligomer (—OH Eq. Wt. = 40, Acid# = 14) | S. C. Johnson & Son |
| Joncryl ™-SCX 802 | Acrylic Oligomer (—OH Eq. Wt. = 85, Acid# = 13) | S. C. Johnson & Son |
| Tone ™-305 | Caprolactone-Modified Trimethylol propane | Union Carbide |
| TMP | Trimethylol Propane | Various Supplies |
| TEA | Triethyl Amine | Various Suppliers |
| Fluorad ™ FC-430 | Fluoraliphatic polymeric esters | 3M |
| Desmodur ™-W | Bis(4-isocyanato-cyclohexyl) Methane | Miles, Inc. |
| Desmodur ™ N-3300 | Polyisocyanate | Miles, Inc. |
| COTIN ™-200 | Dibutyltin Dilaurate | Cosan Chem. |
| Formez ™ UL-30 | Dimethyltin Dichloride | Witco |
| Exxate ™-600 | Long Chain Ester Solvent | Exxon Chem. |
| Ektasolve ™DB-Acetate | Diethylene Glycol Butyl Ether Acetate | Eastman Chem. |
| Bayhydrol ™-121 | Polyurethane-urea Water Dispersion | Miles, Inc. |
| Bayhydrol ™-110 | Polyurethane-urea Water Dispersion | Miles, Inc. |
| Neorez ™ XR-9679 | Polyurethane-urea Water Dispersion | Zeneca Resins |
| Neorez ™ XR-9699 | Polyurethane-urea Water Dispersion | Zeneca Resins |
| Neorez ™ CX-100 | Polyaziridine | Zeneca Resins |
| Neocryl ™ A-601 | Acrylic Polymer Emulsion | Zeneca Resins |
| Bayhydrol ™ XP-7007 | Aliphatic Polyisocyanate Eq Wt (NCO) = 250 | Miles, Inc. |
| Bayhydrol ™ XP-7043 | Aliphatic Polyisocyanate Eq Wt. (NCO) = 220 | Miles, Inc. |
| MEK | Methyl Ethyl Ketone | Various Suppliers |
| Texanol ™ | 2,2,4-trimethyl-1,3-pentanediol mono(2-methyl propanoate) | Eastman Chemical |
| Uvinul ™ N-539 | UV light absorber | BASF |
| Tinuvin ™ 123 | Hindered amine | Ciba-Geigy |
| BYK ™-025 | De-Foamer | Byk Chemie |
| Triton ™ GR-7M | Surfactant | Union Carbide |
| Tinuvin ™-1130 | Ultraviolet light absorber | Ciba-Geigy |
| PM-Acetate | Propylene glycol methyl ether acetone | Various suppliers |
| Release liner | 70 microns polyethylenterephthalate coated with an acrylic polymer release agent | |

Preparation and Curing of PUR Dispersions

Example 1
Preparation of PUR Dispersion

Into a 1 liter resin kettle (equipped with a mechanical agitator, thermometer, nitrogen inlet, oil bath, dropping funnel and condenser) the ingredients (a–e and g) listed in Table 2, Example 1 were charged. The mixture was stirred and heated at 65° C. for 15 minutes under a nitrogen blanket until the mixture became homogeneous. During the next 20 minutes bis(cyclohexyl) methane diisocyanate (Desmodur-W) was added incrementally until the total added to the kettle was 28.16 grams. The reaction mixture was allowed to exotherm to approximately 85° C. The reaction was allowed to run to completion [no residual isocyanate was detected by Fourier Transform Infrared Spectroscopy (FTIR)]. The solution temperature was lowered to 70° C. and 4.61 grams of triethyl amine was added into the solution. The solution was stirred for another 10 minutes. 166.8 grams of the resulting hydroxyl-terminated urethane prepolymer solution was slowly dispersed into 195 grams of deionized water under high shear to generate a stable dispersion. Methyl ethyl ketone (MEK) was then stripped off.

Curing of Water-Based Reactive 2-Part PUR Dispersion

To 79.4 grams of the above prepared PUR Dispersion were added 8.10 grams of DB-acetate, 0.22 gram of FC-430, and 12.28 grams of deionized water (see Table 3, Example 1). Part B was prepared by mixing 8.7 grams of polyisocyanate crosslinker Bayhydrol™ -7007 and 2.8 grams of Exxate™ -600 (see Table 3, Example 1). Part B was then added to Part A which was stirred vigorously for 3 minutes. The mixture was coated 150 microns wet on a polyester release liner to obtain 50 microns dry thickness. The coating was dried 1.5 minutes at 74° C., 1.5 minutes at 93° C., and 3 minutes at 135° C. The coating was further cured overnight at 66° C.

Examples 2 and 3
Preparation of PUR Dispersions

Two hydroxyl-terminated urethane prepolymer dispersions were prepared in a similar manner to Example 1 except the materials and amounts listed in Table 2, Examples 2 and 3, were used.

Curing of Water-Based Reactive 2-Part PUR Dispersions

The curing formulations of Examples 2 and 3 were prepared in a similar manner to Example 1 except the amounts listed in Table 3 were used. The coating thickness as well as the curing time and temperatures were the same as described in Example 1.

Comparative Examples 4 and 5
Curing of Commercially Supplied One Part Water-Based Polyurethane-urea Bayhydrol™ -10 and 121

The curing formulations found in Table 4, of the commercially supplied water-based polyurethane-ureas (Bayhydrol™ -110 and 121) were prepared. The coating solutions were each thoroughly mixed for 10 minutes and then coated 125 microns wet on a polyester release liner to obtain 37.5 microns dry thickness. The polyurethane-urea coatings were dried 2 minutes at 93° C., 2 minutes at 121° C., and 2 minutes at 135° C.

Example 6
Preparation of Polyol Dispersion

Into a liter 3-neck flask equipped with a mechanical agitator, thermometer, and oil bath, the materials a, d and i listed in Table 5, Example 6, were charged. The mixture was stirred and heated at 70° C. until the solution mixture became homogeneous. Next, 10.35 grams of triethyl amine were added into the solution which was stirred for another 10 minutes. Afterwards, the solution mixture was slowly dispersed into 240 grams of deionized water under high shear stirring to generate a stable dispersion. MEK was then stripped off.

Curing of Polyol Dispersion of Example 6

To 75.00 grams of the Polyol Dispersion of Example 6 were added the materials listed in Table 6 to make the Part A solution. Part B was prepared by mixing 9.00 grams of polyisocyanate crosslinker (Bayhydrol™ XP-7043) and 1.00 gram of Exxate™ -600 shown in Table 6. Part B was added to Part A, and the mixture was stirred vigorously for 3 minutes. The mixture was coated 100 microns wet on a polyester release liner to obtain 25 microns dry thickness. The coating was dried 1.5 minutes at 74° C., 2.5 minutes at 121° C., and 2 minutes at 135° C. The coating was further cured at 66° C. overnight.

Example 7
Preparation of Polyol Dispersion

The Polyol Dispersion of Example 7 was prepared in the same manner as Example 6 except that the amounts and types of polyols listed in Example 7, Table 5 were used.

Curing of Polyol Dispersion

The curing formulation of the Polyol Dispersion of Example 7 was prepared in a similar way to Example 6 except the amounts listed in Example 7, Table 6 were used. The coating thickness and curing temperatures and times were the same as described in Example 6.

Examples 8 and 9
Preparation of PUR Dispersions

The PUR Dispersions of Examples 8 and 9 were prepared in a similar manner as Example 1 except the amounts and materials listed for Examples 8 and 9 in Table 5 were used.

Curing of PUR Dispersions of Examples 8 and 9

The curing formulations of the PUR Dispersions of Examples 8 and 9 were prepared in a similar manner to Example 1 except the materials and amounts listed in Table 6 were used. The coating thickness and curing conditions used were the same as described in Example 6. The clear coats were further cured at 66° C. overnight.

Example 10
Preparation of PUR Dispersion

The PUR Dispersion prepared for this Example is exactly the same as shown in Example 8.

Curing of PUR Dispersion

The PUR Dispersion was cured in a similar manner as Example 1 except the materials and amounts used are listed in Example 10, Table 6. The coating thickness and curing conditions were the same as described in Example 1.

Example 11, 12 and 13
Preparation of PUR Dispersions

The PUR Dispersions of Examples 11, 12 and 13 were synthesized in a similar manner as Example 1 except the materials and amounts used are listed in Examples 11, 12 and 13 in Table 7.

Curing PUR Dispersions

The curing formulations of the PUR Dispersions were prepared in a similar manner to Example 1 except the materials and amounts listed in Table 8 were used. The curing reactions for these examples did not involve a catalyst. The coating thickness and curing time and temperatures used were the same as described in Example 1.

Example 14
Preparation of PUR Dispersion

The PUR Dispersion prepared in this Example is the same as prepared in Example 11.

Curing of PUR Dispersion

The PUR Dispersion was cured in a similar manner as Examples 11–13 except the amounts and materials used are listed in Example 14. Table 8. Severe blisters were observed in the coating. The blistering was caused by $CO_2$ yield during the side reaction of water and isocyanate promoted by a catalyst (i.e., Formrez™ UL-30).

Comparative Examples 15–19
Coating of Commercially Supplied One-Part Water-Based Polyurethane-Ureas.

The curing and coating formulations of Comparative Examples 15–19, Table 4 for the commercially supplied water-based polyurethane-ureas (Bayhydrol™ -110 and 121 Neorez™ XR-9679, Neorez™ XR-9699, Neocryl™ A-601) were prepared in a similar manner to Comparative Examples 4 and 5 in Table 4. The coating thickness and drying conditions used were the same as described in Comparative Examples 4 and 5.

Comparative Example 20
An Example of Conventional Solvent-Based Reactive Two-Part PUR

|  | Grams |
| --- | --- |
| Part A: | |
| Lexorez ™-1400-120 | 16.81 |
| Joncryl ™ SCX-802 | 33.61 |
| Methyl Ethyl Ketone | 14.37 |
| Tone ™-305 | 8.40 |
| Propylene Glycol Methyl Ether Acetate | 12.60 |
| Butyl Acetate | 6.64 |
| Dibutyltin Dilaurate (1% in Propylene Glycol Methyl Ether Acetate) | 1.68 |
| Fluorad ™ FC-30 (20% in Propylene Glycol Methyl Ether Acetate) | 3.38 |
| Diisobutyl Ketone | 2.51 |
| Total | 100.00 |
| Part B: | |
| Desmodur ™ N-3300 | 28.40 |

Part A and B were thoroughly mixed for 3 minutes and the solution was coated 100 microns wet thickness on a polyester release carrier web to obtain 50 microns dry thickness. The coating was then cured 2 minutes at 80° C. and 4 minutes at 135° C. The PUR was further cured at 95° C. for another 6 hours.

Comparative Example 21
Miles' Water-Based Reactive Two-Part Polyurethane-Urea The curing formulation of Miles' water-based reactive 2-part polyurethane-urea suggested by Miles technical brochure (by using an excessive amount of isocyanate) is shown below. The NCO/OH ratio in the curing reaction of Part B and Part A was kept at 2/1.

|  | Grams |
| --- | --- |
| Part A: | |
| Bayhydrol ™ XP-7043 | 61.09 |
| Fluorad ™ FC-430 (5% in Water) | 0.80 |
| De-Ionized Water | 20.10 |
| Part B: | |
| Bayhydrol ™ XP-7007 | 14.07 |
| Exxate ™-600 | 3.94 |

Part A and B were thoroughly mixed for 5 minutes and the solution was coated 100 microns wet thickness on a polyester release carrier web to obtain 50 microns dry thickness. The coating was then cured at ambient temperature for a week.

Test Methods
The following Tests A-E were used herein.

Test A: FTIR-ATR

A Nicolet 510 FTIR Spectrometer attached with an Attenuated Total Reflectance apparatus and KRS-5 crystal (Thallium Bromoiodide) on 45° angle was used to perform the study of the surface structure of the polyurethanes of the invention, the solvent-based polyurethanes of the Comparative Examples and the polyurethane-ureas of the Comparative Examples.

FTIR-ATR can clearly differentiate between the chemical structures of polyurethane and polyurethane-urea. The absorption bands of hydrogen-bonded carbonyl group (C=O) and free carbonyl group (C=O) in aliphatic urethane linkage appear at 1688 $cm^{-1}$ and 1720 $cm^{-1}$, respectively. In a urea linkage, the absorption of the hydrogen-bonded carbonyl group (C=O) appears in between 1640 and 1660 $cm^{-1}$, whereas the free carbonyl group (C=O) appears at 1695 $cm^{-1}$ (see Macromolecules 1980, Vol. 13, p. 117–121).

The absorption band of the free carbonyl group of the urea linkage tends to overlap with the absorption band of the hydrogen-bonded carbonyl group in the urethane linkage in the IR spectrum. These two different carbonyl absorption bands appear at 1695 $cm^{-1}$ and 1688 $cm^{-1}$ respectively. Hence, it is difficult to differentiate these two peaks. On the other hand, the absorption band of the hydrogen-bonded carbonyl in the urea linkage can be clearly observed between 1640 $cm^{-1}$ and 1660 $cm^{-1}$ which appears as a distinct shoulder. This shoulder has been widely used to distinguish between polyurethane and polyurethane-urea (See Macromolecules, 1980, Vol. 13, p. 117–121).

Figure 2:
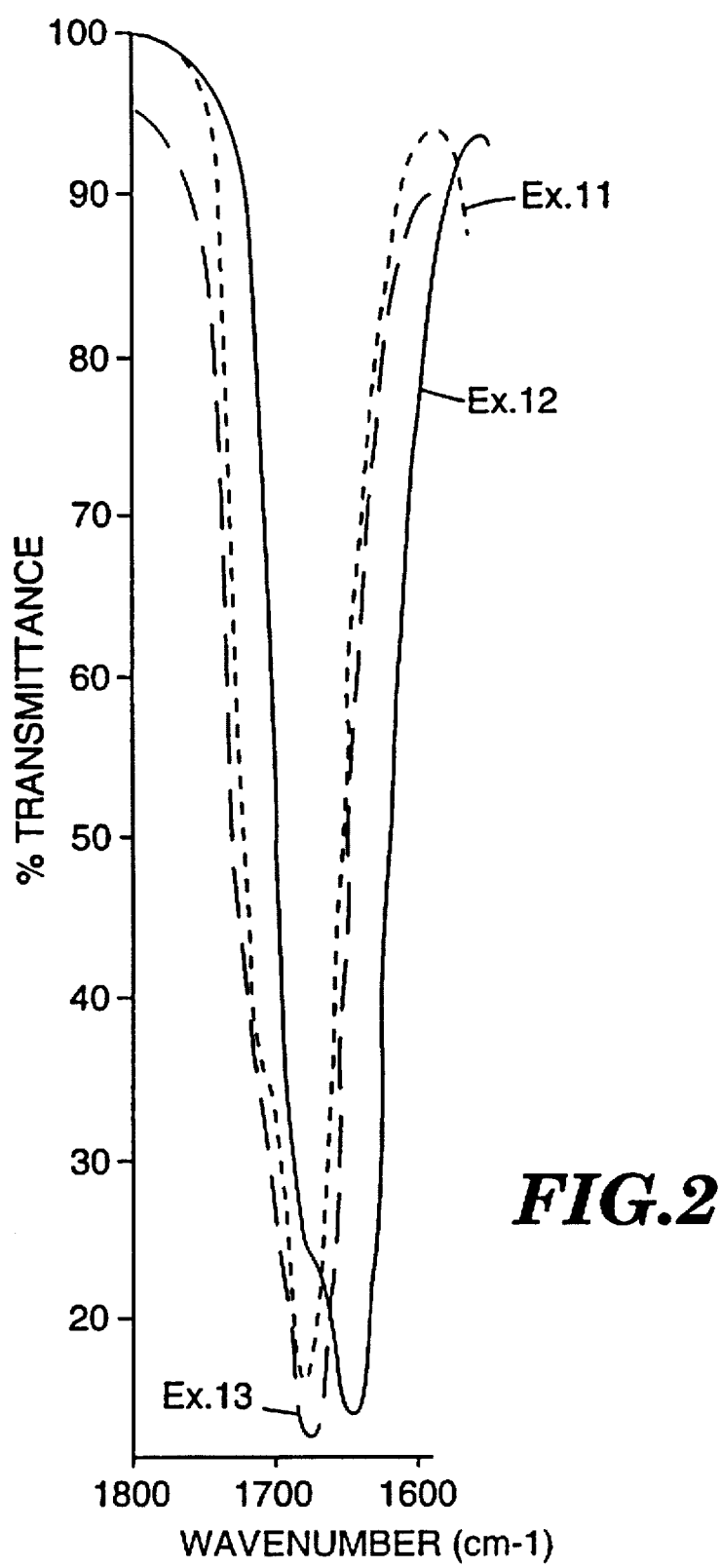
FIG. 2 illustrates the absence of the FTIR absorption shoulder of H-bonded urea linkage in Examples 11–13 of the present invention.

Miles' one-part conventional water-based polyurethane-ureas in Comparative Examples 15 and 16 (Bayhydrol™ -110 and 121) and water-based reactive two-part polyurethane-urea in Comparative Example 21 show distinct shoulder between 1640 $cm^{-1}$ and 1660 $cm^{-1}$ in IR spectrum. The shoulder is attributed to the absorption of the hydrogen-bonded carbonyl (C=O) in the urea linkage. Due to the existence of this shoulder in the IR spectrum, Comparative Examples 15, 16 and 21 are classified as polyurethane-urea (See FIG. 1). In contrast to the Comparative Examples, the present invention of Examples 11–13 (See FIG. 2) do not show any evidence of urea linkage in the above region. A very smooth peak is seen between 1600 $cm^{-1}$ and 1800 $cm^{-1}$ in the IR spectrum of Examples 11–13. The peak which appears in this range is assigned to the hydrogen-bonded carbonyl and free carbonyl absorption bands in the urethane linkage. The IR absorption band between 1600 $cm^{-1}$ and 1800 $cm^{-1}$ in the present invention (Examples 11–13) is very similar to that in Comparative Example 20 (a conventional solvent-based reactive two-part polyurethane) (See FIG. 1) where no evidence of urea absorption shoulder is seen in the range between 1640 $cm^{-1}$ and 1660 $cm^{-1}$. The results are summarized in Table 9.

The FTIR-ATR results demonstrate that the coatings of the present invention (Examples 11–13) are chemically similar to the coatings of conventional solvent-based reactive two-part polyurethanes (Comparative Example 20). All are polyurethanes rather than polyurethane-ureas. Accordingly, the present invention is chemically different from the conventional one-part water-based polyurethane-ureas and Miles' water-based reactive two-part polyurethane-urea (Comparative Examples 15, 16 and 21).

Test B: Differential Scanning Calorimetry (DSC.)

Figure 3:
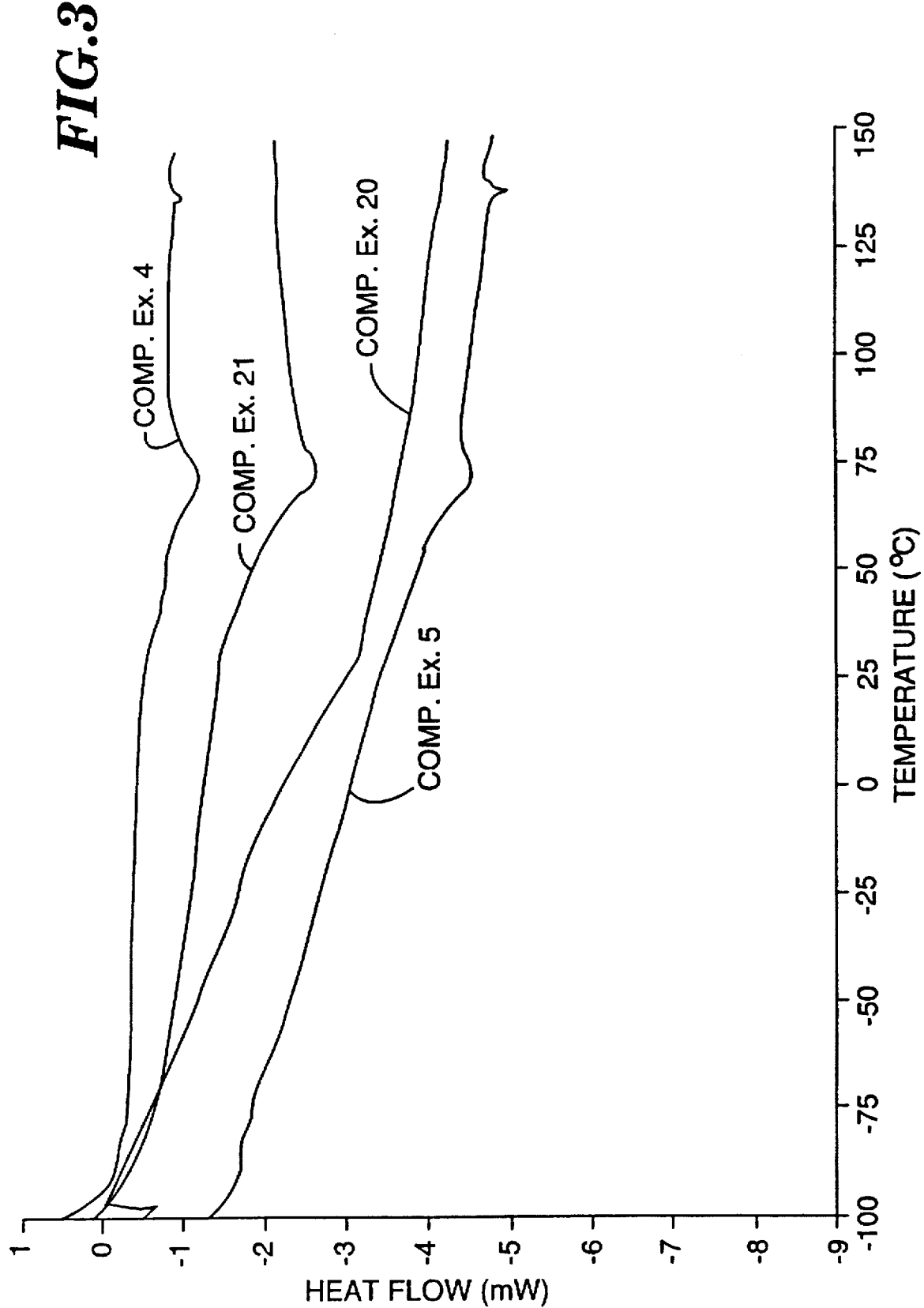
FIG. 3 illustrates the Differential Scanning Calorimetry (DSC) thermograms of Comparative Examples 4, 5, 20 and 21.
Figure 4:
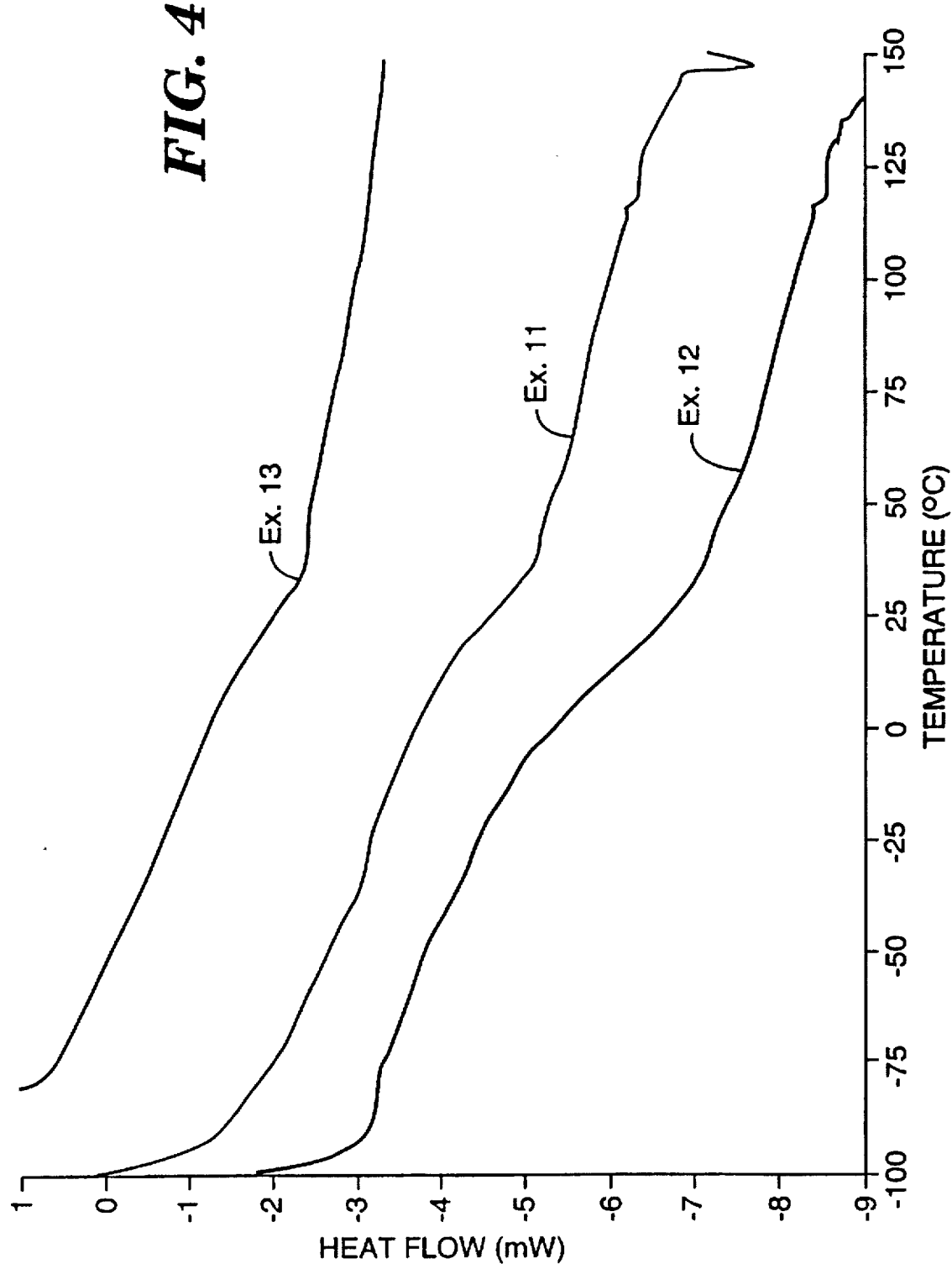
FIG. 4 illustrates the DSC thermograms of Examples 11–13 of the present invention.
Figure 5:
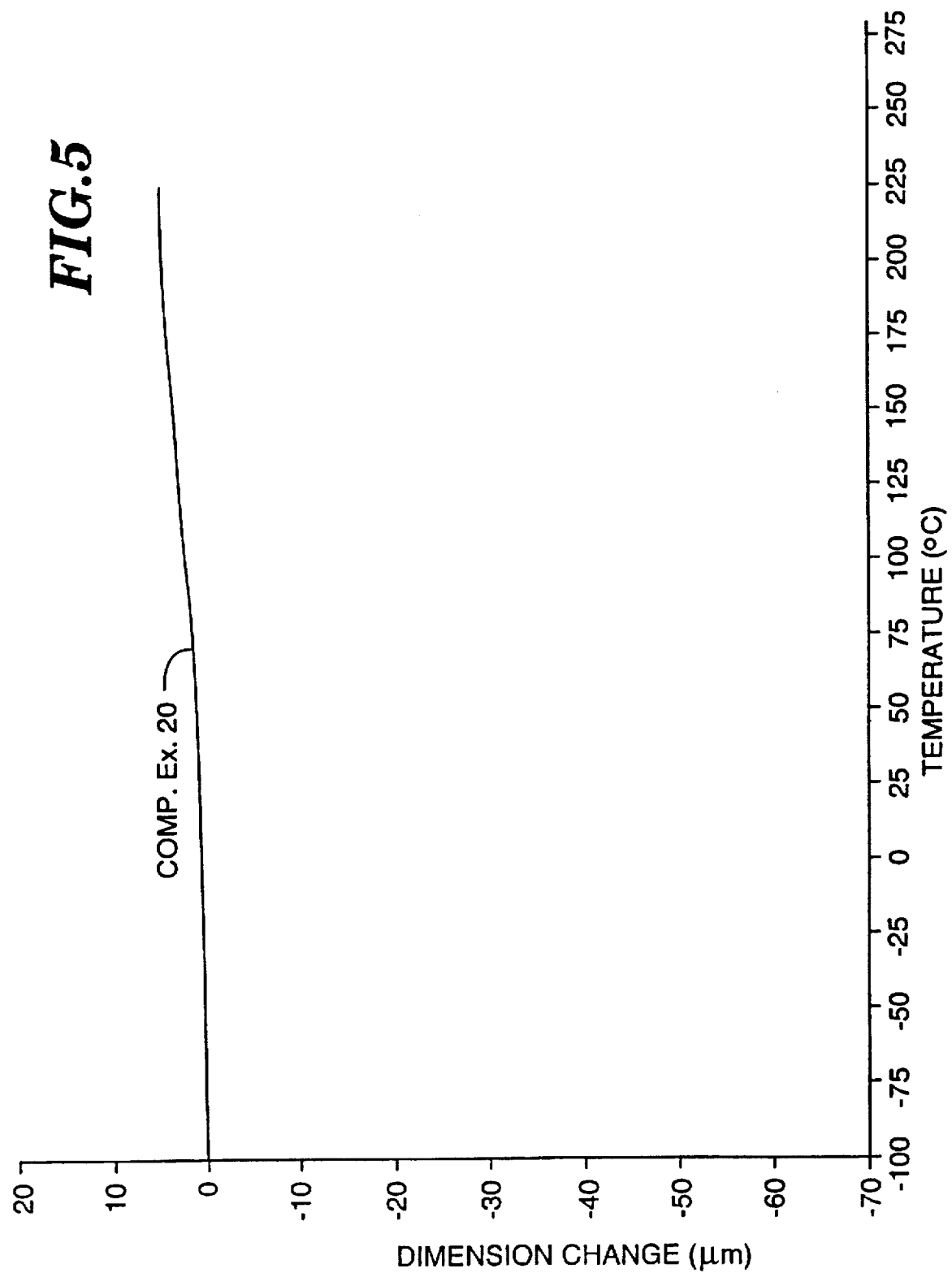
FIGS. 5–12 illustrate the thermomechanical properties of the Comparative Examples 20, 4, 5, 15, 16, 17, 18, and 19, respectively.
Figure 6:
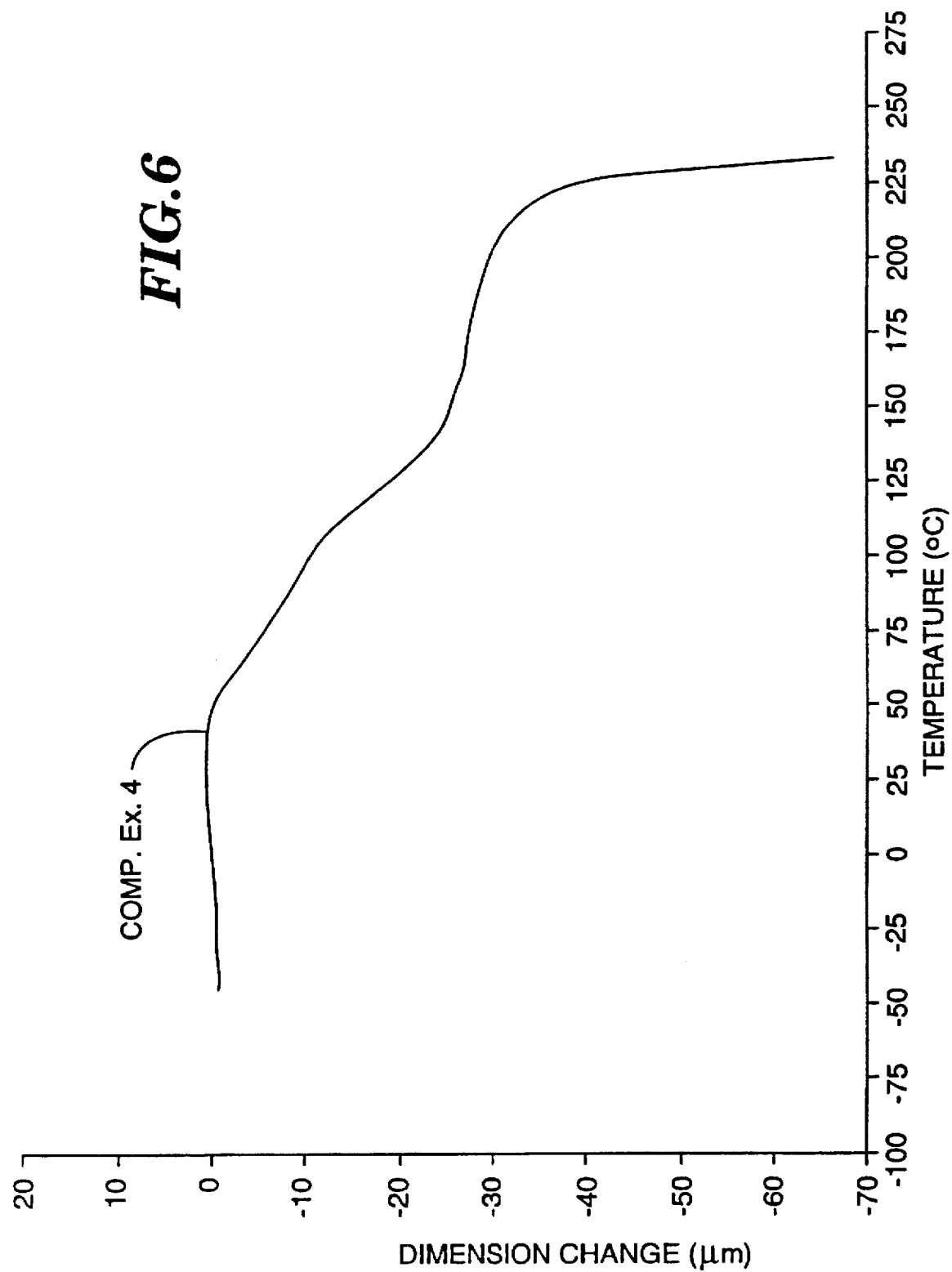
Figure 7:
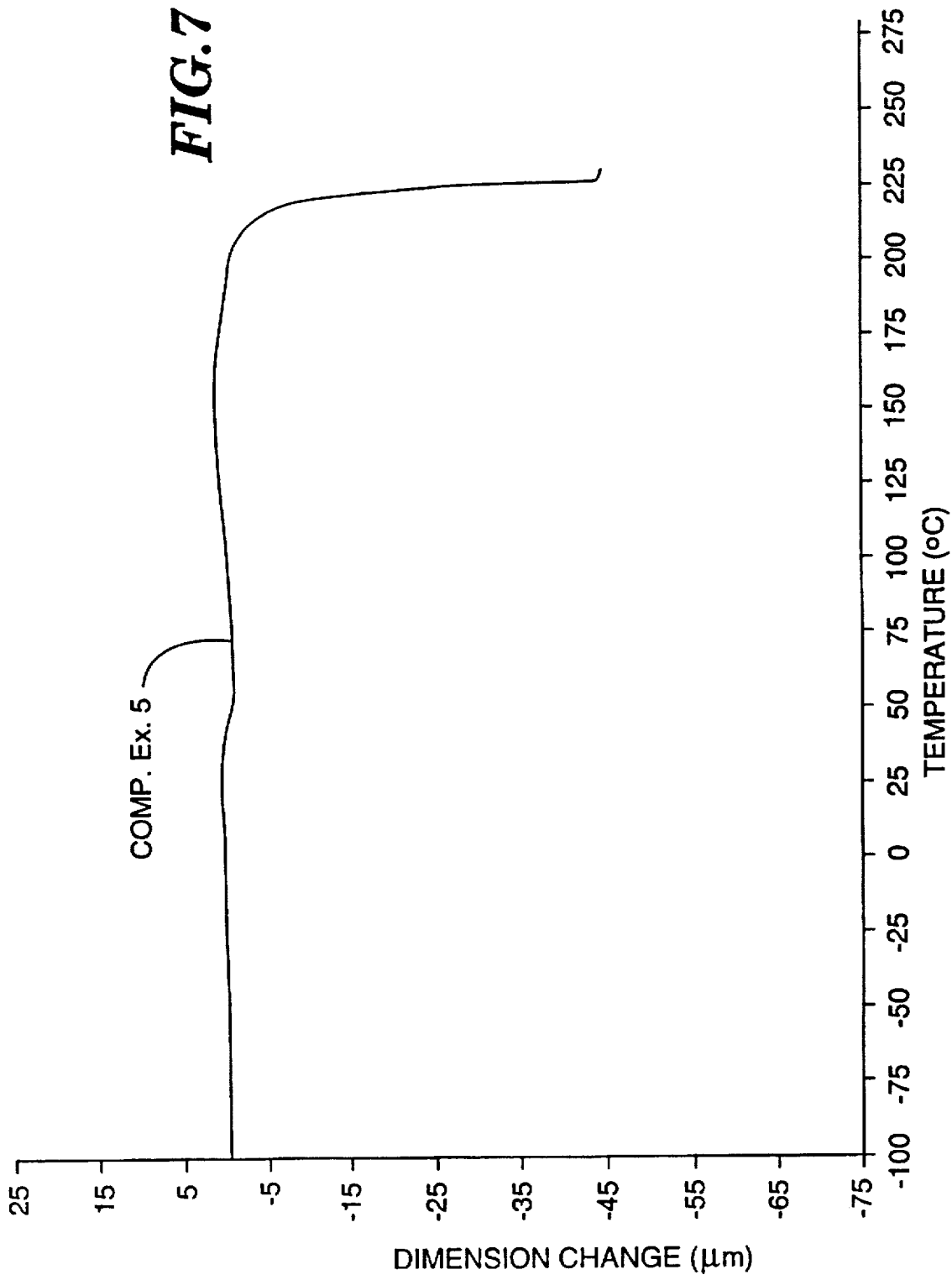
Figure 8:
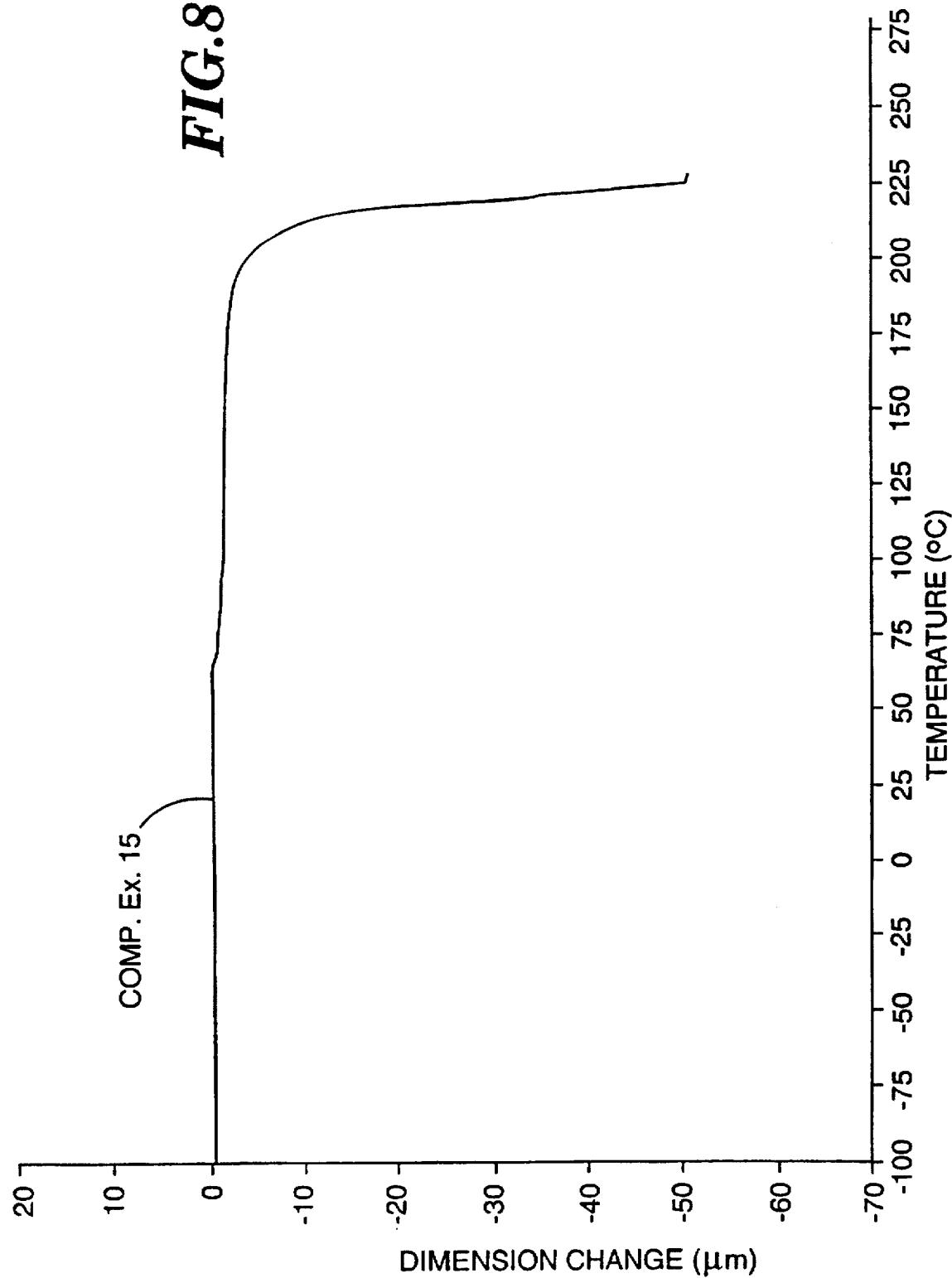
Figure 9:
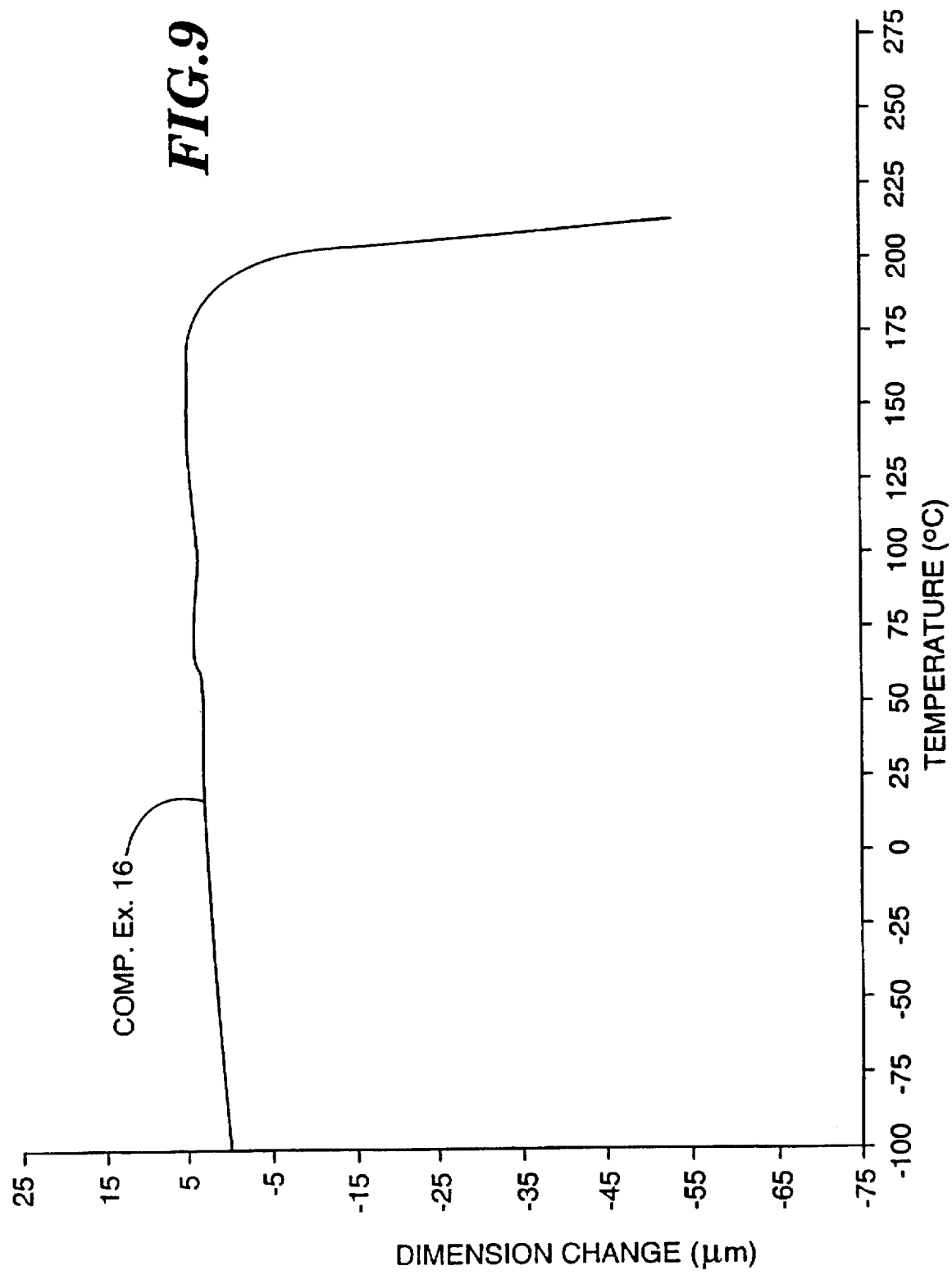
Figure 10:
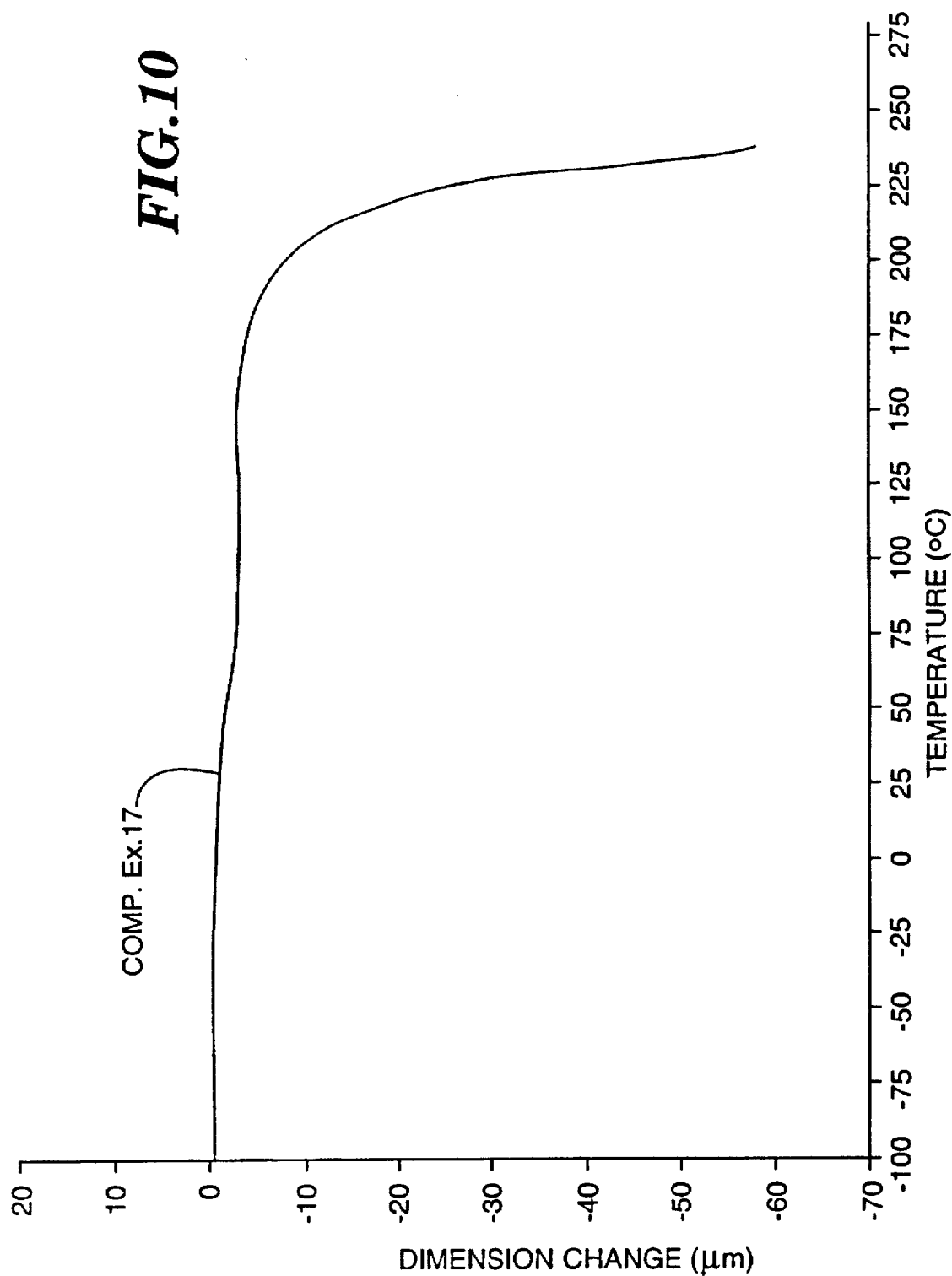
Figure 11:
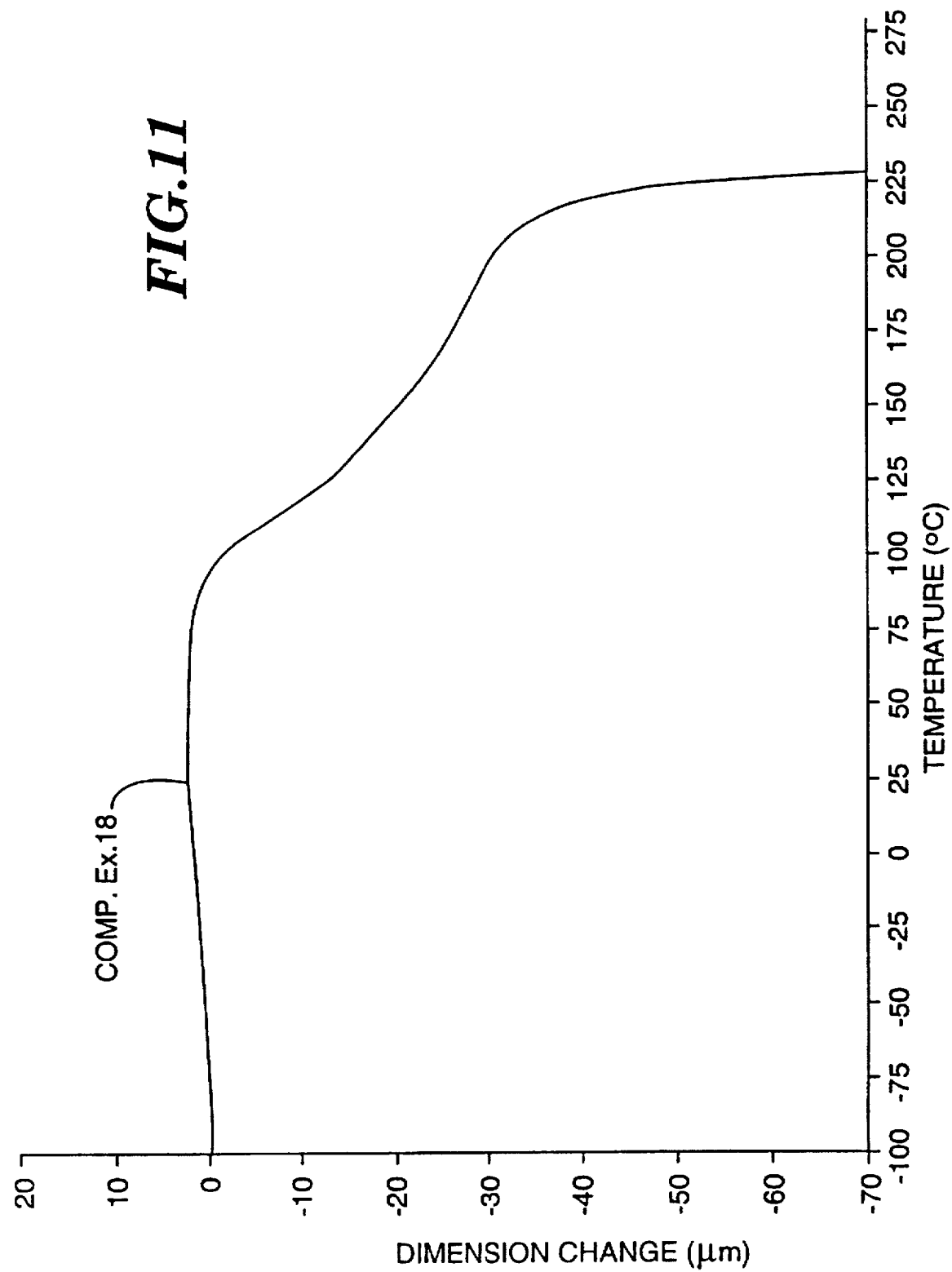
Figure 12:
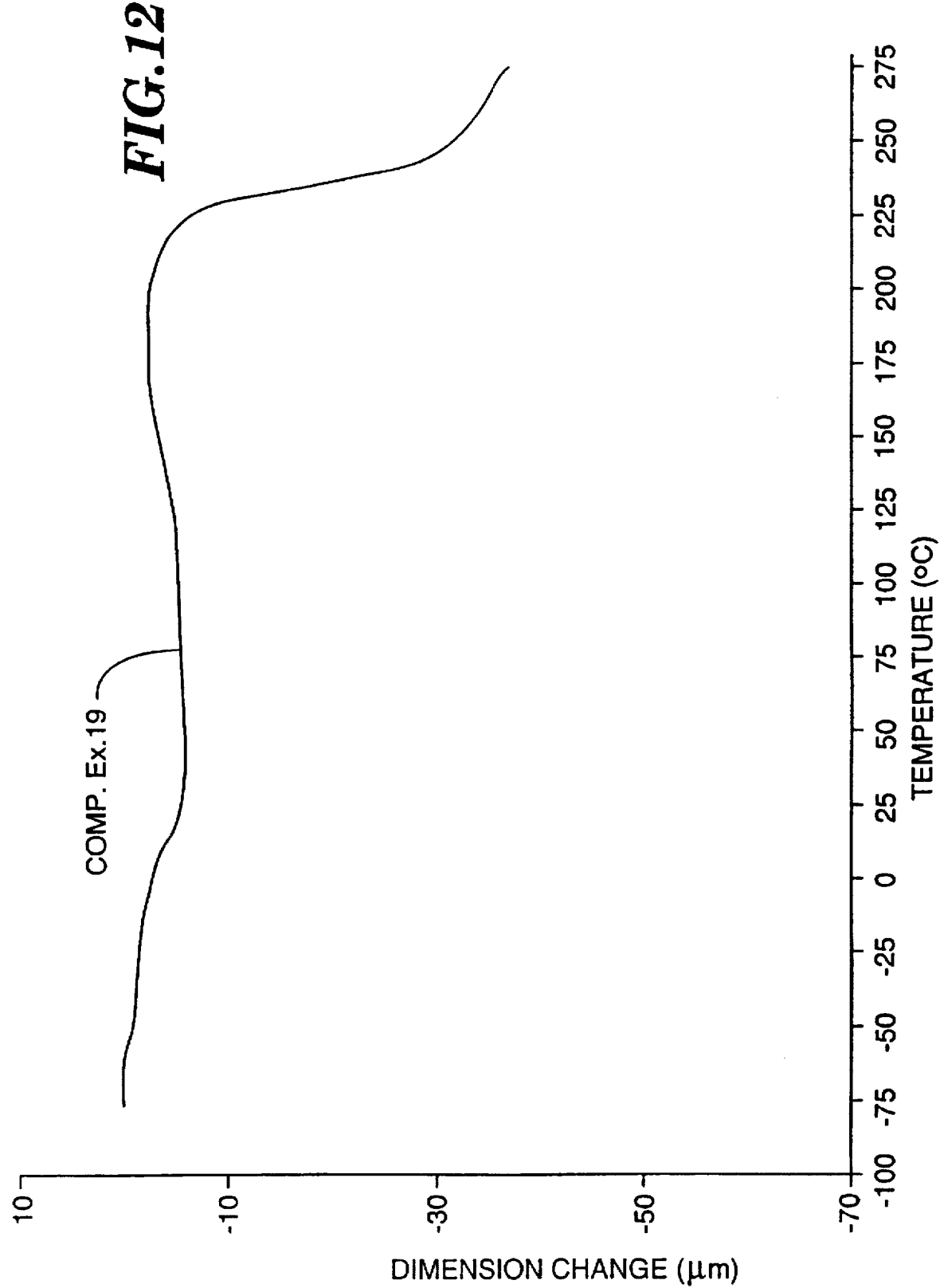
Figure 13:
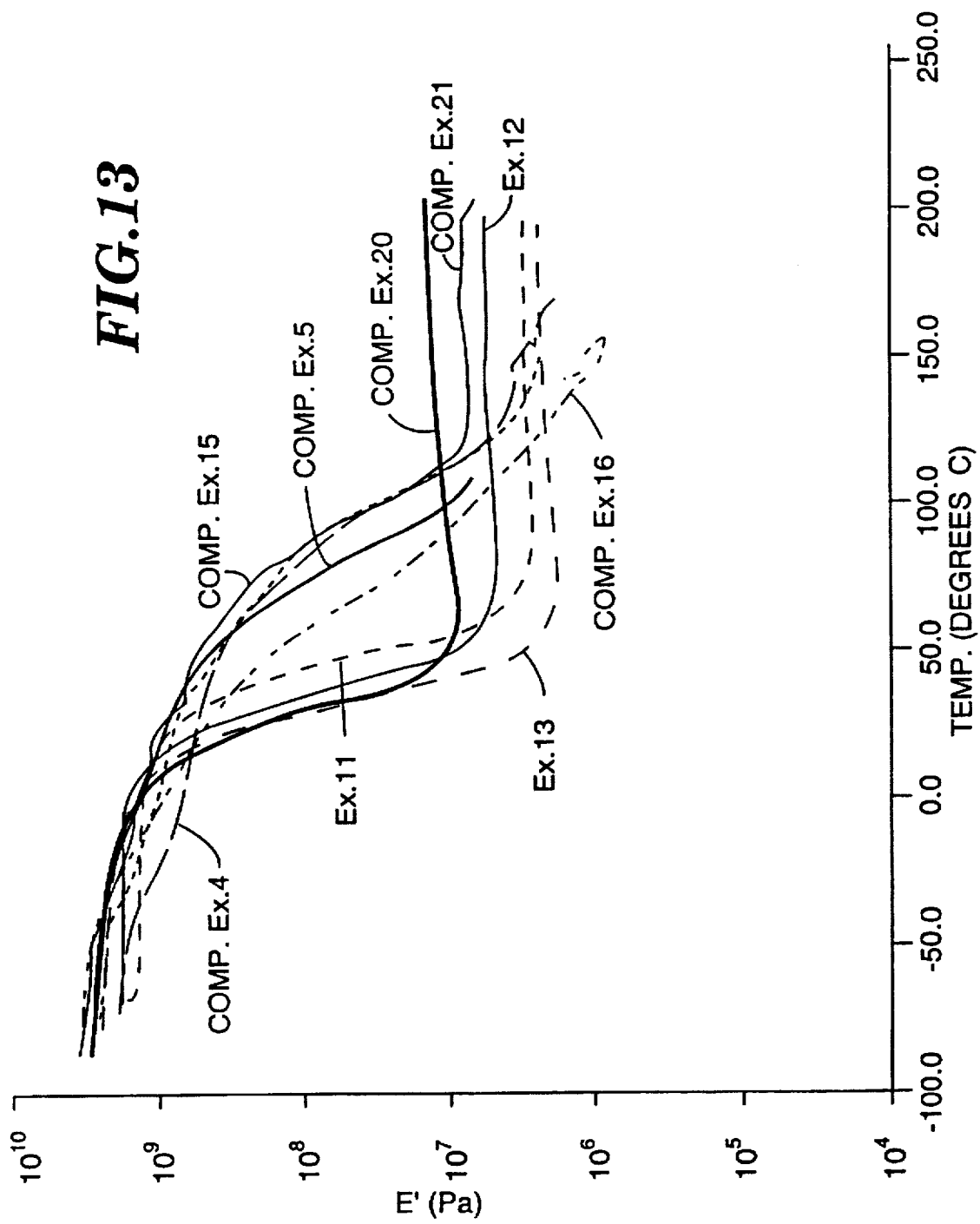
FIG. 13 illustrates the storage modulus of Examples 11–13 of the present invention and Comparative Examples 4, 5, 15, 16, 20 and 21 as a function of temperature measured by using a Dynamic Mechanical Thermal Analyzer.
Figure 14:
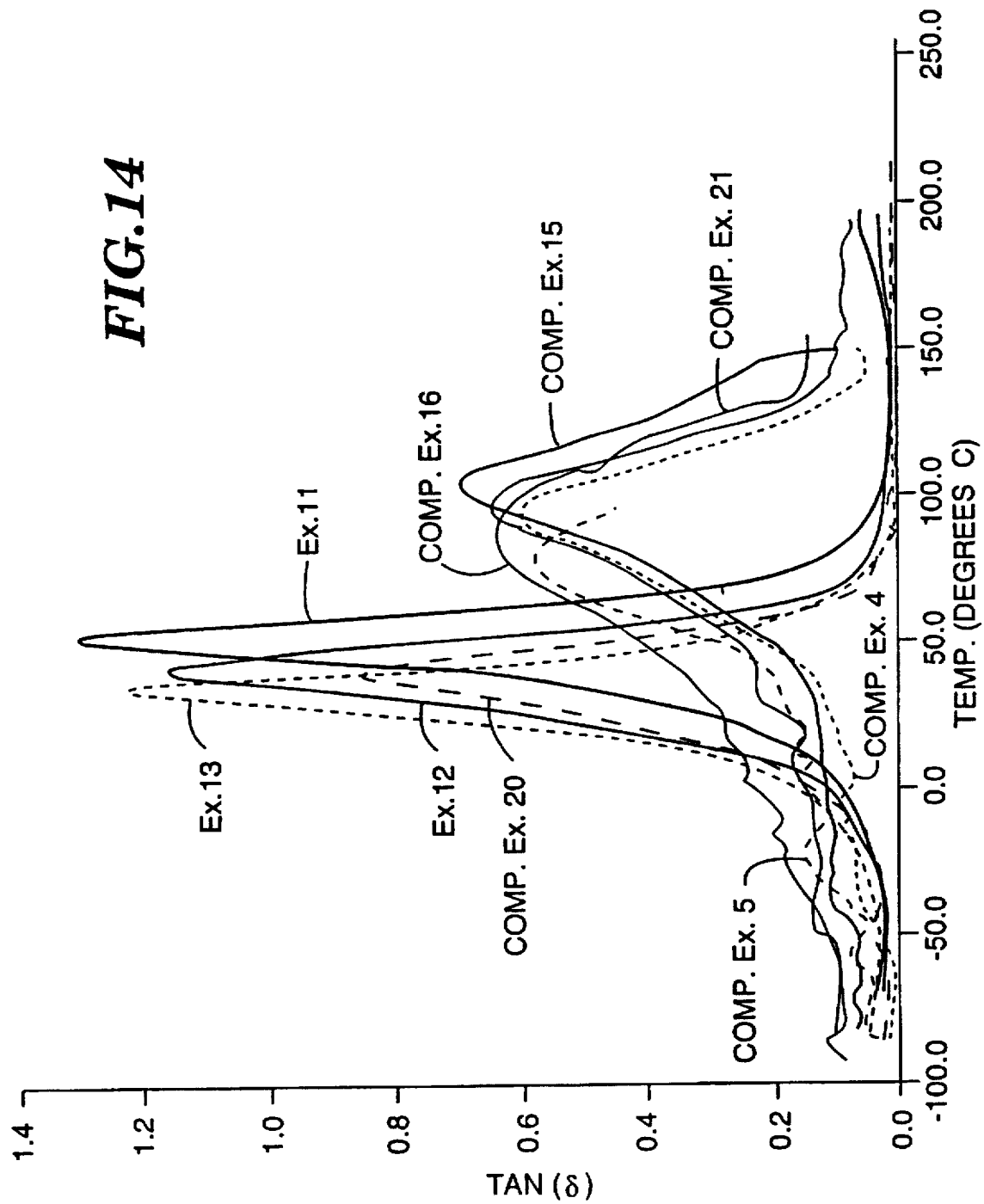
FIG. 14 illustrates the Tan (δ) of Examples 11–13 of the present invention and Comparative Examples 4, 5, 15, 16, 20 and 21 as a function of temperature measured by using a Dynamic Mechanical Thermal Analyzer.
Figure 15:
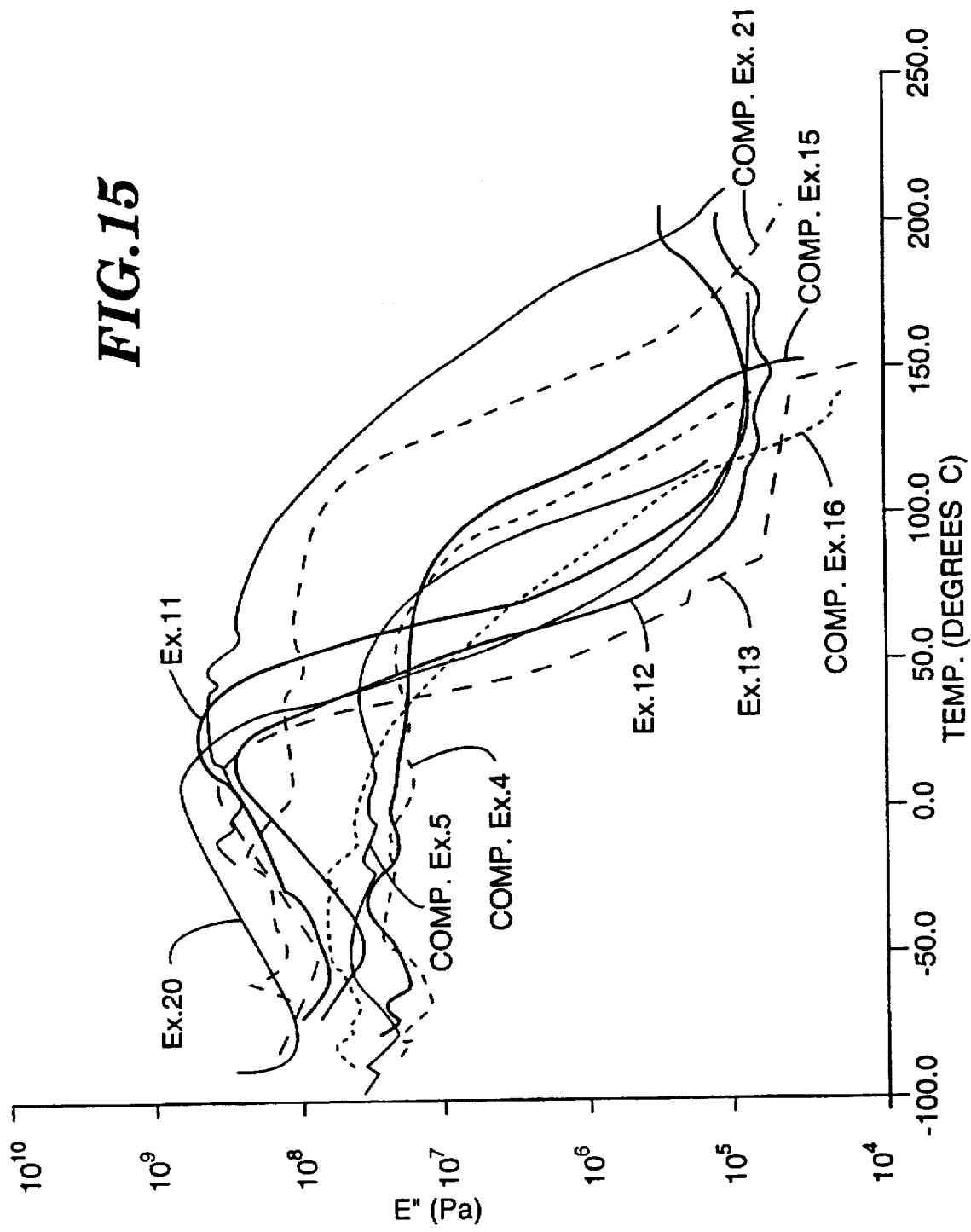
FIG. 15 illustrates the loss modulus of Examples 11–13 of the present invention and Comparative Examples 4, 5, 15, 16, 20 and 21 as a function of temperature measured by using a Dynamic Mechanical Thermal Analyzer.
Figure 16:
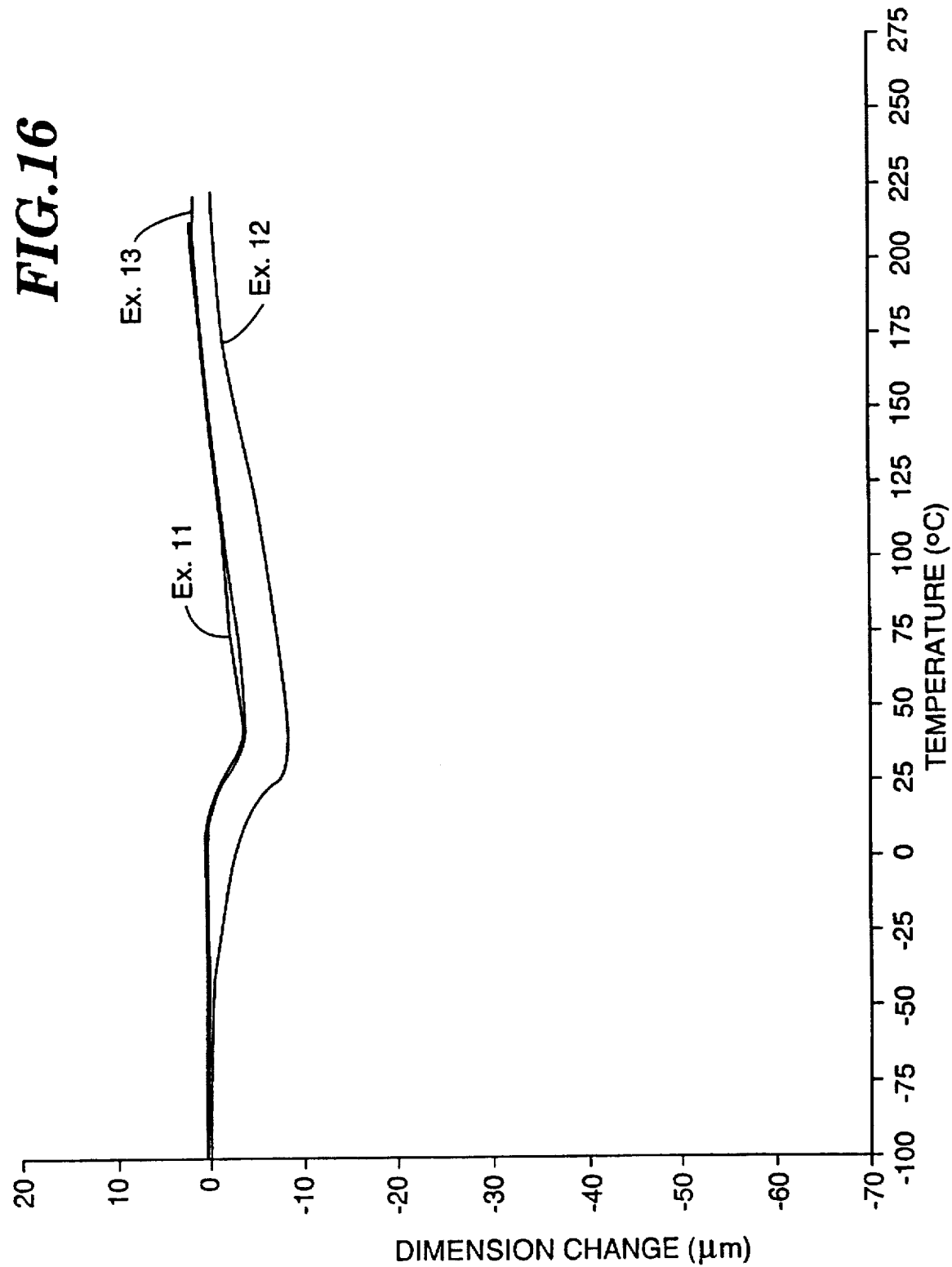
FIGS. 16–17 illustrates the thermomechanical properties of Examples 11–13 and 1–3, respectively of the present invention.
Figure 17:
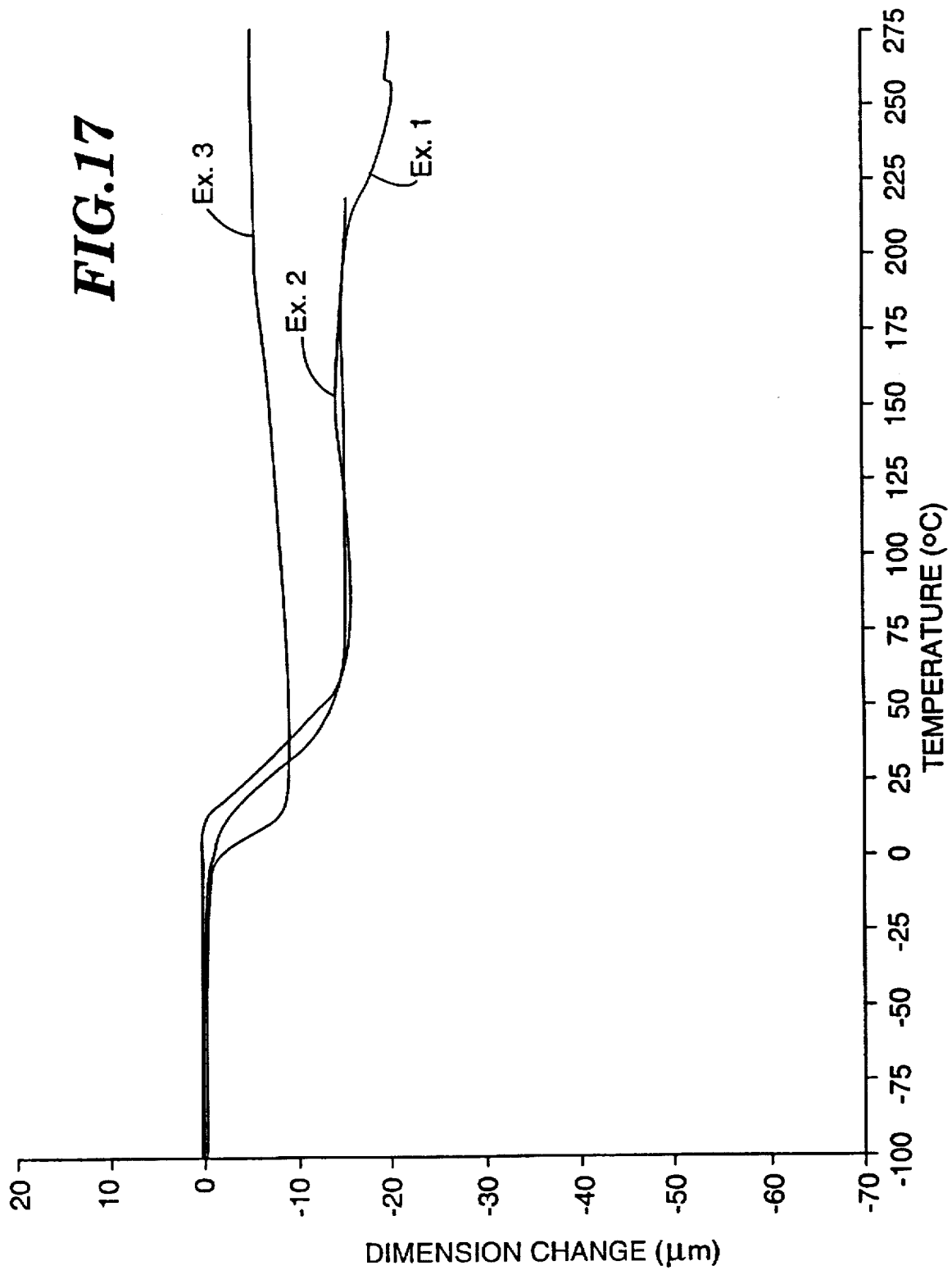

Examples 11–13, and Comparative Examples 4, 5, 20 and 21 were measured by means of TA Instruments DSC-910 (differential scanning calorimeter) from $-100°$ C. to $150°$ C. with a temperature ramp of $20°$ C./min. Sample size was kept in the range of 3.00–7.00 milligrams. The DSC thermograms of Examples 11–13, were similar to that of Comparative Example 20 (solvent-based reactive 2-part PUR). The glass transition temperature of Comparative Example 20 is close to those of Examples 11–13 of the present invention. No endothermic crystalline melting peaks were observed in Examples 11–13 as well as Comparative Example 20, which implies that Examples 11–13 and Comparative Example 20 have similar amorphous hard and soft segment microstructures as well as similar chemical structures. The thermogram of Comparative Example 21 shows similar curve to Examples 11–13 and Comparative Example 20, but its glass transition temperature is much higher i.e., $70.3°$ C. versus $12°$ C. to $30°$ C. Comparative Example 21 does not show an endothermic crystalline melting peak either. In contrast to the present invention, Comparative Examples 4 and 5 show distinct endothermic crystalline melting peaks at $71.2°$ and $69.4°$ C., respectively. Both Comparative Examples 4 and 5 show no evidence of glass transition, which implies that they have a crystalline and/or glassy microstructure. DSC data are summarized in Table 10 and the DSC Curves are shown in FIGS. 3 and 4.

Test C: Thermomechanical Analysis (TMA)

Thermomechanical properties of Examples 1–3, 11–13, and Comparative Examples 4, 5 and 15–20 were tested by a TA Instruments TMA-943 with a 5-gram-weight load on top of the vertically positioned probe. Sample thickness was maintained in the range of 25–50 microns. The thermal transitions of samples were monitored from $-100°$ C. to $275°$ C. with a temperature ramp of $10°$ C./min. The TMA curves of Examples 1–3, 11–13 and Comparative Examples 4, 5 and 15–20 shown in FIGS. 5–12 and 16–17 and the data presented in Table 11 illustrate that the water-based reactive 2-part PURs (Examples 1–3 and 11–13 of the present invention) and Comparative Example 20 (a conventional solvent-based reactive 2-part PUR) have no softening temperatures even though the materials of Examples 1 and 2 are very soft and rubbery, whereas the commercially supplied water-based one-part polyurethane-ureas of Comparative Examples 4, 5 and 15–19 show distinct softening temperatures.

The TMA results show that Examples 1–3 and 11–13 of the present invention exhibit similar thermal stability to Comparative Example 20 (a conventional solvent-based reactive 2-part PUR). Examples 1–3 and 11–13, and Comparative Example 20 show far superior thermal stability than conventional one-part water-based polyurethane-ureas (Comparative Examples 4, 5 and 15–19).

Test D: Dynamic Mechanical Thermal Analysis (DMTA)

Dynamic mechanical properties of Examples 11–13 and Comparative Examples 4, 5, 15, 16, 20 and 21 were measured by a Rheometrics Solid Analyzer (RSA-II) using a rectangular tension mode with 1 rad/sec dynamic frequency. The sample dimension was kept at $0.09 \times 5.0 \times 22.5$ mm$^3$ and the temperature was monitored from $-75°$ C. to $200°$ C. with a ramp of $2°$ C./min.

The purpose of this test was to evaluate the temperature location and size of the damping factor [i.e., Tan ($\delta$) peak] at the glass transition region of the polymer materials as well as their modulus and thermal stability. I have discovered that the size and temperature location of the Tan ($\delta$) peak at glass transition region are very important characteristics that control the scratch resistance and self-healing ability of a polymer material. I have further discovered that a polymer with a high damping factor and with its glass transition region located in ambient temperature can effectively store the energy that may be applied to the polymer surface and use the stored energy to reconfigure or to overcome the rotational or vibrational strain barriers of the deformed configuration or the twisted and/or distorted polymer backbones and/or side-chains, e.g., scratched surface, so as to result in a thermodynamically stabilized configuration or microstructure. This process is also referred to as "self-healing" or "self-repairing". I have discovered that self-healing characteristics can occur in ambient temperature if the glass transition region and/or Tan ($\delta$) peak is located at ambient temperature. Accordingly, the larger the damping factor of the polymer, the faster or easier the scratched surface can self-heal. Therefore, I theorize that the most preferred location of the Tan ($\delta$) peak at glass transition region is in the ambient temperature range and the most preferred size of Tan ($\delta$) is greater than 0.9. However, other factors, such as elastomeric properties of the polymer material (i.e., storage modulus) at test temperature, the degree of crosslink density and the ease of polymer chain slippage, may also play an important role in the self-healing process and provide a so-called synergistic effect.

The DMTA curves of Comparative Examples 4, 5, 15 and 16 (i.e., conventional one-part water-based polyurethane-ureas) show distinct softening points at $150°$ C., whereas no glass transition region at ambient temperature or rubbery plateau region is observed in the DMTA thermograms. Furthermore, they do not show damping characteristics in the ambient temperature region, either. In addition, their storage moduli (which are correspondent to the stiffness of the material) are in between $10^9$ Pa and $10^8$ Pa in the temperature range of $25°$ C. to $70°$ C. which is classified as glassy to plastic material regions. In glassy regions and plastic regions, polymer chains are frozen and have much less degree of freedom to rotate or move than that in a rubbery state. Therefore, no self-healing characteristics are expected to be seen for the materials of Comparative Examples 4, 5, 15, and 16 at ambient temperature due to their high storage moduli in between $25°$ C. and $70°$ C. and no glass transition region at ambient temperature.

Examples 11–13 and Comparative Examples 20 and 21 exhibit excellent thermal stability and distinct rubbery plateau regions. Examples 11–13 of the present invention were found to have substantially higher damping characteristics (i.e., larger Tan ($\delta$) peak heights) than the Comparative Examples 20 and 21. The Tan ($\delta$) peaks in the glass transition region for Examples 11–13 are located in between $20°$ C. and $60°$ C. while the Tan ($\delta$) peaks for Comparative Examples 20 and 21 are located in between $30°$ C. and $60°$ C. and $80°$ C. and $110°$ C., respectively. The heights of the Tan ($\delta$) peaks for Examples 11–13 are 1.29, 1.15, and 1.14, respectively, whereas the heights for Comparative Examples 20 and 21 are 0.77 and 0.55, respectively. In addition, the storage moduli, which are correspondent to the stiffness of the polymer material, for Examples 11–13 of the present invention and Comparative Example 20 are in the range of $10^8$ Pa and $10^6$ Pa in between 25° C. and 70° C. which are classified as plastic to rubbery regions, whereas the storage modulus of Comparative Example 21 is in the range of $10^9$ Pa and $10^8$ Pa in between 25° C. and 70° C. which are classified as glassy to plastic regions. Accordingly, Examples 11–13 (i.e., water-based reactive two-part polyurethanes of the present invention) and Comparative Example 20 (i.e., solvent-based reactive two-part polyurethane) were found to have self-healing characteristics at ambient temperature. Furthermore, Examples 11–13 were found to show more efficient and faster self-healing characteristics at ambient temperature than Comparative Example 20, which I theorize was due to their higher damping characteristics [i.e., larger size of the Tan (δ) peak] at ambient temperature and greater tendency of polymer chain slippage during the self-healing process resulting from the introduction of polysiloxane segments into the polymer backbones.

In contrast to the present invention, the Comparative Example 21 is similar to Comparative Examples 4, 5, 15 and 16 whose polymer chains remain frozen in a glassy state and have a much lower degree of freedom to move or rotate than in a rubbery state. Hence, no self-healing characteristics were observed in Comparative Example 21 (i.e., Miles' water-based reactive two-part polyurethane-urea) due to its high storage modulus and lack of damping characteristics at ambient temperature.

The storage moduli of Examples 11–13 and Comparative Examples 4, 5, 15, 16, 20 and 21 at 0° C. are approximately at $10^9$ Pa (see Table 12) which reflects that all the samples are at glassy region where the polymer chains are well-frozen at 0° C. and the mobility of the polymer chains are limited. Accordingly, no self-healing characteristics are expected to be observed in Examples 11–13 and Comparative Examples 4, 5, 15, 16, 20 and 21 at 0° C. The data and thermograms obtained from DMTA are illustrated in Table 12 and FIGS. 13–15. The scratch-resistance and self-healing characteristics are discussed further in Test E.

Test E: Scratch and Mar Resistance and Self-Healability at Different Temperatures Scratch and mar resistance were measured by a Balanced-Beam Scrape Tester described in ASTM-2197-86. The Hoffman stylus is held at 45 degrees from the vertical, the top sloping in the direction of test sample travel, and it is held in place by a fulcrum elevated at 22 degrees. Weights (50-gram-weight to 700-gram-weight) were placed on the weight support, the beam was lowered until the loop rested on top of the test specimen, following which the sliding platform was slowly pushed across the specimen. The scratch tests were performed individually at 0° C., 25° C. and 70° C. The specimens that were scratched or marred were put in 0° C., 25° C. and 70° C., respectively to observe their self-healing characteristics. By "self-healing" it is meant that the deformed or marred surfaces can return to its original appearance.

The factors that control the self-healing process that I theorized in Test D are: (1) Tan (δ) peak size, (2) temperature location of glass transition, (3) storage modulus, (4) the ease of polymer chain slippage, and (5) temperature. The purpose of this test is to determine which Example coatings exhibit scratch and mar resistance and self-healing characteristics at the test temperature.

The scratch and mar resistance and self-healability of Examples 9, 11–13 and Comparative Examples 4, 5 and 15–21 were tested individually at 0° C., 25° C. and 70° C. All the coating examples were applied to a pigmented thermoplastic film with adhesive attached to the opposite side. The thermoplastic films were mounted via the adhesive to the painted steel panels and conditioned at 0° C., 25° C. and 70° C. for 15 minutes separately. The scratch and mar resistance were tested from 50-gram-weight load up to 700-gram-weight load. The scratched samples tested at 0° C., 25° C. and 70° C. were put in 0° C., 25° C., 70° C. and 120° C. ovens and their self-healing characteristics were evaluated. The results of scratch and mar resistance and self-healability are presented in Table 13.

Examples 11–13 (i.e., the siloxane-containing cured PURs of the present invention) showed superior scratch and mar resistance as well as self-healing characteristics when compared to all other tested Examples.

Examples 12–13 exhibited excellent scratch and mar resistance from 50-gram-weight load up to 700-gram-weight load and their scratches and mars resulted from high weight load self-healed in 10 minutes at room temperature. Example 11 self-healed in 1 hour at room temperature when the weight load was less than 300 grams, otherwise it self-healed in 6 hours. By putting the scratched or marred Examples 11–13 of the present invention in 70° C. or 120° C. ovens, they self-healed in a few seconds. Other means of heating will also speed the healing process. In contrast to the present invention, Comparative Examples 4, 5, 15–19 and 21 showed very poor scratch resistance and no self-healing characteristics Example 9 (non-siloxane containing cured PUR of the present invention) exhibited similar scratch and mar resistance as well as self-healing characteristics as that of Comparative Example 20 (i.e., conventional solvent-based reactive two-part PUR). Example 9 self-healed in 14 days at room temperature when scratched by the weight load greater than 200 grams while the solvent-based 2-part Comparative Example 20 self-healed in 10 days at room temperature when scratched by the weight load greater than 100 grams. Both samples self-healed in 35 minutes when placed in a 70° C. oven or 10 minutes when placed in a 120° oven. This performance is due to Example 9 and Comparative Example 20 having similar physical properties (e.g., storage modulus, glass transition region, Tan (δ) peak size, etc.) which results in similar scratch and mar resistance as well as self-healability. There are no siloxane segments that are chemically incorporated into the polymer backbones to promote the scratch resistance and self-healing characteristics. Therefore, the scratch and mar resistance and self-healability of Example 9 and Comparative Example 20 are inferior to Examples 11–13.

All the samples (Examples 9, 11–13 and Comparative Examples 4, 5 and 15–21) tested showed poor scratch and mar resistance at 0° C. and no distinct self-healing was observed at 0° C. However, when these scratched samples were put in room temperature, 70° C. and 120° C. individually, Examples 9, 11–13 and Comparative Example 20 showed distinct self-healing characteristics. Again, Examples 12 and 13 self-healed in 10 minutes at room temperature and in a few seconds at 70° C. or 120° C. Example 11 self-healed in 6–7 hours at room temperature and a few seconds in both a 70° C. oven and a 120° C. oven. Example 9 and Comparative Example 20 self-healed in 10–14 days at room temperature and 15 minutes to an hour at 70° C. and 120° C. In contrast to the present invention, the Comparative Examples 4, 5, 15–19 and 21 did not exhibit distinct self-healing characteristics at room temperature, 70° C. and 120° C. (they were scratched permanently).

When the scratch resistance was tested at 70° C., no scratches were seen in Examples 9, 11–13 and Comparative Example 20. However, Comparative Examples 4, 5, 15-19 and 21 showed poor scratch resistance. They showed distinct scratches when the weight load was 50 grams and exhibited no self-healing characteristics.

TABLE 2

Preparation of Semi-Crosslinked Hydroxyl-Terminated Polyurethane Prepolymer Dispersions of the Invention

| | Materials* | Ex. 1 | Ex. 2 | Ex. 3 |
|---|---|---|---|---|
| a | Polyol I | 65.41 | 65.41 | 53.84 |
| b | Polyol II | 24.53 | 4.46 | — |
| c | CHDM | 11.72 | 14.91 | 11.56 |
| d | TMP | 2.23 | 2.23 | 1.92 |
| e | COTIN ™-200 | 0.03 | 0.03 | 0.03 |
| f | Desmodur ™-W | 28.16 | 28.16 | 28.95 |
| g | MEK | 35.00 | 35.00 | 30.00 |
| h | TEA | 4.61 | 4.61 | 4.03 |
| i | De-Ionized Water | 195.00 | 175.00 | 175.00 |
| j | % Solid | 40.50 | 40.20 | 35.2% |

*a–i in grams

TABLE 3

Curing Formulations of Water-Based Reactive Two-Part PURs of the Invention*

| Materials | Ex. 1 | Ex. 2 | Ex. 3 |
|---|---|---|---|
| Part A: | | | |
| Amount of Dispersion | 79.40 | 78.20 | 83.80 |
| Ekatasolve ™ DB-Acetate | 8.10 | 8.20 | 8.00 |
| Fluorad ™ FC-430 | 0.22 | 0.22 | 0.22 |
| De-Ionized Water | 12.28 | 13.38 | 7.98 |
| Part B: | | | |
| Bayhydrol ™ XP-7007 | 8.70 | 9.20 | 9.20 |
| Exxate ™-600 | 2.80 | 3.00 | 3.00 |

*in grams

TABLE 5

Preparation of Water-Based Polyol Dispersions and Semi-Crosslinked, Hydroxyl-Terminated Polyurethane Dispersion of the Invention

| | Materials* | Ex. 6 | Ex. 7 | Ex. 8 | Ex. 9 |
|---|---|---|---|---|---|
| a | Polyol I | 160.00 | 482.00 | 123.12 | 230.88 |
| b | Polyol IV | — | — | 35.00 | — |
| c | Polyol VII | — | — | — | 53.52 |
| d | Joncryl ™-800B | 40.00 | — | — | — |
| e | Joncryl ™-802 | — | 122.50 | — | — |
| f | TMP | — | — | 10.72 | 21.45 |
| g | BEPD | — | — | 60.10 | 72.90 |
| h | Desmodur ™-W | — | — | 93.00 | 150.12 |
| i | MEK | 60.00 | 132.50 | 70.00 | 105.00 |
| j | TEA | 10.35 | 39.40 | 10.83 | 16.23 |
| k | De-Ionized Water | 240.00 | 700.00 | 570.00 | 745.00 |
| l | % Solid | 46.50 | 46.20 | 33.00 | 41.00 |

*a–k in grams

TABLE 6

Curing Formulations of Water-Based Reactive Two-Part PURs of the Invention*

| | Ex. 6 | Ex. 7 | Ex. 8 | Ex. 9 | Ex. 10 |
|---|---|---|---|---|---|
| Part A: | | | | | |
| Amount of Dispersion | 75.00 | 75.00 | 75.00 | 75.00 | 75.00 |
| Joncryl ™-540 | — | — | — | — | 25.00 |
| Ekatasolve ™ DB-Acetate | 6.00 | 5.50 | 5.00 | 4.50 | 5.50 |
| Fluorad ™ FC-430 | 0.24 | 0.24 | 0.20 | 0.20 | 0.26 |
| Texanol ™ | 0.80 | — | — | — | — |
| De-Ionized Water | 0.76 | 0.76 | 15.80 | 0.80 | 6.04 |
| Part B: | | | | | |
| Bayhydrol ™ XP-7043 | 9.00 | 11.34 | 8.91 | 10.80 | 13.50 |
| Exxate ™-600 | 1.00 | 1.26 | 0.99 | 1.20 | 1.50 |

*in grams

TABLE 4

Curing Formulations of Commercially Supplied Water-Based Polyurethane-Urea*

| | Comp. Ex. 4 | Comp. Ex. 5 | Comp. Ex. 15 | Comp. Ex. 16 | Comp. Ex. 17 | Comp. Ex. 18 | Comp. Ex. 19 |
|---|---|---|---|---|---|---|---|
| Neorez ™ XR-9679 | 0.00 | 0.00 | 0.00 | 0.00 | 0.00 | 80.14 | 66.60 |
| Neorez ™ XR-9699 | 0.00 | 0.00 | 0.00 | 0.00 | 87.50 | 0.00 | 0.00 |
| Bayhydrol ™-121 | 88.50 | 0.00 | 89.03 | 0.00 | 0.00 | 0.00 | 0.00 |
| Bayhydrol ™-110 | 0.00 | 88.50 | 0.00 | 89.03 | 0.00 | 0.00 | 0.00 |
| Neocryl ™ A-601 | 0.00 | 0.00 | 0.00 | 0.00 | 0.00 | 0.00 | 19.25 |
| Butyl Carbitol | 8.85 | 8.85 | 8.99 | 8.99 | 9.62 | 8.35 | 9.07 |
| Uvinul ™ N-539 | 1.06 | 1.06 | 1.08 | 1.08 | 1.05 | 0.85 | 0.93 |
| Tinuvin ™-123 | 0.35 | 0.35 | 0.36 | 0.36 | 0.35 | 0.28 | 0.31 |
| Triton ™ GR-7M | 0.27 | 0.27 | 0.27 | 0.27 | 0.26 | 0.30 | 0.29 |
| Byk ™-025 | 0.27 | 0.27 | 0.27 | 0.27 | 0.26 | 0.30 | 0.29 |
| Neorez ™ CX-100 | 0.70 | 0.70 | 0.00 | 0.00 | 0.96 | 1.07 | 1.07 |
| De-Ionized Water | 0.00 | 0.00 | 0.00 | 0.90 | 0.00 | 8.78 | 2.19 |
| Total | 100.00 | 100.00 | 100.00 | 100.00 | 100.00 | 100.00 | 100.00 |

*in grams

TABLE 7

Syntheses of Semi-Crosslinked Hydroxyl Terminated and Polydimethyl Siloxane-Contained Polyurethane Dispersions of the Invention*

| Materials | Ex. 11 | Ex. 12 | Ex. 13 |
|---|---|---|---|
| Polyol I | 138.52 | 250.10 | — |
| Polyol III | — | — | 272.16 |
| Polyol IV | 17.16 | 42.95 | 22.88 |
| CHDM | — | 151.00 | — |
| Polyol V | 206.40 | 160.00 | 185.60 |
| COTIN ™-200 | 0.08 | 0.10 | 0.10 |
| TMP | 13.41 | 13.41 | 22.88 |
| Desmodur ™-W | 139.52 | 139.52 | 186.04 |
| MEK | 120.00 | 200.00 | 120.00 |
| TEA | 10.35 | 18.70 | 12.00 |
| De-Ionized Water | 775.00 | 1050.00 | 1000.00 |
| % Solid | 39.00 | 42.50 | 37.00 |

*in grams unless indicated otherwise

TABLE 8

Curing Formulations of Water-Based Reactive Two-Part PURs of the Invention*

| Materials | Ex. 11 | Ex. 12 | Ex. 13 | Ex. 14 |
|---|---|---|---|---|
| Part A: | | | | |
| Amount of Dispersion | 90.40 | 93.30 | 94.00 | 90.40 |
| Ekatasolve ™ DB-Acetate | 7.20 | 6.70 | 6.00 | 7.20 |
| Fluorad ™ FC-430 | — | — | — | — |
| PM-Acetate | — | — | — | — |
| Tinuvin ™-123 | — | — | — | — |
| Tinuvin ™-1130 | — | — | — | — |
| Formrez ™ UL-30 | — | — | — | 0.002 |
| De-Ionized Water | 7.10 | — | — | 7.10 |
| Part B: | | | | |
| Bayhydrol ™ XP-7043 | 14.40 | 26.40 | 13.60 | 14.40 |
| Exxate ™-600 | 1.60 | 2.90 | 1.50 | 1.60 |

*in grams

TABLE 9

FTIR Results of Polyurethanes and Polyurethane-Urea

| Sample | Ex. 11 | Ex. 12 | Ex. 13 | Comp. Ex. 15 | Comp. Ex. 16 | Comp. Ex. 20 | Comp. Ex. 21 |
|---|---|---|---|---|---|---|---|
| Location of Carbonyl (C=O) Absorption Band of Urethane Linkage | | | | | | | |
| 1. Free C=O | 1720 cm$^{-1}$ | 1720 cm$^{-1}$ | 1720 cm$^{-1}$ | 1740 cm$^{-1}$ | 1724 cm$^{-1}$ | 1724 cm$^{-1}$ | 1722 cm$^{-1}$ |
| 2. H-Bonded C=O | 1685 cm$^{-1}$ | 1680 cm$^{-1}$ | 1685 cm$^{-1}$ | 1708 cm$^{-1}$ | 1695 cm$^{-1}$ | 1682 cm$^{-1}$ | 1685 cm$^{-1}$ |
| Location of Carbonyl (C=O) Absorption Band of Urea Linkage (Exhibiting as a Shoulder) | | | | | | | |
| 1. H-Bonded C=O | None | None | None | 1655 cm$^{-1}$ | 1650 cm$^{-1}$ | None | 1646 cm$^{-1}$ |

TABLE 10

Results of Differential Scanning Calorimeter of Polyurethanes and Polyurethane-Ureas Measured by using DSC

| Sample | Ex. 11 | Ex. 12 | Ex. 13 | Comp. Ex. 4 | Comp. Ex. 5 | Comp. Ex. 20 | Comp. Ex. 21 |
|---|---|---|---|---|---|---|---|
| DSC | | | | | | | |
| Tg (°C.) | 28.2 | 12.8 | 25.5 | None | None | 29.2 | 70.3 |
| Melting Temp. (°C.) | None | None | None | 71.4 | 69.4 | None | None |

TABLE 11

Thermomechanical Properties of Polyurethanes and Polyurethane-Ureas Measured by using TMA

| | Ex. 1 | Ex. 2 | Ex. 3 | Ex. 11 | Ex. 12 | Ex. 13 | Comp. Ex. 4 | Comp. Ex. 5 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|---|---|---|---|
| TMA | | | | | | | | | | | | | | |
| $T_g$ (°C.) | 12.0 | 5.0 | −8.0 | 22.4 | 8.0 | 16.8 | None | None | None | None | None | None | None | 22.5 |
| Penetration Depth at $T_g$ (micron) | 16.0 | 14.0 | 9.5 | 4.5 | 9.5 | 6.0 | — | — | — | — | — | — | — | 1.0 |
| Softening Temp. (°C.) | None | None | None | None | None | None | 224.0 | 221.0 | 214.4 | 199.3 | 204.6 | 201.6 | 220.6 | None |
| Penetration Depth at Softening Temp. (micron) | — | — | — | — | — | — | 67.0 | 45.0 | 50.0 | 50.0 | 55.0 | 55.0 | 40.0 | — |

TABLE 12

Dynamic Mechanical Properties of Polyurethanes and Polyurethane-Ureas Measured by using DMTA

| Sample | Ex. 11 | Ex. 12 | Ex. 13 | Comp. Ex. 4 Bayhydrol™ 121 + Neorez™ CX-100 | Comp. Ex. 5 Bayhydrol™ 110 + Neorez™ CX-100 | Comp. Ex. 15 Bayhydrol™ 121 | Comp. Ex. 16 Bayhydrol™-110 | Comp. Ex. 20 Convent. Solvent-Based Reactive 2-Part | Comp. Ex. 21 Mile's Water-Based Reactive 2-Part |
|---|---|---|---|---|---|---|---|---|---|
| DMTA | | | | | | | | | |
| $T_g$ (°C.) | 51.3 | 41.5 | 40.0 | None | None | None | None | 36.7 | 96.6 |
| Tan (δ) peak Height at $T_g$ | 1.29 | 1.15 | 1.14 | None | None | None | None | 0.77 | 0.55 |
| Storage Modulus (Pa) | | | | | | | | | |
| at 0° C. (Pa) | $1.4 \times 10^9$ | $1.4 \times 10^9$ | $1.9 \times 10^9$ | $6.9 \times 10^9$ | $1.3 \times 10^9$ | $1.0 \times 10^9$ | $8.7 \times 10^8$ | $1.6 \times 10^9$ | $1.4 \times 10^9$ |
| at 25° C. (Pa) | $9.0 \times 10^8$ | $5.5 \times 10^8$ | $6.8 \times 10^8$ | $5.1 \times 10^8$ | $7.7 \times 10^8$ | $7.4 \times 10^8$ | $4.7 \times 10^8$ | $3.5 \times 10^8$ | $9.7 \times 10^8$ |
| at 70° C. (Pa) | $4.1 \times 10^6$ | $4.5 \times 10^6$ | $3.2 \times 10^6$ | $2.1 \times 10^8$ | $1.0 \times 10^8$ | $1.3 \times 10^8$ | $3.5 \times 10^7$ | $9.8 \times 10^6$ | $2.2 \times 10^8$ |
| Rubbery Plateau Region (Pa) | $2.3 \times 10^6$ | $4.2 \times 10^6$ | $3.7 \times 10^6$ | — | — | — | — | $8.0 \times 10^6$ | $6.0 \times 10^6$ |
| $T_m$ (°C.) | None | None | None | 103.0 | 84.9 | 106.8 | 85.0 | None | None |
| Tan (δ) peak height at $T_m$ | None | None | None | 0.58 | 0.54 | 0.63 | 0.56 | None | None |

TABLE 13

Scratch Resistance and Self-Healability of Polyurethanes and Polyurethane-ureas Tested Under Different Temperatures

| Graphic Films | Tested at 0° C. | Tested at 25° C. | Tested at 70° C. |
|---|---|---|---|
| Example 9 (Dispersion H-30A) | Permanent[1] Scratch W/O[3] Self-Healing | Scratched at[1] ≧200 grams and Self-Healed in 14 days | No Scratch |
| Example 11 (Dispersion H-37A) | Permanent[1] Scratch W/O Self-Healing | Scratched at[1] ≧300 grams and Self-Healed in 6 Hours | No Scratch |
| Example 12 (Dispersion H-38A) | Permanent[1] Scratch W/O Self-Healing | No Scratch, Self-Healed within 10 minutes | No Scratch |
| Example 13 (Dispersion H-39A) | Permanent[1] Scratch W/O Self-Healing | No Scratch, Self-Healed within 2 minutes | No Scratch |
| Comp. Ex. 4 (Bayhydrol™-121 + Neocryl™ CX-100) | Permanent[2] Scratch W/O Self-Healing | Scratched at[2] ≧50 Grams W/O Self-Healing | Permanent[2] Scratch W/O Self-Healing |
| Comp. Ex. 5 (Bayhydrol™-110 + Neocryl™ CX-100) | Permanent[2] Scratch W/O Self-Healing | Scratched at[2] ≧50 Grams W/O Self-Healing | Permanent[2] Scratch W/O Self-Healing |
| Comp. Ex. 15 (Bayhydrol™-121) | Permanent[2] Scratch W/O Self-Healing | Scratched at[2] ≧50 Grams W/O Self- | Permanent[2] Scratch W/O Self-Healing |

TABLE 13-continued

Scratch Resistance and Self-Healability of Polyurethanes and Polyurethane-ureas Tested Under Different Temperatures

| Graphic Films | Tested at 0° C. | Tested at 25° C. | Tested at 70° C. |
|---|---|---|---|
| Comp. Ex. 16 (Bayhydrol ™-110) | Permanent[2] Scratch W/O Self-Healing | Scratched at[2] ≧50 Grams W/O Self-Healing | Permanent[2] Scratch W/O Self-Healing |
| Comp. Ex. 17 (Neorez ™-9699 + Neorez ™ CX-100) | Permanent[2] Scratch W/O Self-Healing | Scratched at[2] ≧50 Grams W/O Self-Healing | Permanent[2] Scratch W/O Self-Healing |
| Comp. Ex. 18 (Neorez ™-9679 + Neorez ™ CX-100) | Permanent[2] Scratch W/O Self-Healing | Scratched at[2] ≧50 Grams W/O Self-Healing | Permanent[2] Scratch W/O Self-Healing |
| Comp. Ex. 19 (Neorez ™-9679 + Neorez ™-A601 + Neorez ™ CX-100) | Permanent[2] Scratch W/O Self-Healing | Scratched at[2] ≧50 Grams W/O Self-Healing | Permanent[2] Scratch W/O Self-Healing |
| Comp. Ex. 20 Conventional Solvent-Based Reactive 2-Part PUR | Permanent[1] Scratch W/O Self-Healing | Scratched at[1] ≧100 Grams and Self-Healed in 10 days | No Scratch |
| Comp. Ex. 21 Miles Water-Based Reactive 2-Part Polyurethane-Urea | Permanent[2] Scratch W/O Self-Healing | Scratched at[2] ≧50 Grams W/O Self-Healing | Permanent[2] Scratch W/O Self-Healing |

[1]Samples were scratched permanently without self-healing character at 0° C. However, they all self-healed when put them back in 25° C., 70° C. or 120° C.
[2]Samples were scratched permanently without self-healing character in tested temperatures. No self-healing of the scratched surface was observed even when put in higher temperatures, e.g. 25° C., 70° C. or 120° C.
[3]W/O means "without".

Examples of scratch resistant and self-healable solvent-based 2-part PUR clear coats that contain segmented polydimethylsiloxane diol or perfluoropolyether diol in the resulting cross-linked PUR backbones are provided in Tables 15 and 16. The scratch resistance and self-healing characteristics are summarized in Table 17. The materials used and their suppliers are summarized in Table 14.

TABLE 14

Materials and Suppliers

| Materials | Functions and Characteristics | Suppliers |
|---|---|---|
| Carbiol Terminated Polydimethyl Siloxane Diol (PMS-556) | Polydimethyl Siloxane Diol —OH Eq Wt = 472.45 | Huls America, Inc |
| Dynamar ™ L-9939 | Perfluoroether Diol —OH Eq Wt = 565.20 | 3M |
| Lexorez ™-1400-120 | Polyester Diol —OH Eq Wt = 470.00 | Inolex Chemical |
| Joncryl ™-510 | Acrylic Polyol —OH Eq Wt = 400.00 | S. C. Johnson Polymer |
| Joncryl ™ SCX-802 | Acrylic Polyol —OH Eq Wt = 660.00 | S. C. Johnson Polymer |
| Joncryl ™-587 | Acrylic Polyol —OH Eq Wt = 600.00 | S. C. Johnson Polymer |
| Tone ™-305 | Polyester Triol —OH Eq Wt = 180.00 | Union Carbide |
| Tone ™-201 | Polyester diol —OH Eq Wt = 264.62 | Union Carbide |
| Butyl Acetate | Organic Solvent | Eastman Chemical |
| PM-Acetate | Organic Solvent | Eastman Chemical |
| Methylethyl Ketone | Organic Solvent | Eastman Chemical |
| Fluorad ™ FC-430 | Surfactant | 3M |
| Cellulose Acetate Butyrate (CAB 381-0.1) | Flow Modifier | Eastman Chemical |
| Dibutyl Tin Dilaurate | Catalyst | CasChem, Inc |
| Diisobutyl Ketone | Organic Solvent | Eastman Chemical |
| Tinuvin ™-123 | Hindered Amine | Ciba Geigy |
| 2,4-Pentanedione | Pot Life Extender | Eastman Chemical |
| Methyl n-Amylketone | Solvent | Eastman Chemical |
| Multiflow ™ | Flow Modifier | Monsanto |
| COROC ® A-2201-M | Flow Modifier | Cook Composites and Polymers |
| COROC ® A-620-A2 | Flow Modifier | Cook Composites and Polymers |
| Luxate ™ HT-2000 | Polyisocyanate —NCO Eq Wt = 190.00 | Olin Chemicals |

TABLE 14-continued

Materials and Suppliers

| Materials | Functions and Characteristics | Suppliers |
|---|---|---|
| Desmodur ™ N-3300 | Polyisocyanate —NCO Eq Wt = 194.00 | Bayer |
| Desmondur ™ N-3390 | Polyisocyanate —NCO Eq Wt = 215.00 | Bayer |

Example 22
Segmented Polydimethyl Siloxane PUR

The coating solution mixture summarized in Example 22 in Table 15 was throughly mixed for 3 minutes and coated 50 micron wet thickness to obtain 37.5 micron dry thickness. The clear coat was cured 2 minutes at 73° C., 2 minutes at 95° C. and 6 minutes at 135° C. It was further forced cured 1 hour at 100° C. The scratch resistance and self-healing character were then tested according to Test E.

The cross-linked PUR prepared in this Example 22 contains about 15% polydimethyl siloxane segment in the backbones.

Example 23
Segmented Polydimethyl Siloxane PUR

The coating mixture shown in Example 22 in Table 15 was coated and cured in the same ways as described in Example 22. The scratch resistant and self-healing character were then tested according to Test E. The resulting cross-linked PUR prepared in this Example 23 contains 6.6% polydimethyl siloxane segment in the backbones.

Example 24
Segmented Perfluoroether PUR

The coating mixture shown in Example 24 in Table 15 was coated and cured in the same ways as described in Example 22. The scratch resistant and self-healing character were then tested according to Test E. The resulting cross-linked PUR prepared in this Example contains about 15% perfluoroether segment in the backbones.

Example 25
Segmented Perfluoroether PUR

The coating mixture shown in Example 25 in Table 15 was coated and cured in the same ways as described in Example 22. The scratch resistant and self-healing character were then tested according to Test E. The resulting cross-linked PUR prepared in this Example contains about 6.6% perfluoroether segment in the backbones.

Comparative Example 26

The coating solution mixture shown in Comp. Example 26 in Table 15 was coated and cured in the same ways as shown in Example 22. The scratch resitance and self-healing were tesed according to Test E.

Example 27
Segmented Perfluoropolyether PUR

The coating solution mixture shown in Examples 27 in Table 16 was screened by using a 110 mesh screen. It was cured in a same manner as described in Example 22. The scratch resisant and self-healing character were tested according to Test E. The resulting cross-linked PUR prepared in this Example contains about 16.4% perfluoroether segment in the backbones.

Example 28
Segmented Polydimethyl Siloxane PUR

The coating solution mixture shown in Example 28 in Table 16 was coated and cured in the same ways as described in Example 22. The scratch resistance and self-healing character were tested according to Test E. The resulting cross-linked PUR contains 18.8% polydimethyl siloxane segment in the backbones.

Example 29
Segmented Polydimethyl Siloxane PUR

The coating solution mixture shown in Example 29 in Table 16 was coated and cured in the same ways as described in Example 1. The scratch self-healing character were tested according to Test E. PUR contains 9.2% polydimethyl siloxane segment in the backbones.

Comparative Example 30

The coating solution mixture shown in Comp. Example 30 in Table 16 was screened and cured in the same manner as described in Example 27. The scratch resistance and self-healing character were tested according to Test E.

TABLE 15

Formulations of Solvent-Based 2-Part Reactive Polyurethanes*

| | Example 22 | Example 23 | Example 24 | Example 25 | Comp. Example 26 |
|---|---|---|---|---|---|
| Carbiol Terminated Polydimethyl Siloxane PS-556 | 16.25 | 8.13 | 0.00 | 0.00 | 0.00 |
| Dynamar ™ L-9939 | 0.00 | 0.00 | 16.25 | 8.13 | 0.00 |
| Lexorez ™-1400-120 | 10.45 | 5.22 | 10.45 | 5.22 | 16.81 |
| Joncryl ™-510 (80% in Xylene) | 35.47 | 57.74 | 35.47 | 57.74 | 0.00 |
| Joncryl ™ SCX-802 | 0.00 | 0.00 | 0.00 | 0.00 | 33.61 |
| Tone ™-305 | 11.92 | 15.95 | 11.92 | 15.95 | 8.40 |
| Butyl Acetate | 11.82 | 5.91 | 11.82 | 5.91 | 6.64 |
| PM-Acetate | 7.09 | 3.50 | 7.09 | 3.50 | 12.60 |
| Methylethyl Ketone | 0.00 | 12.00 | 0.00 | 5.00 | 14.37 |

TABLE 15-continued

Formulations of Solvent-Based 2-Part Reactive Polyurethanes*

|  | Example 22 | Example 23 | Example 24 | Example 25 | Comp. Example 26 |
|---|---|---|---|---|---|
| Fluorad™ FC-430 (20% in PM-Acetate) | 4.73 | 2.37 | 4.73 | 2.37 | 3.38 |
| Dibutyl Tin Dilaurate (1% in Butyl Acetate) | 2.36 | 1.18 | 2.36 | 1.18 | 1.68 |
| Diisobutyl Ketone | 0.00 | 0.00 | 0.00 | 0.00 | 2.51 |
| Tinuvin™-123 | 1.50 | 1.50 | 1.50 | 1.50 | 100.00 |
| Tinuvin™-1130 | 1.60 | 1.60 | 1.60 | 1.60 | 0.00 |
| COROC® A-2201-M | 1.00 | 1.00 | 0.00 | 0.00 | 0.00 |
| COROC® A-620-A2 | 0.00 | 0.00 | 0.00 | 1.00 | 0.00 |
| Luxate™ HT-2000 | 38.20 | 46.64 | 38.22 | 46.72 | 0.00 |
| Desmodur™ N-3300 | 0.00 | 0.00 | 0.00 | 0.00 | 28.40 |
| Solid % | 77.2% | 77.8% | 77.3% | 81.1% | 68.5% |
| Viscosity (cps) | 150 | 150 | 200 | 150 | 200 |
| Wt % Segmented Polydimethylsiloxane | 15.00 | 6.60 | 0.00 | 0.00 | 0.00 |
| Wt % Segmented Perfluoropolyether | 0.00 | 0.00 | 15.00 | 6.60 | 0.00 |

*weights in grams unless indicated otherwise

TABLE 16

Formulations of Solvent-Based 2-Part Reactive Polyurethanes.*

| Ingredients | Example 27 | Example 28 | Example 29 | Comp. Example 30 |
|---|---|---|---|---|
| Butyl Cellosolve Acetate | 12.0 | 12.0 | 12.0 | 24.0 |
| Methyl n-Amylketone | 6.0 | 6.0 | 6.0 | 12.0 |
| Joncryl™-587 | 16.1 | 16.1 | 16.1 | 37.2 |
| Tone™ PCP-201 | 9.3 | 9.3 | 9.3 | 18.6 |
| CAB 381-0.1 | 1.7 | 1.7 | 1.7 | 3.4 |
| Multiflow™ | 0.8 | 0.8 | 0.8 | 1.6 |
| Cosorb OSG | 1.5 | 1.5 | 1.5 | 2.4 |
| Tinuvin™-292 | 0.7 | 0.7 | 0.7 | 0.8 |
| DBTDL (10% in Butyl Cellosolve) | 0.4 | 0.4 | 0.4 | 0.8 |
| 2,4-Pentanedione | 5.0 | 5.0 | 5.0 | 10.0 |
| Butyl Cellosolve | 15.0 | 15.0 | 15.0 | 30.0 |
| Dynamar™ L-9939 | 10.0 | 0.0 | 0.0 | 0.0 |
| Carbinol Terminated polydimethyl Siloxane (PS-556) | 0.0 | 12.0 | 5.0 | 0.00 |
| Desmondur™-3390 | 20.6 | 21.3 | 18.5 | 33.0 |
| Wt % of Perfluoroether Segment | 16.4% | 0.0 | 0.0 | 0.0 |
| Wt % of Polydimethyl Siloxane Segment | 0.0 | 18.8% | 9.2% | 0.0 |
| Wt % Solid | 60.4% | 61.4% | 61.0% | 54.0% |

*weights in grams unless indicated otherwise

TABLE 17

Scratch Resistance and Self-Healability of Solvent-Based 2-Part Polyurethanes.

|  | Tested at 0° C. | Tested at 25° C. | Tested at 70° C. |
|---|---|---|---|
| Example 22 (15% Si) | [1]Permanent scratch W/O self-healing | No scratch | No Scratch |
| Example 23 (6.6% Si) | [1]Permanent Scratch W/O Self-Healing | Slight scratch but self-heal within 2 minutes | No Scratch |
| Example 24 (15% F) | [1]Permanent scratch W/O self-healing | No scratch | No Scratch |
| Example 25 (6.6% F) | [1]Permanent scratch W/O self-healing | Slight scratch but self-heal within 2 minutes | No Scratch |

TABLE 17-continued

Scratch Resistance and Self-Healability of
Solvent-Based 2-Part Polyurethanes.

| | Tested at 0° C. | Tested at 25° C. | Tested at 70° C. |
|---|---|---|---|
| Comparative Example 26 | [1]Permanent Scratch W/O Self-Healing | Scratch at ≧100 grams and self-healed in 10 days | No Scratch |
| Example 27 (16.4% F) | [1]Permanent scratch W/O self-healing | Scratch at ≧50 grams and no self-healing | No Scratch |
| Example 28 (18.8% Si) | [1]Permanent scratch W/O self-healing | Slight scratch but self-healed within 5 minutes | No Scratch |
| Example 29 (9.2% Si) | [1]Permanent scratch W/O self-healing | Slight scratch and self-healed within 5 minutes | No Scratch |
| Comparative Example 30 | [1]Permanent scratch W/O self-healing | Scratch at ≧50 grams and no self-healing | Slight scratch |

[1]Samples were scratched permanently without self-healing character at 0° C. However, they all self-healed when put them back in 25° C. or 70° C.

Comparative Example 26 and 30, which do not have polydimethyl siloxane or perfluoropolyether segments in the polymer backbones, showed very poor scratch resistance at 25° C. The scratch in Comparative Examples 26 self-healed at 25° C. in 10 days, where the scratch in Comparative Example 30 did not show any self-healing at 25° C. No scratch was obtained in Comparative Example 26 when tested at 70° C., where Comparative Example 30 scratched slightly at 70° C. due to its high acrylic content. Both Comparative Examples 26 and 30 scratched permanently at 0° C. without self-healing. The scratch in Comparative Example 26 self-healed in 10 days when it was put in 25° C. environment, where the scratch in Comparative Example 30 did not self-heal when it was put in 25° C.

Examples 22 and 24, which contain 15 wt % of polydimethly siloxane segment and perfluropolyether segment individually, show excellent scratch resistance at 25° C. and 70° C. When these two samples were put at 0° C., they scratched permanently with no distinct self-healing characteristic observed at 0° C. However, when the scratched samples were put separately at 25° C. and 70° C. environment, they self-healed from several minutes to 30 seconds, respectively.

Examples 23 and 25, which contain 6.6 wt % of polydimethyl siloxane segment and perfluoropolyether segment individually, showed excellent scratch resistance at 70° C. where, at 25° C., they were scratched slightly when the weight load of the Hoffman scratch tester is heavier than 600 grams. The scratches in both samples self-healed in 2 minutes. Examples 23 and 25 were also scratched permently at 0° C. The scratches in both samples again self-healed in several minutes after the samples were put in 25° C. and 70° C. environment.

Examples 28 and 29, which contain 18.8 wt % and 9.2 wt % of polydimethlsiloxane segment individually, showed good scratch resistance and self-healing characteristics like Examples 23 and 25. However, Example 27, which contain 16.4 wt % of perfluoropolyether segment, showed poor scratch resistant like Comparative Example 30 which did not exhibit self-healing characteristic. Accordingly, perfluoropolyether segment does not provide as good self-healing characteristic as polydimethyl siloxane segment does.

While this invention has been described in connection with specific embodiments, it should be understood that it is capable of further modification. The claims herein are intended to cover those variations which one skilled in the art would recognize as the chemical equivalent of what has been described herein.

I claim:

1. A two-part curable composition having a Part A and a Part B wherein Part A is a composition comprising:
   (a) optionally a urethane prepolymer, wherein said prepolymer has:
      (i) a sufficient number of carboxylic acid functional groups such that the acid number of the prepolymer ranges from about 10 to 100;
      (ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;
      (iii) an average hydroxyl functionality of the prepolymer of about 1.85 to about 2.7;
      (iv) a hydroxyl equivalent-weight of the prepolymer in the range of about 500 to about 5000;
   (b) optionally a water-reducible first acrylic polymer having at least one hydroxyl functional group and optionally 1 or more carboxyl functional groups such that said first acrylic polymer has an acid number in the range of about 0 to about 150;
   (c) optionally a water-reducible second acrylic polymer free of hydroxyl functionality and optionally having 1 or more carboxyl functional groups, wherein said second acrylic polymer has an acid number in the range of about 0 to about 150;
   (d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;
   (e) optionally a water-reducible second compound selected from the group consisting of diols and polyols wherein said second compound optionally has one or more pendant carboxyl functional groups;

(f) water;

(g) optionally a surfactant;

(h) optionally an organic coalescing solvent; and wherein at least one of (a) or (d) is present; provided that when (d) is absent then (a) must contain segment(s) (ii); and wherein not greater than about 35 weight percent total of segment(s) of (a)(ii) plus compound(s) of (d) are present based upon the total solids content of Part A; and wherein Part B is a water-reducible composition which comprises:

(1) a crosslinker selected from the group consisting of polyisocyanates, blocked polyisocyanates, and mixtures thereof; and (2) optionally a coalescing solvent based upon the total weight of Part B;

wherein the NCO:OH ratio of Part B to Part A ranges from about 1:1 to about 1.15:1.

2. The two-part curable composition of claim 1 wherein about 2 to about 35 weight percent total of segment(s) of (a)(ii) plus compound(s) of (d) are present based upon the total solids content of Part A.

3. The two-part curable composition of claim 1 wherein Part A is a composition comprising:

(a) optionally about 0 to about 60 weight percent urethane prepolymer based on the total weight of Part A;

(b) optionally about 0 to about 65 weight percent of the first acrylic polymer based on the total weight of Part A;

(c) optionally about 0 to about 45 weight percent of the second acrylic polymer based on the total weight of Part A;

(d) optionally about 0 to about 35 weight percent of the water reducible first compound based upon the total weight of Part A;

(e) optionally about 0 to about 45 weight percent of the water reducible second compound based on;

(f) sufficient water such that the percent solids for Part A is from about 15 to about 65%;

(g) optionally about 0 to about 3 weight percent of the surfactant based upon the total weight of Part A; and (h) optionally about 0 to about 10 weight percent of the organic coalescing solvent based on the total weight of Part A; and Part B is a water-reducible composition which comprises:

(1) about 75 to about 100 weight percent of a crosslinker based upon the total weight of Part B; and (2) optionally 0 to about 25 weight percent of a coalescing solvent based upon the total weight of Part B.

4. The two-part curable composition of claim 1 which upon a cure provides a self-healing crosslinked polyurethane.

5. The two-part curable composition of claim 1 wherein Part A comprises a combination of components selected from the group consisting of:

(a), (e), (f), (g), (h);

(a), (b), (e), (f), (g), (h);

and (a), (b), (f), (g), (h).

6. The crosslinked polyurethane prepared by the curing of the two-part curable composition of claim 1.

7. The crosslinked polyurethane of claim 6 which is self-healing.

8. A crosslinked polyurethane having pendant carboxylic acid functional groups having a crosslink density of about 10 to about 80%, a storage modulus of about $8.0 \times 10^7$ to about $5.0 \times 10^9$ Pascals at 25° C., a glass transition temperature of about −20° C. to about 100° C., and a damping factor at glass transition region of greater than about 0.4.

9. The crosslinked polyurethane of claim 8 having a crosslink density of about 15 to about 70%, a storage modulus of about $1.0 \times 10^8$ Pascals to about $9.9 \times 10^8$ Pascals at 25° C., a glass transition temperature of about −20° C. to about 80° C., and a damping factor at glass transition region of greater than about 0.7.

10. The crosslinked polyurethane of claim 8 having a crosslink density of about 15 to about 60%, a storage modulus of about $1.0 \times 10^8$ to about $9.9 \times 10^8$ Pascals at 25° C., a damping factor greater than about 0.9 at glass transition region, and a glass transition temperature of about −20° C. to about 50° C.

11. A substrate coated with the crosslinked polyurethane of claim 6.

12. A substrate coated with the crosslinked polyurethane of claim 7.

13. The coated substrate of claim 11 wherein the substrate is selected from the group consisting of wood, metal, glass, cloth, paint, leather, paper, rubber, concrete, and plastic.

14. The coated substrate of claim 12 wherein the substrate is selected from the group consisting of wood, metal, glass, cloth, paint, leather, paper, rubber, concrete, and plastic.

15. A polyurethane prepolymer comprising the reaction product of:

(a) a diisocyanate;

(b) a carboxyl-functional diol having a hydroxyl equivalent weight in the range of up to about 2000 and a sufficient number of carboxyl groups such that said diol has an acid number in the range of about 20 to about 420;

(c) a first compound selected from the group consisting of polyalkyl siloxane diols, polyalkyl siloxane diamines, fluorinated-polyether diols, fluorinated polyether diamines, fluorinated-polyester diols, fluorinated-polyester diamines, and mixtures thereof, said first compound having a hydroxyl equivalent weight in the range of about 200 to about 2000; and (d) optionally a polymeric diol;

(e) optionally a chain extender selected from the group consisting of diol chain extenders, triol chain extenders, and mixtures thereof;

wherein about 0 to about 15 weight percent weight of triol chain extender is present based upon the total weight of the prepolymer;

and wherein the NCO:OH ratio of components from which the prepolymer is made ranges from about 1:1.3 to about 1:1.9.

16. A urethane prepolymer having (a) a sufficient number of carboxylic acid functional groups such that the acid number of the prepolymer ranges from about 10 to about 100;

(b) a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester damine segment(s), and combinations thereof;

(c) an average hydroxyl functionality of the prepolymer of about 1.85 to about 2.7; and (d) a hydroxyl equivalent weight of the prepolymer in the range of about 500 to about 5000.

17. The urethane prepolymer of claim 16 which has
(a) a sufficient number of carboxylic acid functional groups such that the acid number ranges from about 10 to about 50;
(b) about 0.1 to about 35 weight percent of the segment(s) of (b);
(c) an average hydroxyl functionality of about 2.0 to about 2.5; and
(d) a hydroxyl equivalent weight of about 750 to about 4000.

18. The urethane prepolymer of claim 17 which has about 2 to about 20 percent of the segment(s) of (b) and an acid number of about 10 to about 35.

19. A method of making a cured polyurethane comprising the steps of:
(I) combining a Part A and a Part B to form a mixture wherein Part A is a composition comprising:
  (a) optionally a urethane prepolymer, wherein the said prepolymer has:
    (i) a sufficient number of carboxylic acid functional groups such that the acid number of the prepolymer ranges from about 10 to 100;
    (ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof,
    (iii) an average hydroxyl functionality of the prepolymer of about 1.85 to about 2.7;
    (iv) a hydroxyl equivalent-weight of the prepolymer in the range of about 500 to about 5000;
  (b) optionally a water-reducible first acrylic polymer having at least one hydroxyl functional group and optionally 1 or more carboxyl functional groups such that said first acrylic polymer has an acid number in the range of about 0 to about 150;
  (c) optionally a water-reducible second acrylic polymer free of hydroxyl functionality and optionally having 1 or more carboxyl functional groups, wherein said second acrylic polymer has an acid number in the range of about 0 to about 150;
  (d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;
  (e) optionally a water-reducible second compound selected from the group consisting of diols and polyols wherein said second compound optionally has one or more pendant carboxyl functional groups;
  (f) water;
  (g) optionally a surfactant;
  (h) optionally an organic coalescing solvent; and
  wherein at least one of (a) or (d) is present; provided that when (d) is present then (a) must contain segment(s) (ii); and
  wherein not greater than about 35 weight percent total of segment(s) of (a)(ii) plus compound(s) of (d) are present based upon the total solids content of Part A; and wherein Part B is a water-reducible composition which comprises:
  (1) a crosslinker selected from the group consisting of polyisocyanates and mixtures thereof, and
  (2) optionally a coalescing solvent based upon the total weight of Part B;
wherein the NCO:OH ratio of Part B to Part A ranges from about 1:1 to about 1.15:1.
(II) coating the mixture on a substrate;
(III) exposing the coated substrate to a temperature high enough to evaporate at least about 90% by weight of the water present in the mixture but low enough so as not to initiate reaction between water and isocyanate groups present on the polyisocyanate;
(IV) curing the coating by a step selected from the group consisting of:
  (1) exposing the coated substrate to a temperature high enough to cure the coating but not so high as to degrade the substrate until the coating is cured;
  (2) exposing the coated substrate to a temperature sufficient to partially cure the coating to a tack-free state without degrading the substrate, followed by exposure to a lower temperature at which it is still capable of being cured until the coating is cured.

20. The method of claim 19 wherein step (III) occurs at a temperature of about 55° to about 75° C., step (IV)(1) occurs at a temperature of greater than about 75° C. to about 225° C., and step (IV)(2) occurs at a temperature of greater than about 75° to about 225° C. followed by exposure to a temperature of about 10° C. to 75° C.

21. The method of claim 19 wherein step (III) occurs at a temperature of about 65° to about 75° C., step (IV) (1) occurs at a temperature of about 90° to about 225° C., and step (IV) (2) occurs at a temperature of about 90° to about 225° C. followed by about 15° to about 35° C.

22. The method of claim 19 wherein the polyisocyanate crosslinker is aliphatic.

23. The method of claim 19 wherein the NCO:OH ratio is about 1:1 to about 1.10:1.

24. A method of making a cured polyurethane comprising the steps of:
(I) combining a Part A and a Part B to form a mixture wherein Part A is a composition comprising:
  (a) optionally a urethane prepolymer, wherein the said prepolymer has:
    (i) a sufficient number of carboxylic acid functional groups such that the acid number of the prepolymer ranges from about 10 to 100;
    (ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;
    (iii) an average hydroxyl functionality of the prepolymer of about 1.85 to about 2.7;
    (iv) a hydroxyl equivalent-weight of the prepolymer in the range of about 500 to about 5000;
  b) optionally a water-reducible first acrylic polymer having at least one hydroxyl functional group and optionally 1 or more carboxyl functional groups such that said first acrylic polymer has an acid number in the range of about 0 to about 150;
  (c) optionally a water-reducible second acrylic polymer free of hydroxyl functionality and optionally having 1 or more carboxyl functional groups, wherein said second acrylic polymer has an acid number in the range of about 0 to about 150;

(d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;

(e) optionally a water-reducible second compound selected from the group consisting of diols and polyols wherein said second compound optionally has one or more pendant carboxyl functional groups;

(f) water;

(g) optionally a surfactant;

(h) optionally an organic coalescing solvent; and wherein at least one of (a) or (d) is present; provided that when (d) is absent then (a) must contain segment(s) (ii); and wherein not greater than about 35 weight percent total of segment(s) of (a)(ii) plus compound(s) of (d) are present based upon the total solids content of Part A; and wherein Part B is a water-reducible composition which comprises:

(1) a crosslinker selected from the group consisting of blocked polyisocyanates and mixtures thereof; and (2) optionally a coalescing solvent based upon the total weight of Part B; wherein the NCO:OH ratio of Part B to Part A ranges from about 1:1 to about 1.15:1;

(II) coating the mixture on a substrate;

(III) exposing the coated substrate to a temperature sufficient to deblock the blocked polyisocyanate without degrading the substrate; and (IV) exposing the coated substrate to a temperature sufficient to cause curing of the coating without degrading the substrate until the coating is cured.

25. The method of claim 24 wherein step (III) occurs at a temperature of about 90° C. to about 225° C. and step IV occurs at a temperature in the range of about 90° C. to about 225° C.

26. The method of claim 24 wherein step (III) occurs at a temperature of about 100° to about 225° C. and step IV occurs at a temperature of about 100° to about 225° C.

27. The method of claim 24 wherein the NCO:OH ratio is about 1:1 to about 1.1:1.

28. A method of making a cured polyurethane comprising the steps of:

(I) combining a Part A and a Part B to form a mixture wherein Part A is a composition comprising:

(a) optionally a urethane prepolymer, wherein the prepolymer has:

(i) a sufficient number of carboxylic acid functional groups such that the acid number of the prepolymer ranges from about 10 to 100;

(ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;

(iii) an average hydroxyl functionality of the prepolymer of about 1.85 to about 2.7;

(iv) a hydroxyl equivalent-weight of the prepolymer in the range of about 500 to about 5000;

(b) optionally a water-reducible first acrylic polymer having at least one hydroxyl functional group and optionally 1 or more carboxyl functional groups such that said first acrylic polymer has an acid number in the range of about 0 to about 150;

(c) optionally a water-reducible second acrylic polymer free of hydroxyl functionality and optionally having 1 or more carboxyl functional groups, wherein said second acrylic polymer has an acid number in the range of about 0 to about 150;

(d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;

(e) optionally a water-reducible second compound selected from the group consisting of diols and polyols wherein said second compound optionally has one or more pendant carboxyl functional groups;

(f) water;

(g) optionally a surfactant;

(h) optionally an organic coalescing solvent; and wherein at least one of (a) or (d) is present; provided that when (d) is absent then (a) must contain segment(s) (ii); and wherein not greater than about 35 weight percent total of segment(s) of element (a)(ii) plus compound(s) of element (d) are present based upon the total solids content of Part A; and wherein Part B is a water-reducible composition which comprises:

(1) a crosslinker selected from the group consisting of blocked polyisocyanates and mixtures thereof, and (2) optionally a coalescing solvent based upon the total weight of Part B;

wherein the NCO:OH ratio of Part B to Part A ranges from about 1:1 to about 1.15:1;

(II) coating the mixture on a substrate;

(III) exposing the coated substrate to a temperature sufficient to evaporate at least about 90% of the water present in the mixture but too low to deblock the blocked isocyanate crosslinker; and (IV) exposing the coated substrate to a temperature sufficient to deblock the blocked polyisocyanate crosslinker and cure the coating without degrading the substrate, until the coating is cured.

29. The method of claim 28 wherein step (III) occurs at a temperature of about 50° to about 80° C. and step (IV) occurs at a temperature of above 80° C. to about 225° C.

30. The method of claim 28 wherein step (III) occurs at a temperature of about 70° to about 80° C., and step (IV) occurs at a temperature of about 90° C. to about 225° C.

31. The method of claim 28 wherein the NCO:OH ratio is about 1:1 to about 1.1:1.

32. A curable composition comprising:

(a) optionally a urethane prepolymer, wherein the said prepolymer has:

(i) a sufficient number of carboxylic acid functional groups such that the acid number of the prepolymer ranges from about 10 to 100;

(ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof;

(iii) an average hydroxyl functionality of the prepolymer of about 1.85 to about 2.7;

57

(iv) a hydroxyl equivalent-weight of the prepolymer in the range of about 500 to about 5000;

b) optionally a water-reducible first acrylic polymer having at least one hydroxyl functional group and optionally 1 or more carboxyl functional groups such that said first acrylic polymer has an acid number in the range of about 0 to about 150;

(c) optionally a water-reducible second acrylic polymer free of hydroxyl functionality and optionally having 1 or more carboxyl functional groups, wherein said second acrylic polymer has an acid number in the range of about 0 to about 150;

(d) optionally a water-reducible first compound selected from the group consisting of polyalkylsiloxane diols, polyalkylsiloxane diamines, fluorinated-polyether diols, fluorinated polyether diamines, fluorinated polyester diols, fluorinated polyester diamines, and mixtures thereof, said first compound having a hydroxyl equivalent weight in the range of about 200 to about 2000;

(e) optionally a water-reducible second compound selected from the group consisting of diols and polyols wherein said second compound optionally has one or more pendant carboxyl functional groups;

(f) water;

(g) optionally a surfactant;

(h) optionally an organic coalescing solvent; and wherein at least one of (a) or (d) is present; provided that when (d) is absent then (a) must contain segment(s) (ii); and wherein not greater than about 35 weight percent total of segment(s) of (a)(ii) plus compound(s) of (d) are present based upon the total solids content of the composition.

33. A two-part curable composition having a Part A and a Part B wherein Part A is a non-aqueous composition comprising:

(a) optionally a urethane prepolymer, wherein said prepolymer has:

(i) optionally carboxylic acid functional groups such that the acid number of the prepolymer ranges from about 0 to 100;

(ii) optionally a segment(s) selected from the group consisting of polyalkyl siloxane diol segment(s), fluorinated-polyether diol segment(s), fluorinated-polyester diol segment(s), polyalkyl siloxane diamine segment(s), fluorinated-polyether diamine segment(s), fluorinated-polyester diamine segment(s), and combinations thereof, (iii) an average hydroxyl functionality of the prepolymer of about 1.85 to about 2.7;

(iv) a hydroxyl equivalent-weight of the prepolymer in the range of about 500 to about 5000;

(b) optionally an organic solvent-reducible first acrylic polymer having at least one hydroxyl functional group and optionally 1 or more carboxyl functional groups such that said first acrylic polymer has an acid number in the range of about 0 to about 150;

(c) optionally an organic solvent-reducible second acrylic polymer free of hydroxyl functionality and optionally having 1 or more carboxyl functional groups, wherein said second acrylic polymer has an acid number in the range of about 0 to about 150;

(d) optionally an organic solvent-reducible first compound selected from the group consisting of polyalkylsiloxane diols, polyalkylsiloxane diamines, fluorinated-polyether diols, fluorinated polyether

58 diamines, fluorinated polyester diols, fluorinated polyester diamines, and mixtures thereof, said first compound having a hydroxyl equivalent weight in the range of about 200 to about 2000;

(e) optionally an organic solvent-reducible second compound selected from the group consisting of diols and polyols wherein said second compound optionally has one or more pendant carboxyl functional groups;

(f) optionally a nonionic surfactant;

(g) optionally an organic solvent; and wherein at least one of the following is present: (a) having a segment (i); (d) wherein about 2 to about 35 weight percent total of segment (s) of (a)(ii) plus compound(s) of (d) are present based upon the total solids content of Part A; and wherein Part B is a non-aqueous organic solvent-reducible composition which comprises:

(1) a crosslinker selected from the group consisting of polyisocyanates, blocked polyisocyanates, and mixtures thereof; and (2) optionally an organic solvent;

wherein the NCO:OH ratio of Part B to Part A ranges from about 0.95:1 to about 1.07:1.

34. The two-part curable composition of claim 33 wherein about 5 to about 25 weight percent total of segment(s) of (a)(ii) plus compound(s) of (d) are present based upon the total solids content of Part A.

35. The two-part curable composition of claim 33 wherein Part A is a non-aqueous composition comprising:

(a) optionally about 0 to about 60 weight percent urethane prepolymer based on the total weight of Part A;

(b) optionally about 0 to about 65 weight percent of the first acrylic polymer based on the total weight of Part A;

(c) optionally about 0 to about 45 weight percent of the second acrylic polymer based on the total weight of Part A;

(d) optionally about 0 to about 35 weight percent of the organic solvent reducible first compound based upon the total weight of Part A;

(e) optionally about 0 to about 45 weight percent of the organic solvent reducible second compound based on the total weight of Part A;

(f) optionally about 0 to about 3 weight percent of the nonionic surfactant based upon the total weight of Part A; and (g) optionally about 0 to about 70 weight percent of the organic solvent based on the total weight of Part A; and Part B is a non-aqueous organic solvent-reducible composition which comprises:

(1) about 30 to about 100 weight percent of a crosslinker based upon the total weight of Part B; and (2) optionally 0 to about 70 weight percent of an organic solvent based upon the total weight of Part B.

36. The two-part curable composition of claim 33 which upon cure provides a self-healing crosslinked polyurethane.

37. The two-part curable composition of claim 33 wherein Part A comprises a combination of components selected from the group consisting of:

(b), (d), (e), (f), (g);

(a), (b), (e), (f), (g);

and (a), (b), (d), (e), (f), (g).

38. The crosslinked polyurethane prepared by the curing of the two-part curable composition of claim 33.

39. The crosslinked polyurethane of claim 38 which is self-healing.

40. A crosslinked polyurethane having a crosslink density of about 10 to about 80%, a storage modulus of about $8.0 \times 10^7$ to about $5.0 \times 10^9$ Pascals at 25° C., a glass transition temperature of about −20° C. to about 100° C., and a damping factor at glass transition region of greater than about 0.4.

41. The crosslinked polyurethane of claim 40 having a crosslink density of about 15 to about 70%, a storage modulus of about $1.0 \times 10^8$ Pascals to about $9.9 \times 10^8$ Pascals at 25° C., a glass transition temperature of about −20° C. to about 80° C., and a damping factor at glass transition region of greater than about 0.7.

42. The crosslinked polyurethane of claim 40 having a crosslink density of about 15 to about 60%, a storage modulus of about $1.0 \times 10^8$ to about $9.9 \times 10^8$ Pascals at 25° C., a damping factor greater than about 0.9 at glass transition region, and a glass transition temperature of about −20° C. to about 50° C.

43. A substrate coated with the crosslinked polyurethane of claim 38.

44. A substrate coated with the crosslinked polyurethane of claim 39.

45. The coated substrate of claim 43 wherein the substrate is selected from the group consisting of wood, metal, glass, cloth, paint, leather, paper, rubber, concrete, and plastic.

46. The coated substrate of claim 44 wherein the substrate is selected from the group consisting of wood, metal, glass, cloth, paint, leather, paper, rubber, concrete, and plastic.

* * * * *

UNITED STATES PATENT AND TRADEMARK OFFICE
CERTIFICATE OF CORRECTION

PATENT NO.: 5,798,409

DATED: August 25, 1998

INVENTOR(S): Ho

It is certified that error appears in the above-identified patent and that said Letters Patent is hereby corrected as shown below:

Column 2, Under Foreign Patent Documents, the following reference should be added --0 458 742 A1--

Column 2, Abstract, Line 8 "of the" should read -- of the --

Signed and Sealed this

Thirtieth Day of November, 1999

Attest:

Q. TODD DICKINSON

Attesting Officer

Acting Commissioner of Patents and Trademarks